(12) United States Patent
Shimizu

(10) Patent No.: US 6,283,561 B1
(45) Date of Patent: Sep. 4, 2001

(54) BRAKING FORCE CONTROLLER

(75) Inventor: Satoshi Shimizu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/380,130

(22) PCT Filed: Feb. 26, 1998

(86) PCT No.: PCT/JP98/00796

§ 371 Date: Aug. 27, 1999

§ 102(e) Date: Aug. 27, 1999

(87) PCT Pub. No.: WO98/39185

PCT Pub. Date: Sep. 11, 1998

(30) Foreign Application Priority Data

Mar. 6, 1997 (JP) .................................................. 9-052071
Mar. 6, 1997 (JP) .................................................. 9-052072

(51) Int. Cl.[7] ................................................... B60T 8/60
(52) U.S. Cl. .................................................... 303/155
(58) Field of Search .................... 303/3, 13, 15, 303/20, 28, 115.2, 116.1, 155, DIG. 3, DIG. 4

(56) References Cited

U.S. PATENT DOCUMENTS

| | | |
|---|---|---|
| 4,678,243 | 7/1987 | Leiber . |
| 4,774,667 | 9/1988 | Kuraoka et al. . |
| 5,158,343 | 10/1992 | Reichel et al. . |
| 5,261,710 | 11/1993 | Steiner et al. . |
| 5,261,730 | 11/1993 | Steiner et al. . |
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. . |
| 5,492,397 | 2/1996 | Steiner et al. . |

(List continued on next page.)

FOREIGN PATENT DOCUMENTS

| | | |
|---|---|---|
| 4028290 | 9/1990 | (DE) . |
| 4028290 | 1/1992 | (DE) . |
| WO96/6763 | 3/1996 | (EP) . |
| 0711695 | 5/1996 | (EP) . |
| 2282649 | 4/1995 | (GB) . |
| 2295209 | 5/1996 | (GB) . |
| 2297134 | 7/1996 | (GB) . |
| 61-268560 | 11/1986 | (JP) . |
| 3-227766 | 10/1991 | (JP) . |
| 4-121260 | 4/1992 | (JP) . |
| 4-334649 | 11/1992 | (JP) . |
| 5-50908 | 3/1993 | (JP) . |
| 5-97022 | 4/1993 | (JP) . |
| 7-76267 | 3/1995 | (JP) . |
| 7-81540 | 3/1995 | (JP) . |
| 7-156786 | 6/1995 | (JP) . |
| 7-329766 | 12/1995 | (JP) . |
| 8-34326 | 2/1996 | (JP) . |
| 8-40229 | 2/1996 | (JP) . |
| 8-507021 | 7/1996 | (JP) . |
| 8-207725 | 8/1996 | (JP) . |
| 8-295224 | 11/1996 | (JP) . |

(List continued on next page.)

Primary Examiner—Christopher P. Schwartz
Assistant Examiner—C. T. Bartz
(74) Attorney, Agent, or Firm—Kenyon & Kenyon

(57) ABSTRACT

A brake force control apparatus generates a brake force to which a driver's intention is reflected when an emergency brake operation is performed by the driver. The brake force control apparatus generates an increased brake fluid pressure which is greater than that generated in a regular brake operation when an emergency brake operation is performed by the driver. A brake operating speed is detected. Execution of an emergency brake operation is detected based on the brake operating speed. The increased brake fluid pressure is generated by adding an assist pressure corresponding to the brake operating speed generated in a process of the emergency brake operation, when the emergency brake operation is detected.

10 Claims, 32 Drawing Sheets

U.S. PATENT DOCUMENTS

| | | |
|---|---|---|
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,539,641 | 7/1996 | Littlejohn . |
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 | 12/1996 | Steiner . |
| 5,607,209 | 3/1997 | Narita et al. . |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,762,407 | 6/1998 | Stacey et al. . |
| 5,772,290 | 6/1998 | Heibel et al. . |
| 5,779,329 | 7/1998 | Takeshima . |
| 5,890,776 | 4/1999 | Sawada . |
| 5,931,545 | 8/1999 | Yonemura et al. . |
| 5,961,188 | 10/1999 | Sawada . |
| 5,978,725 | 11/1999 | Kagawa . |
| 6,120,110 * | 9/2000 | Shimizu ............................ 303/113.4 |

FOREIGN PATENT DOCUMENTS

| | | |
|---|---|---|
| 8-301098 | 11/1996 | (JP) . |
| 9-48340 | 2/1997 | (JP) . |
| 9-95232 | 4/1997 | (JP) . |
| 9-123900 | 5/1997 | (JP) . |
| WO96/06763 | 3/1996 | (WO) . |

\* cited by examiner

ASSIST PRESSURE INCREASING STATE (BA CONTROL OR BA+ABS CONTROL)

ASSIST PRESSURE HOLDING STATE (BA CONTROL OR BA+ABS CONTROL)

ASSIST PRESSURE DECREASING STATE (BA CONTROL OR BA+ABS CONTROL)

START PRESSURIZING END TIME TABLE

PRESSURE INCREASING TIME TABLE

PRESSURE DECREASING TIME TABLE (FR FRONT/REAR CONNECTED VEHICLE) REGULAR BRAKE STATE (ABS OPERATING STATE)

ASSIST PRESSURE INCREASING STATE
(BA CONTROL)
(FR: FRONT/REAR CONNECTED VEHICLE)

ASSIST PRESSURE INCREASING STATE (BA+ABS CONTROL)
(FR: FRONT/REAR CONNECTED VEHICLE)

ASSIST PRESSURE INCREASING STATE (BA CONTROL)
(FF:X CONNECTED VEHICLE)

BRAKING FORCE CONTROLLER

TECHNICAL FIELD

The present invention relates to a brake force control apparatus and, more particularly, to a brake force control apparatus which generates, when an emergency brake operation is performed in a vehicle, a relatively large brake force as compared to that generated during a normal brake operation.

BACKGROUND ART

Conventionally, as disclosed in Japanese Laid-Open Patent Application No.4-121260, a brake force control apparatus is known which increases a power ratio of a brake booster when a brake pedal is depressed at a speed exceeding a predetermined speed.

A driver of a vehicle operates a brake pedal at a high speed when a rapid increase in a brake force is desired (hereinafter, this operation is referred to as an emergency brake operation). According to the above-mentioned brake force control apparatus, it is determined that the emergency brake operation is performed if an operating speed of the brake pedal is larger than a predetermined value, and a brake force larger than that of a normal time is obtained by increasing a pressure of brake fluid stored in a reservoir and supplying the brake fluid to wheel cylinders. Hereinafter, this control is referred to as a brake assist control (abbreviated as BA control).

According to the above-mentioned brake force control apparatus, a power ratio larger than that of a normal time can be generated when an emergency brake operation is performed so that an advantageous state is established in rapidly increasing a brake force. Accordingly, when the driver performs an emergency brake operation, a brake force which appropriately responds to a request of the driver can be generated.

In order to generate a brake force larger than that of a normal time when the driver performs an emergency brake operation, means for increasing brake fluid must be provided to the brake force control apparatus. Various means can be considered as such means for increasing the pressure of the brake fluid. A pump is considered to be one of the various means. It is appropriate to change a tendency of rising of a brake force.

The conventional brake force control apparatus generates a brake force larger than that applied in a normal condition by always changing the power ratio of the brake booster in the same manner when an emergency brake operation is performed. Thus, when an emergency brake operation is performed, a brake force to which the driver's intention is reflected cannot be generated by the above-mentioned conventional brake force control apparatus.

DISCLOSURE OF THE INVENTION

It is an object of the present invention to provide a brake force control apparatus which can generate a brake force to which a driver's intention is reflected when an emergency brake operation is performed by the driver.

The above-mentioned object can be achieved by a brake force control apparatus for generating an increased brake fluid pressure which is greater than that generated in a regular brake operation when an emergency brake operation is performed by a driver, the brake force control apparatus characterized by:

operating speed detecting means for detecting a brake operating speed;

emergency brake operation detecting means for detecting execution of an emergency brake operation; and brake fluid pressure increasing means for generating the increased brake fluid pressure by adding an assist pressure corresponding to the brake operating speed generated in a process of the emergency brake operation, when the emergency brake operation is detected.

According to the above-mentioned invention, it can be determined that the driver intends to moderately increase the brake force when the brake operating speed is relatively low during a process of an emergency brake operation. On the other hand, if the brake operating speed is relatively high during an emergency brake operation, it can be determined that the driver intends to rapidly increase the brake force. The brake fluid pressure increasing means increases the assist pressure, which is in addition to the brake fluid pressure when an emergency brake operation is performed, in response to the brake operating speed detected during the emergency brake operation when the brake operating speed is high, and decreases the assist pressure when the brake operating speed is low. When the brake fluid pressure is thus controlled, the brake force is immediately increased to a pressure which is intended by the driver after an emergency brake operation is performed.

In the brake force control apparatus according to the present invention, the brake fluid pressure increasing means may comprise:

assist pressure generating means for increasing the brake fluid pressure with a predetermined change rate irrespective of whether a brake operation is present; and assist time control means for controlling, when the emergency brake operation is detected, the assist pressure generating means to increase the brake fluid pressure only for a pressure increasing period corresponding to the brake operating speed generated in the process of the emergency brake operation.

According to this invention, the assist pressure to be added to the brake fluid pressure when en emergency brake operation is performed is generated by first assist pressure generating means. The pressure increasing period used by the first assist pressure generating means is set to be a longer time based on the brake operating speed generated in a process of the emergency brake operation when the brake operating speed is high, and is set to be a shorter time when the brake operating speed is low. In this case, the brake force is immediately increased to a level requested by the driver after the emergency brake operation is performed.

Additionally, the first assist pressure generating means may include an accumulator storing a predetermined fluid pressure as a fluid pressure source of the assist pressure; and the brake force control apparatus may further comprise pressure increasing period correcting means for correcting the pressure increasing period used by the first assist pressure generating means based on the brake fluid pressure when an increase of the brake fluid pressure is started by the first assist pressure generating means.

In this invention, the pressure increasing period used by the first assist pressure generating means is corrected to be longer as the brake fluid pressure is higher based on the brake fluid pressure when the increase of the brake fluid pressure is started, and corrected to be shorter as the brake fluid pressure is lower. The first assist pressure generating means increases the brake fluid pressure by using the accumulator as a fluid power source. When the brake fluid pressure is increased by using the accumulator as a fluid power source, the brake fluid pressure is increased by a steeper slope of the increasing rate as a difference between the brake fluid pressure and a pressure in the accumulator. When the pressure increasing period used by the first assist pressure generating means is corrected as described above, a substantially constant assist pressure is maintained irrespective of whether the brake fluid pressure when the increase of the brake fluid pressure is started is higher or lower. In this case, the brake force is immediately increased to a level intended by the driver after the emergency brake operation is performed.

Additionally, in the brake force control apparatus according to the present invention, the brake fluid pressure increasing means may comprise:

second assist pressure generating means for increasing the brake fluid pressure irrespective of whether a brake operation is present; and assist time control means for controlling, when the emergency brake operation is detected, the second assist pressure generating means to increase the brake fluid pressure by a pressure increasing slope corresponding to the brake operating speed generated in the process of the emergency brake operation.

In this invention, the assist pressure added to the brake fluid pressure when an emergency brake operation is detected is generated by the second assist pressure generating means. The pressure increasing slope used by the second assist pressure generating means is set to be steep based on the brake operating speed generated in a process of the emergency brake operation when the brake operating speed is high, and the slope is set to be gentle when the brake operating speed is low. Accordingly, the brake force is immediately increased to a level intended by the driver after the emergency brake operation is performed.

Additionally, in the brake force control apparatus according to the present invention, the brake fluid pressure increasing means may include:

a brake fluid pressure control mechanism being set in one of an assist pressure increasing state, an assist pressure maintaining state and an assist pressure decreasing state, the assist pressure increasing state being set so as to increase the brake fluid pressure irrespective of the brake operation, the assist pressure holding state being set so as to maintain the brake fluid pressure irrespective of the brake operation, the assist pressure decreasing state being set so as to decrease the brake fluid pressure irrespective of the brake operation;

start pressurizing means for generating the brake fluid pressure greater than that generated in the regular brake operation by setting the brake fluid pressure control mechanism in the assist pressure increasing state when the emergency brake operation is detected; and brake fluid pressure adjusting means for adjusting the brake fluid pressure by switching the state of the brake fluid pressure control mechanism to one of the assist pressure increasing means, the assist pressure holding state and the assist pressure decreasing state in response to a state of the brake operation after the brake fluid pressure is increased by the start pressurizing means.

In this invention, when an emergency brake operation is performed by the driver, a brake fluid pressure which is higher than that generated in a regular brake operation is generated since the brake fluid pressure control mechanism is set in the assist pressure increasing state. If a further brake operation is performed by the driver after the brake fluid pressure is set to a value higher than that generated in the regular brake operation, the state of the brake fluid pressure control mechanism is appropriately switched in response to the state of the brake operation. As a result, the brake fluid pressure is increased or decreased in response to the brake operation while the brake fluid pressure is maintained to be higher than that generated in the regular brake operation.

Additionally, in the brake force control apparatus according to the present invention, the brake force control apparatus may further comprise:

brake start time operation degree detecting means for detecting an initial degree of the brake operation at a start time when the state of the brake fluid pressure control mechanism is changed, wherein the brake fluid pressure adjusting means includes first control state selecting means for selecting a state to be set to the brake fluid pressure control mechanism based on a difference between an actual degree of the brake operation and the initial degree of the brake operation.

In this invention, the state of the brake fluid pressure control mechanism is appropriately switched after an increasing operation of the brake fluid pressure by the start pressurizing means is completed so that the brake operation by the driver is appropriately reflected to the brake fluid pressure. Thereafter, if a further brake operation is performed, a difference equal to the degree of the brake operation performed after the brake fluid pressure control mechanism is switched is generated between the actual degree of the brake force and the initial degree of the brake force. The first control state selecting means detects a state of the brake operation, which is performed after the state of the brake fluid pressure control mechanism is switched, based on the thus obtained difference, and selects a state set to the brake fluid pressure control mechanism so that the state of the brake operation is reflected to the brake fluid pressure.

Additionally, the brake fluid pressure adjusting means may include second control state selecting means for selecting a state to be set to the brake fluid pressure control mechanism based on the brake operating speed.

In this invention, the state of the brake fluid pressure control mechanism is switched, if necessary, after an increase of the brake fluid pressure by the start pressurizing means is completed so that the brake operation by the driver is reflected in the brake fluid force. When the driver intends to increase the brake force pressure, a positive brake operating speed is generated. On the other hand, when the driver intends to decrease the brake fluid pressure, a negative brake operating speed is generated. When the driver intends to maintain the brake fluid pressure, the brake operating speed is set to a value near "0". The second control state selecting means selects a state to be set to the brake fluid pressure control mechanism based on the brake operating speed so that the driver's intention is reflected in the brake fluid pressure.

Additionally, in the brake force control apparatus according to the present invention, the brake control apparatus may further comprise:

brake start time operation degree detecting means for detecting an initial degree of the brake operation at a start time when the state of the brake fluid pressure control mechanism is changed, wherein the brake fluid pressure adjusting means includes:

third control state selecting means for selecting a state to be set to the brake fluid pressure control mechanism based on the brake operating speed and a difference between an actual amount of the brake operation and the initial degree of the brake operation; and pressure increasing and decreasing slope changing means for setting a steeper slope of one of an increasing rate and a decreasing rate in the brake fluid pressure than that of other brake operations when an absolute value of the difference is greater than a predetermined value and an absolute value of the brake operating speed is greater than a predetermined speed.

In this invention, the state of the brake fluid pressure control mechanism is switched, if necessary, after an increase of the brake fluid pressure by the start pressurizing means is completed so that the brake operation by the driver is reflected in the brake fluid force. A driver's intention is reflected in both the brake operating speed and the difference between the actual degree of the brake operation and the initial degree of the brake operation. The third control state selecting means selects a state to be set to the brake fluid pressure control mechanism based on the brake operating speed so that the driver's intention is reflected in the brake fluid pressure.

When the driver intends to increase the brake fluid pressure at an increasing rate having a steep slope, a large difference is generated between the actual degree and the initial degree of the brake operation and also a high brake operating speed is generated. If it is determined that the driver intends to increase or decrease the brake fluid pressure at a rate having a steep slope, the pressure increasing and decreasing slope changing means set a state in which the brake fluid pressure is increased or decreased at a rate having a steeper slope than other cases. When the slope of the increasing or decreasing rate of the brake force pressure is set as mentioned above, a driver's intention is accurately reflected in the brake fluid pressure.

It should be noted that, in the present invention, the method for changing the slope of the increasing or decreasing rate of the brake fluid pressure used by the pressure increasing and decreasing slope changing means includes: 1) a method for changing a duty ratio of a period for achieving the assist pressure increasing state or the assist pressure decreasing state to a period for achieving the assist pressure holding state in the brake fluid pressure control mechanism; and 2) a method for changing the slope of the increasing or decreasing rate of the brake fluid pressure which is obtained when the assist pressure increasing state or the assist pressure decreasing state is set to the brake fluid pressure control mechanism.

Additionally, in the brake force control apparatus according to the present invention, the brake fluid pressure adjusting means may include fourth control state selecting means for selecting a state to be set to the brake fluid pressure control mechanism after an increasing of the brake fluid pressure by the start pressurizing means is completed, a selection being made based on the brake operating speed at a time when the increasing of the brake fluid pressure by the start pressurizing means is completed.

In the present invention, if a positive brake operating speed is generated at a time when an increase of the control fluid pressure by the start pressurizing means is completed, it can be determined that the driver intends to further increase the brake fluid pressure at that time. On the other hand, if a negative brake operating speed is generated at a time when an increase of the control fluid pressure by the start pressurizing means is completed, it can be determined that the driver intends to decrease the brake fluid pressure at that time. Additionally, if a brake operating speed near "0" is generated at a time when an increase of the control fluid pressure by the start pressurizing means is completed, it can be determined that the driver intends to maintain the brake fluid pressure at that time. The fourth control state selecting means selects a state to be set to the brake fluid pressure control mechanism based on the brake operating speed at the time when the increase of the brake fluid pressure by the start pressurizing means is completed so that the above-mentioned intentions are reflected to the brake fluid pressure.

Other objects, features and advantages of the present invention will become more apparent from the following detailed description when read in conjunction with the accompanying drawings.

BRIEF DESCRIPTION OF THE DRAWINGS

FIG. 7-(B) is a graph showing changes generated in the master cylinder pressure $P_{M/C}$ and a wheel cylinder pressure $P_{W/C}$ when an emergency brake operation is performed in the brake force control apparatus according to the first embodiment of the present invention.

BEST MODE FOR CARRYING OUT THE INVENTION

Figure 1:
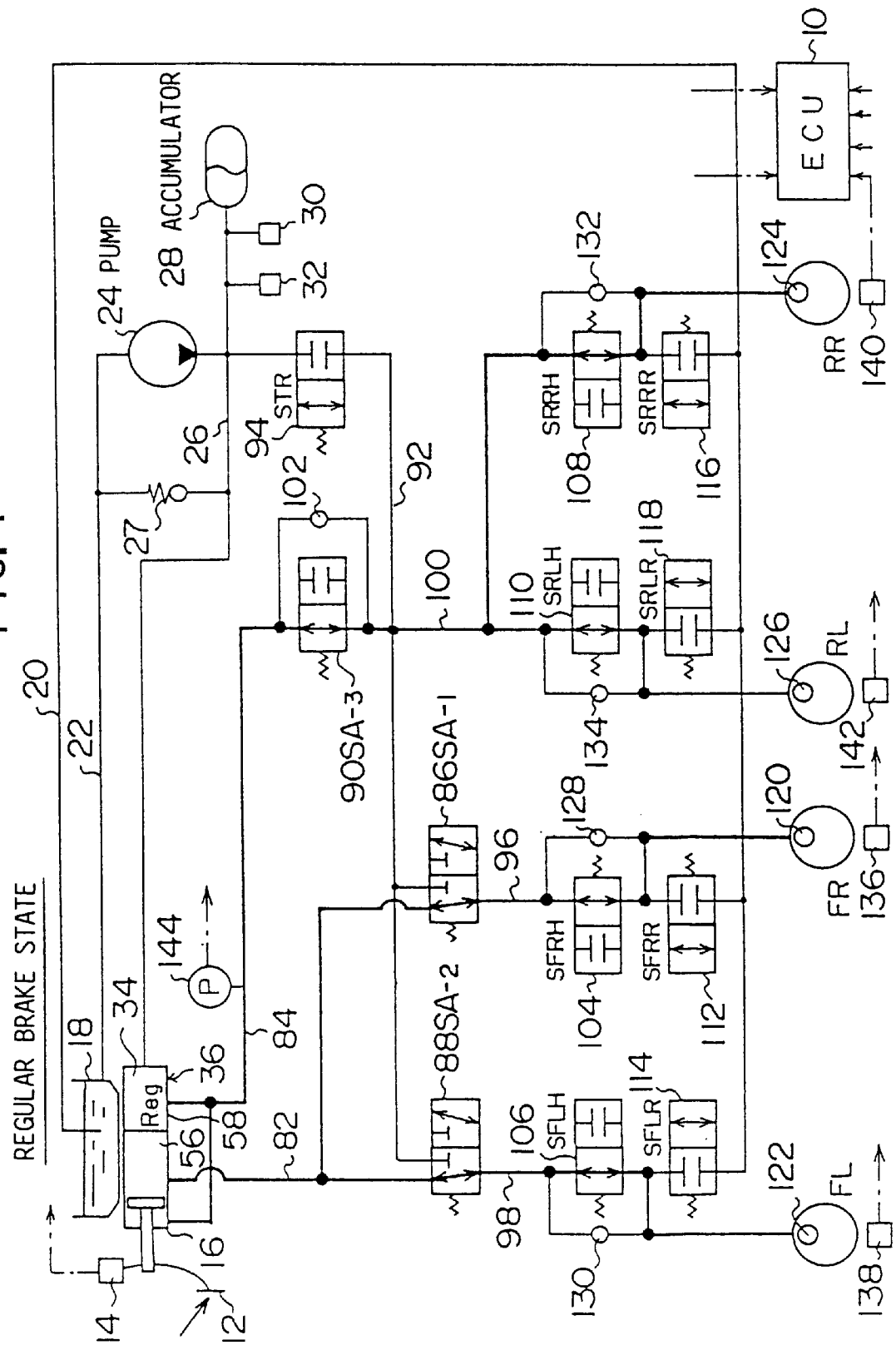
FIG. 1 is a system structure diagram showing a regular brake state of a brake force control apparatus according to a first embodiment of the present invention.

FIG. 1 shows a system structure diagram of a hydro-booster type brake force control apparatus (hereinafter simply referred to as a brake force control apparatus) according to an embodiment of the present invention. The brake force control apparatus according to the present embodiment is controlled by an electronic control unit 10 (hereinafter referred to as ECU 10).

The brake force control apparatus comprises a brake pedal 12. A brake switch 14 is provided near the brake pedal 12. The brake switch 14 outputs an on-signal when the brake pedal 12 is depressed. An output signal of the brake switch 14 is supplied to the ECU 10. The ECU 10 determines whether or not the brake pedal is depressed based on the output signal of the brake switch 14.

The brake pedal 12 is connected to a master cylinder 16. A reservoir tank 18 is provided above the master cylinder 16. The reservoir tank 18 is connected to a return passage 20 for recirculating brake fluid to the reservoir tank 18. A supply passage 22 is also connected to the reservoir tank 18. The supply passage 22 is connected to an inlet of a pump 24. An outlet of the pump 24 is connected to an accumulator passage 26. A low pressure release valve 27 is provided between the accumulator passage 26 and the supply passage 22. The low pressure release valve 27 opens when an excessive pressure is generated in the accumulator passage 26.

An accumulator 28 is connected to the accumulator passage 26 for accumulating a hydraulic pressure discharged by the pump 24. An upper limit pressure switch 28 and a lower limit pressure switch 32 are also connected to the accumulator passage 26. The upper limit pressure switch 30 generates an on-output when a pressure (hereinafter referred to as an accumulator pressure $P_{ACC}$) in the accumulator passage 26 exceeds a predetermined upper limit value. On the other hand, the lower limit pressure switch 32 generates an on-output when the accumulator pressure $P_{ACC}$ falls below a predetermined lower limit value.

The pump 24 is turned on after the on-output is generated by the lower limit pressure switch 32 and until the on-output is generated by the upper limit pressure switch 30, that is, after the accumulator pressure $P_{ACC}$ falls below the lower limit value and until the accumulator pressure $P_{ACC}$ reaches the upper limit value. Accordingly, the accumulator pressure $P_{ACC}$ is always maintained at a level between the upper limit value and the lower limit value.

The master cylinder 16 is integrally provided with a regulator 34. The regulator 34 is connected to the accumulator passage 26. Hereinafter, an assembly of the master cylinder and the regulator are referred to as a hydro-booster.

Figure 2:
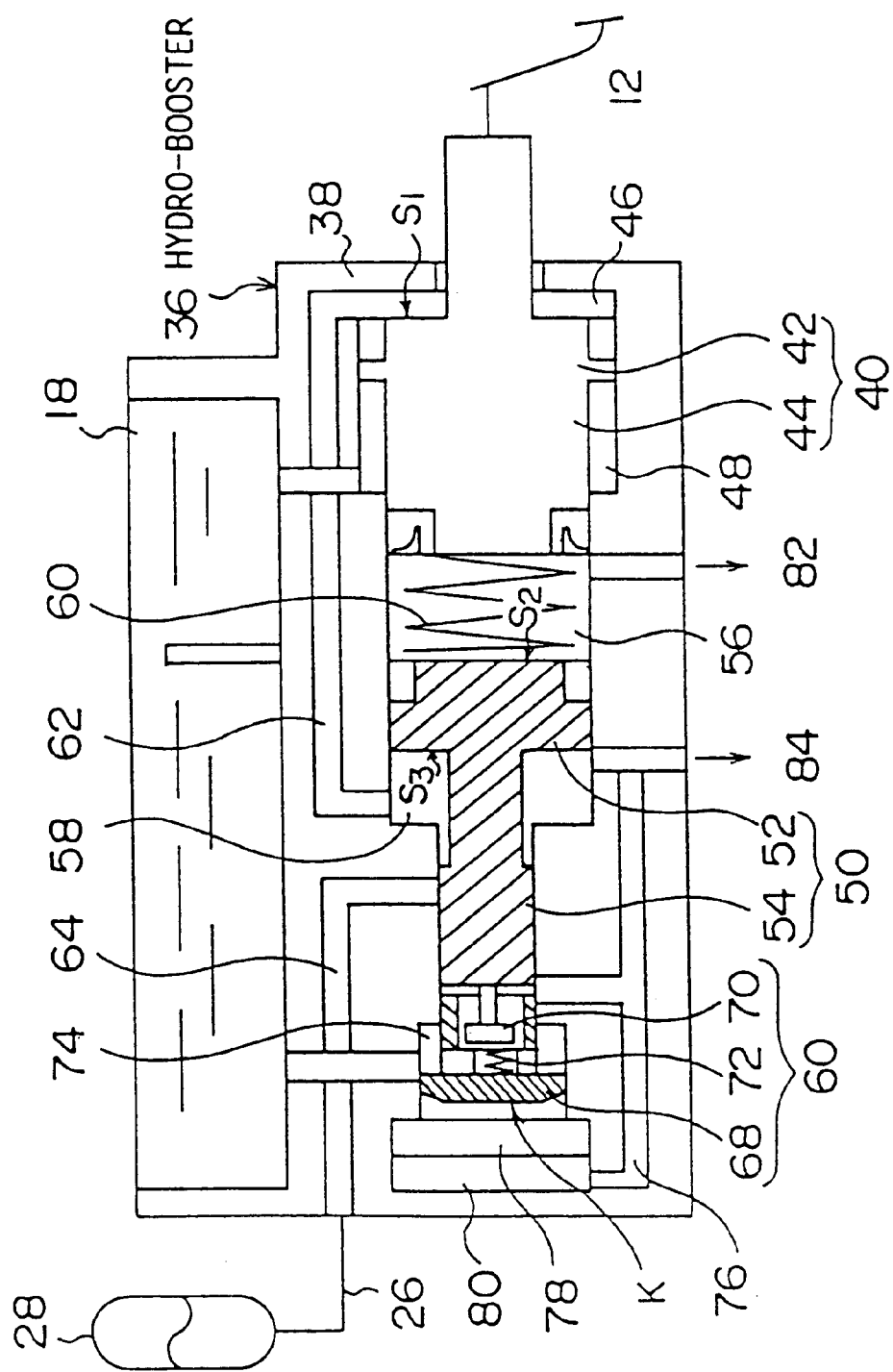
FIG. 2 is a view of a structure of a hydro-booster used in the brake force control apparatus shown in FIG. 1.

FIG. 2 shows a cross-sectional view of the hydro-booster 36. The hydro-booster 36 comprises a housing 38. A first piston 40 is provided inside the housing 38. The first piston 40 comprises a large diameter portion 42 and a small diameter portion 44. In the housing 38, an assist hydraulic chamber 46 is formed on a side of the brake pedal 12 of the first piston 40, and an atmospheric pressure chamber 48 is formed around the small diameter portion 44. The atmospheric pressure chamber 48 is always connected to the reservoir tank 18.

A second piston 50 is provided inside the housing 38. The second piston 50 comprises a large diameter portion 52 and a spool portion 54. In the housing 38, a first hydraulic chamber 56 is formed between the first piston 40 and the second piston 50, and a second hydraulic pressure chamber 58 is formed around the spool portion 54. The first hydraulic pressure chamber 56 is provided with a spring 60 which urges the first piston 40 and the second piston 50 in directions opposite from each other. The second hydraulic pressure chamber 58 is connected to the assist hydraulic pressure chamber 46 via a fluid pressure passage 62.

Additionally, a high-pressure passage 64 is formed in the housing 38, one end of the high-pressure passage 64 being connected to the accumulator passage 26 and the other end being open to an outer surface of the spool portion 54. The spool portion 54 connects the high-pressure passage 64 and the second hydraulic pressure chamber 58 to each other by being displaced in the leftward direction in FIG. 1, and disconnects the high-pressure passage 64 and the second hydraulic pressure chamber 58 from each other by being displaced in the rightward direction in FIG. 1.

A valve mechanism 66 is provided in the housing 38. The valve mechanism 66 comprises a valve seat 68, a valve body 70, and a spring 72. An atmospheric pressure chamber 74, which is connected to the reservoir tank 18, is formed around the valve seat 68. A pressure adjustment passage 76, which is connected to the second hydraulic pressure chamber 58, is open in an end surface of the valve seat 68. A hydraulic passage connecting the atmospheric pressure passage 74 and the pressure adjustment passage 76 is formed in the valve seat 68. The valve body 70 opens the hydraulic passage when the second piston 50 is displaced to the rightmost position in FIG. 1, that is, when the second piston is at an original position. Additionally, the valve body 70 closes the hydraulic passage when the second piston 50 is displaced from the original position in the leftward direction in FIG. 1.

In the housing 38, a reaction disc 78 is provided at a position slightly apart from an end surface of the valve mechanism 66. The reaction disc 78 defines a reaction force chamber 80 which is connected to the pressure adjustment passage 76 in the housing 78. The reaction disc 78 is made of an elastic member, and contacts the valve mechanism 66 by being elastically deformed when a high hydraulic pressure is introduced into the reaction force chamber 80.

When a brake pressing force F is not applied to the brake pedal 12, both the first piston 40 and the second piston 50 are held at their original positions, that is, maintained at the right side displaced ends. In this case, since the pressure adjustment passage 76 and the reservoir tank 18 are connected to each other via the valve mechanism 66, a pressure in the second hydraulic pressure chamber 58 is adjusted to an atmospheric pressure. When the second hydraulic pressure chamber 58 is adjusted to the atmospheric pressure, the assist hydraulic pressure chamber 46 which is connected to the second hydraulic pressure chamber 58 via the fluid pressure passage 62 and the first hydraulic pressure chamber 56 which is formed between the first piston 40 and the second piston 50 are also adjusted to the atmospheric pressure.

When the brake pressing force F is applied to the brake pedal 12, the first piston 40 and the second piston 50 are displaced from their original positions in the leftward direction in FIG. 2. When the leftward displacement is generated in the second piston 50, the valve mechanism 66 is closed first, and the pressure adjustment passage 76 is disconnected from the reservoir tank 18. When the second piston 50 is further displaced in the leftward direction, the high-pressure passage 64 and the second hydraulic pressure chamber 58 are connected to each other via the spool 54.

When the high-pressure passage 64 and the second hydraulic pressure chamber 58 are connected to each other, a pressure (hereinafter referred to as a regulator pressure $P_{RE}$) inside the second hydraulic pressure chamber 58 is increased since the accumulator pressure $P_{ACC}$ is introduced into the second hydraulic pressure chamber 58. The regulator pressure $P_{RE}$ is introduced into the assist hydraulic pressure chamber 46. Accordingly, when the regulator pressure $P_{RE}$ is increased, an assist force Fa corresponding to the regulator pressure $P_{RE}$ is applied to the first piston 40 in addition to the brake pressing force F.

Supposing that S1 is an area of the first piston 40, to which the regulator pressure $P_{RE}$ introduced into the assist hydraulic chamber 46 is applied, the assist force Fa is represented by the following equation.

$$Fa = S1 \times P_{RE} \quad (1)$$

In this case, a hydraulic pressure (hereinafter referred to as a master cylinder pressure $P_{M/C}$) corresponding to the brake pressing force F and the regulator pressure $P_{RE}$ is generated in the first hydraulic pressure chamber 56. The master cylinder pressure $P_{M/C}$ can be represented by the following equation by using the brake pressing force F and the regulator pressure $P_{RE}$.

$$P_{M/C} = (F + S1 \times P_{RE})/S2 \quad (2)$$

At this time, a force $F_{M/C}$, which is a force of the brake fluid in the first hydraulic pressure chamber 56 to press the second piston 56, is represented by the following equation, where S2 is an area of the large diameter portion 52 of the second piston 50.

$$F_{M/C} = P_{M/C} \times S2 \quad (3)$$
$$= F + S1 \times P_{RE}$$

Additionally, a force $F_{RE}$ which is a force of the brake fluid in the second hydraulic pressure chamber 58 to press the second piston 50 when the regulator pressure $P_{RE}$ is generated in the second hydraulic pressure chamber 58 can be represented by the following equation, where S3 is an area of the second piston on which the regulator pressure $P_{RE}$ is applied.

$$F_{RE} = P_{RE} \times S_3 \quad (4)$$

The regulator pressure $P_{RE}$ generated in the second hydraulic pressure chamber 58 is also introduced into the reaction force chamber 80. When the piston 50 is displaced in the rightward direction in FIG. 2 until the valve mechanism 66 contacts the reaction disc 78, a reaction force Fr which corresponds to the regulator pressure $P_{RE}$ is transmitted to the second piston 50 via the reaction disc 78. The reaction force Fr can be represented by the following equation by using a predetermined value K.

$$Fr = K \times P_{RE} \quad (5)$$

After the brake pressing force F is applied to the brake pedal 12, the second piston 50 is displaced from its original position in the leftward direction while $F_{M/C}$, $F_{RE}$ and Fr represented by the above-mentioned equations (3), (4) and (5) satisfy the following relationship.

$$F_{M/C} > F_{RE} + Fr \quad (6)$$

In this case, since the second hydraulic pressure chamber 58 is maintained to be connected to the high-pressure passage 64, the regulator pressure $P_{RE}$ is gradually increased.

After the brake pressing force F is applied to the brake pedal 12 and when $F_{M/C}$, $F_{RE}$ and Fr represented by the above-mentioned equations (3), (4) and (5) satisfy the following relationship, the second piston 50 is pushed back toward the original position.

$$F_{M/C} < F_{RE} + Fr \quad (7)$$

When the second piston 50 is pushed back toward the original position, the second hydraulic pressure chamber 58 is disconnected from the high-pressure passage 64 and, thereby, an increase in the regulator pressure $P_{RE}$ is stopped. Thus, according to the hydro-booster 36, the regulator pressure $P_{RE}$ is adjusted so that the relationship in the following equation is satisfied after a brake pressing force is applied to the brake pedal 12.

$$F_{M/C} = F_{RE} + Fr \quad (8)$$

The relationship in the equation (8) can be rewritten as the following equation by using the above-mentioned equations (3) to (5).

$$P_{RE} = F/(S3 + K - S1) \quad (9)$$

In the present embodiment, the hydro-booster 36 is designed so that the term "1/(S3+K−S1)" becomes a predetermined power ratio and the regulator pressure $P_{RE}$ and the master cylinder pressure $P_{M/C}$ becomes substantially the same pressure. Thus, according to the hydro-booster 36, when a brake pressing force is applied to the brake pedal 12, a fluid pressure (master cylinder pressure $P_{M/C}$ and the regulator pressure $P_{RE}$) having a predetermined power ratio with respect to the brake pressing force F can be generated in the first hydraulic pressure chamber 56 and the second hydraulic pressure chamber 58.

It should be noted that in the following descriptions, the fluid pressure generated by the hydro-booster 36, that is, the master cylinder pressure $P_{M/C}$ and the regulator pressure $P_{RE}$ are referred to as the master cylinder pressure $P_{M/C}$ as a whole.

As shown in FIG. 1, a first fluid passage 82 and the second fluid passage 84 are connected to the first hydraulic pressure chamber 56 and the second hydraulic pressure passage 84 of the hydro-booster 36, respectively. The first fluid passage 82 is connected to a first assist solenoid valve 86 (hereinafter referred to as SA-1 86 and a second assist solenoid valve 88 (hereinafter referred to as SA-2 88). The second fluid passage 84 is connected to third assist solenoid valve 90 (hereinafter referred to as SA-3 90).

A control pressure passage 92 is connected to SA-1 86 and SA-2 88. The control pressure passage is connected to the accumulator passage 26 via a regulator switching solenoid valve 94 (hereinafter referred to as STR 94). STR 94 is a two-position solenoid valve which disconnects the accumulator passage 26 and the control pressure passage 92 from each other by being turned off and connects them to each other by being turned on.

A fluid passage 96 which is provided to a front right wheel FR is connected to SA-1 86. Similarly, a fluid passage 98 which is provided to a front left wheel FL, is connected to SA-2 88. SA-1 86 is a two-position solenoid valve which achieves a first state in which the fluid passage 96 is connected to the first fluid passage 82 by being turned off and a second state in which the fluid passage 96 is connected to the control pressure passage 92 by being turned on. SA-2 88 is a two-position solenoid valve which achieves a first state in which the fluid passage 98 is connected to the first fluid passage 82 by being turned off and a second state in which the fluid passage 98 is connected to the control pressure passage 92 by being turned on.

A fluid pressure passage 100 which is provided to left and right rear wheels RL and RR is connected to SA-3 90. SA-3 90 is a two-position solenoid valve which connects the second fluid passage 84 and the fluid passage to each other by being turned off and disconnects them from each other by being turned on. A check valve 102 is provided between the second fluid pressure passage 84 and the fluid passage 100 so as to permit a flow of the fluid only in a direction from the second fluid passage 84 to the fluid pressure passage 100.

A front right wheel holding solenoid valve 104 (hereinafter referred to as SFRH 104) is connected to the fluid pressure passage 96 corresponding to the front right wheel FR. Similarly, a front left wheel holding solenoid valve 106 (hereinafter referred to as SFLH 106) is connected to the fluid pressure passage 96 corresponding to the front right wheel FR, and a rear right wheel holding solenoid valve 108 (hereinafter referred to as SRRH 108) and a rear left holding solenoid valve 110 (hereinafter referred to as SRLH 110) are connected to the fluid pressure passage 100 which corresponds to the rear left and rear right wheels RL and RR, respectively. Hereinafter, these solenoid valves may be referred to as "holding solenoid valve S**H" as a whole.

A front right wheel pressure decreasing solenoid valve 112 (hereinafter referred to as SFRR 112) is connected to SFRH 104. A front left wheel pressure decreasing solenoid valve 114 (hereinafter referred to as SFLR 114), a rear right wheel pressure decreasing solenoid valve 116 (hereinafter referred to as SRRR 116) and a rear left wheel pressure decreasing solenoid valve 118 (hereinafter referred to as SRLR 118) are connected to SFRH 104, SRRH 108 and SRLH 110, respectively. Hereinafter, these solenoid valves may be referred to as "pressure decreasing solenoid valves S**R" as a whole.

Additionally, a wheel cylinder 120 of the front right wheel FR is connected to SFRH 104. Similarly, a wheel cylinder 122 of the front left wheel FL is connected to SFLH 106, a wheel cylinder 124 of the rear right wheel RR is connected to SRRH 106, and a wheel cylinder 126 of the rear left wheel RL is connected to SRLH 110.

Further, a check valve 128 is provided between the fluid pressure passage 96 and the wheel cylinder 120 so as to permit a flow of the fluid from the wheel cylinder 120 to the fluid pressure passage 96 by bypassing SFRH 104. Similarly, check valves 130, 132 and 134 are provided between the fluid pressure passage 98 and the wheel cylinder 122, between the fluid pressure passage 100 and the wheel cylinder 124 and between the fluid pressure passage 100 and the wheel cylinder 126 so as to permit a flow of the fluid bypassing SFLH 106, SRRH 108 and SRLH 110, respectively.

SFRH 104 is a two-position solenoid valve which connects the fluid pressure passage 96 and the wheel cylinder 120 to each other by being turned off and disconnects them from each other by being turned on. Similarly, SFLH 106, SRRH 108 and SRLH 110 are two-positional solenoid valves which close a path connecting the fluid pressure passage 98 to the wheel cylinder 122, a path connecting the fluid pressure passage 100 to the wheel cylinder 124 and a path connecting the fluid passage 100 to the wheel cylinder 126, respectively.

A return passage 20 is connected to each of SFRR 112, SFLR 114, SRRR 116 and SRLR 118. SFRR 112 is a two-position solenoid valve which disconnects the return passage 20 from the wheel cylinder 120 by being turned off and connects the return passage 20 to the wheel cylinder 120 by being turned on. Similarly, SFLR 114, SRRR 116 and SRLR 118 are two-position solenoid valves which close a path connecting the wheel cylinder 122 to the return passage 20, a path connecting the wheel cylinder 124 to the return passage 20 and a path connecting the wheel cylinder 126 to the return passage 20, respectively.

A wheel speed sensor 136 is located near the front right wheel FR. The wheel speed sensor 136 outputs a pulse signal in response to a rotational speed of the front right wheel FR. Similarly, wheel speed sensors 138, 140 and 142 are located near the front left wheel FL, the rear right wheel RR and the rear left wheel RL, respectively, each of which outputs a pulse signal corresponding to a rotational speed of the respective wheel. The output signals of the wheel sensors 136 to 142 are supplied to the ECU 10. The ECU 10 detects the rotational speed $V_W$ of each wheel based on the output signals of the wheel speed sensors 136 to 142.

A fluid pressure sensor 144 is provided to the second fluid pressure passage 84 which is connected to the second hydraulic pressure chamber 58 of the hydro-booster 36. The fluid pressure sensor 114 outputs an electric signal corresponding to the fluid pressure generated in the second hydraulic pressure chamber 58, that is, the master cylinder pressure $P_{M/C}$ generated by the hydro-booster 36. The output signal of the fluid pressure sensor 114 is supplied to the ECU 10. The ECU 10 detects the master cylinder pressure $P_{M/C}$ based on the output signal of the fluid pressure sensor 114.

A description will now be given of an operation of the brake force control apparatus according to the present embodiment. The brake force control apparatus according to the present embodiment achieves the following functions by operating various solenoid valves provided in the fluid circuit:

1) a function of a regular brake apparatus;
2) a function of an antilock brake system; and
3) a function for generating a brake force greater than that generated in the normal condition when a rapid increase in the brake force is required (brake assist function).

FIG. 1 shows a state of the brake force control apparatus which achieves 1) the function of a regular brake apparatus (hereinafter referred to as a regular brake function). That is, the "1) regular brake function" is achieved by turning off all of the solenoid valves provided in the brake force control apparatus as shown in FIG. 1. Hereinafter, the state shown in FIG. 1 is referred to as a regular brake state. Additionally, a control for achieving the regular brake function in the brake force control apparatus is referred to as a regular brake control.

In FIG. 1, the wheel cylinders 120 and 122 of the front left and front right wheels FL and FR are connected to the first hydraulic pressure chamber 56 of the hydro-booster 36 via the first fluid pressure passage 82. The wheel cylinders 124 and 126 of the rear left and rear right wheels RL and RR are connected to the second hydraulic pressure chamber 58 of the hydro-booster 36 via the second fluid pressure passage 84. In this case, the wheel cylinder pressure $P_{W/C}$ in each of the wheel cylinders 120 to 126 is controlled to be always equal to the master cylinder pressure $P_{M/C}$. Accordingly, in the state shown in FIG. 1, the regular brake function is achieved.

Figure 3:
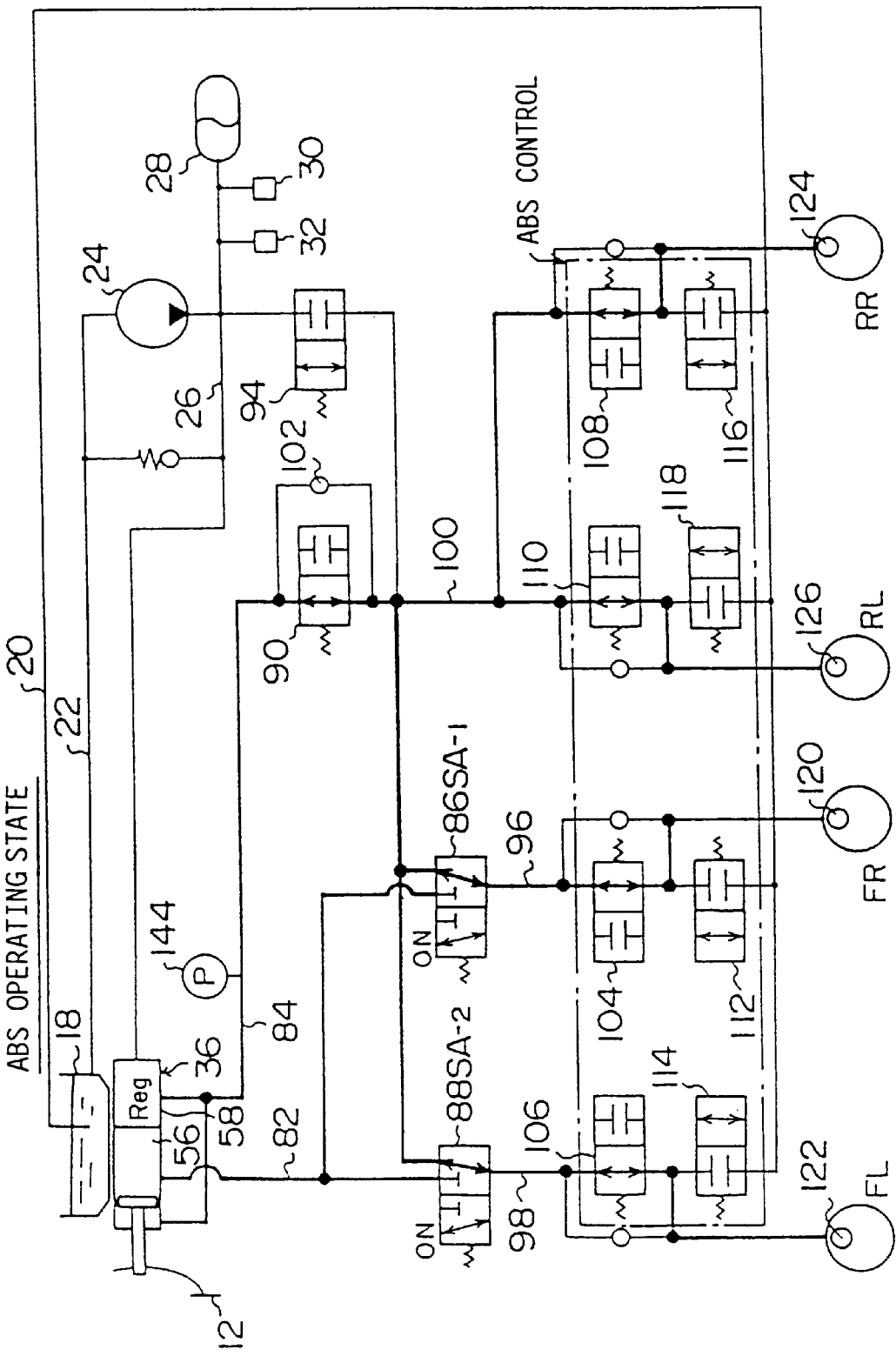
FIG. 3 is an illustration showing an ABS operating state of the brake force control apparatus according to the first embodiment of the present invention.

FIG. 3 shows a state of the brake force control apparatus which achieves 2) the function of an antilock brake system (hereinafter referred to as an ABS function). That is, the "2) ABS function" is achieved by turning on SA-1 86 and SA-2 88 and appropriately operating the holding solenoid valves SH and the pressure decreasing solenoid valves SR in response to requirements of the ABS system as shown in FIG. 3. Hereinafter, the state shown in FIG. 3 is referred to as an ABS operating state. Additionally, a control for achieving the ABS function in the brake force control apparatus is referred to as an ABS control.

The ECU 10 starts the ABS control when the vehicle is in a braking operation and an excessive slip rate is detected in any one of the wheels. During the ABS control, the fluid passages 96 and 98 provided to the front wheels are connected to the second hydraulic pressure chamber 58 of the hydro-booster 36 similar to the fluid pressure passage 100 provided to the rear wheels. Accordingly, during the ABS control, the wheel cylinder pressure $P_{W/C}$ for each of the wheels is increased by using the second hydraulic pressure chamber 58 as a fluid pressure source.

The wheel cylinder pressure $P_{W/C}$ for each wheel can be increased by opening the holding solenoid valves SH and closing the pressure decreasing solenoid valves SR while the ABS control is performed. Hereinafter, this state is referred to as (i) pressure increasing mode. Additionally, the wheel cylinder pressure $P_{W/C}$ for each wheel can be maintained by closing both the holding solenoid valves SH and the pressure decreasing solenoid valves SR while the ABS control is performed. Hereinafter, this state is referred to as (ii) holding mode. Further, the wheel cylinder pressure $P_{W/C}$ for each wheel can be decreased by closing the holding solenoid valves SH and opening the pressure decreasing solenoid valves SR while the ABS control is performed. Hereinafter, this state is referred to as (iii) pressure decreasing mode.

The ECU 10 controls the holding solenoid valves SH and the pressure decreasing solenoid valves SR so that the above-mentioned (i) pressure increasing mode, (ii) holding mode and (iii) pressure decreasing mode are achieved, if necessary, in response to a slip state of each wheel while the ABS control is performed. When the holding solenoid valves SH and the pressure decreasing solenoid valves SR are controlled as mentioned above, the wheel cylinder pressure $P_{W/C}$ for each of the wheels is controlled to be a pressure which does not generate an excessive slip rate in the respective wheels. Thus, according to the above-mentioned control, the ABS function an be achieved in the brake force control apparatus.

While the ABS control is performed, the brake fluid in the wheel cylinders 120 to 126 is discharged to the return passage 20 each time the depressurizing mode is set for each wheel. Then, the brake fluid is provided to wheel cylinders 120 to 126 each time the pressure increasing mode is set for each wheel. Thus, while the ABS control is performed, a large amount of brake fluid flows out from the hydro-booster 36 as compared to the regular brake operation.

The first hydraulic pressure chamber 56 of the hydro-booster 36 is not connected to a fluid pressure source such as the accumulator 28. Thus, when the first hydraulic pressure chamber 56 is used while the ABS control is performed, the brake fluid in the first hydraulic pressure chamber 56 flows out, resulting in an excessive travel of the brake pedal 12. However, in the system according to the present embodiment, the second hydraulic pressure chamber 58 which is connected to the accumulator 28 via the spool portion 54 is used as a fluid pressure source. Thus, according to the system of the present embodiment, an excessive travel of the brake pedal 12 is not generated.

Figure 4:
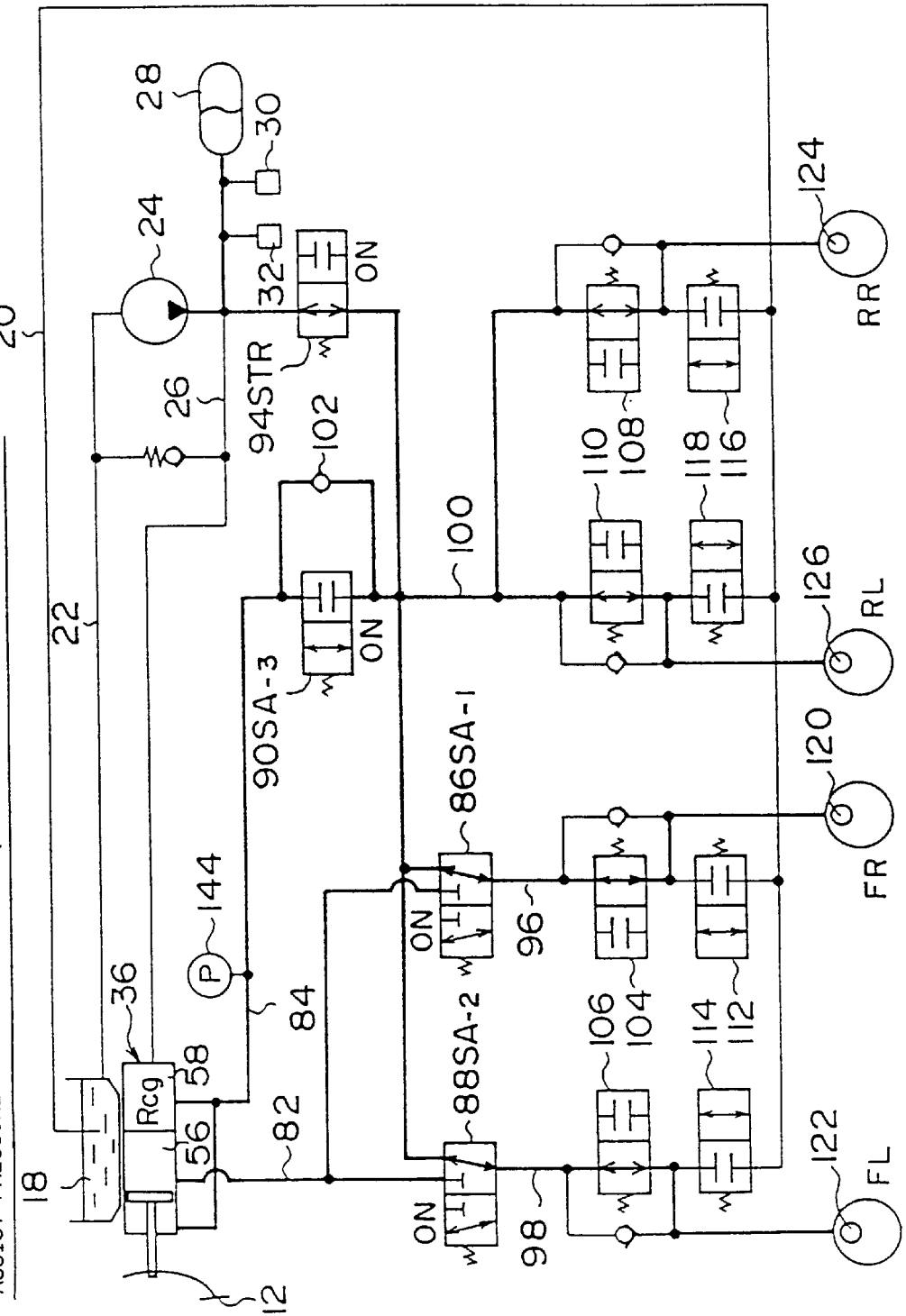
FIG. 4 is an illustration showing an assist pressure increasing state of the brake force control apparatus according to the first embodiment of the present invention which is achieved during execution of a BA control or a BA+ABS control.
Figure 5:
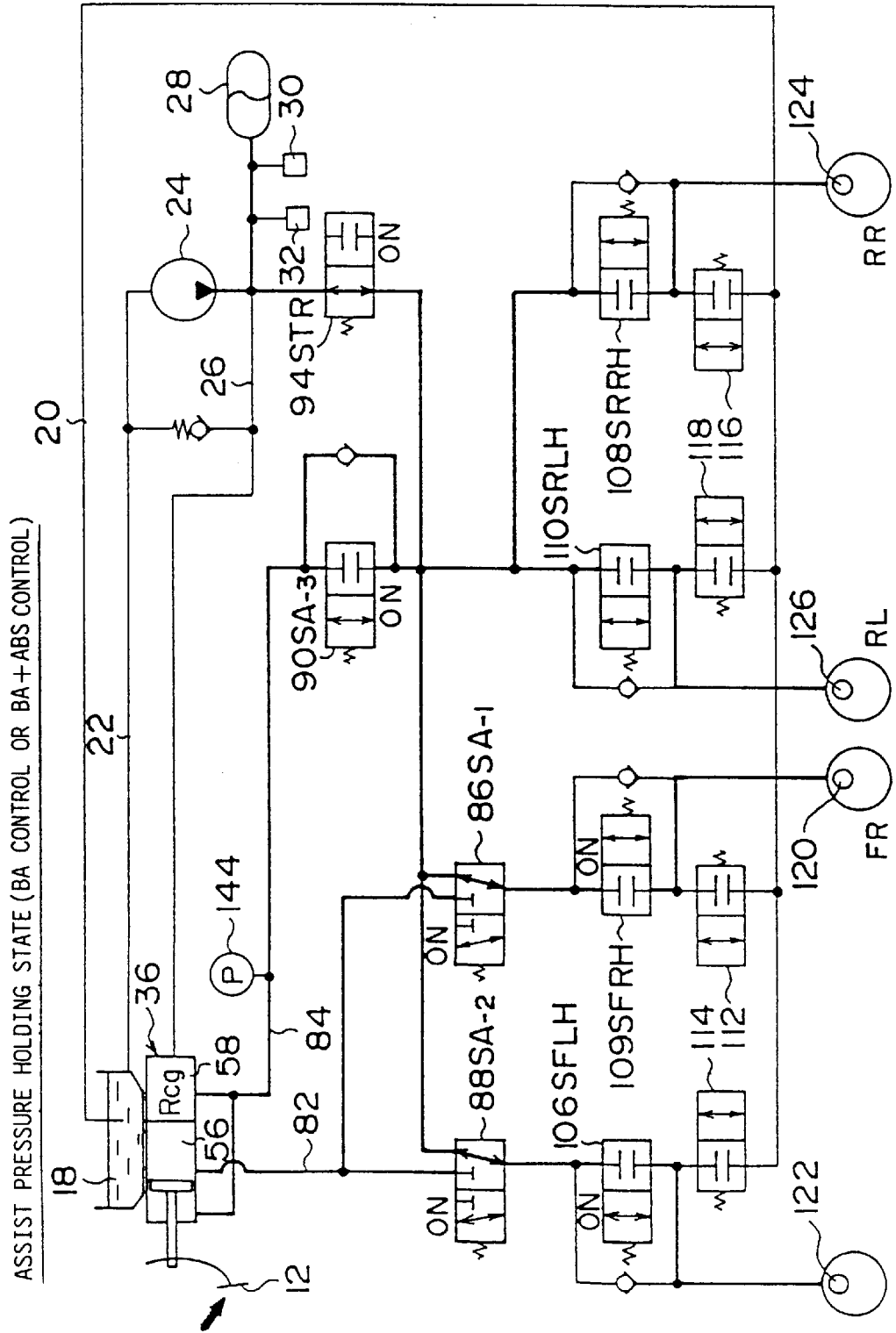
FIG. 5 is an illustration showing an assist pressure holding state of the brake force control apparatus according to the first embodiment of the present invention which is achieved during execution of the BA control or the BA+ABS control.
Figure 6:
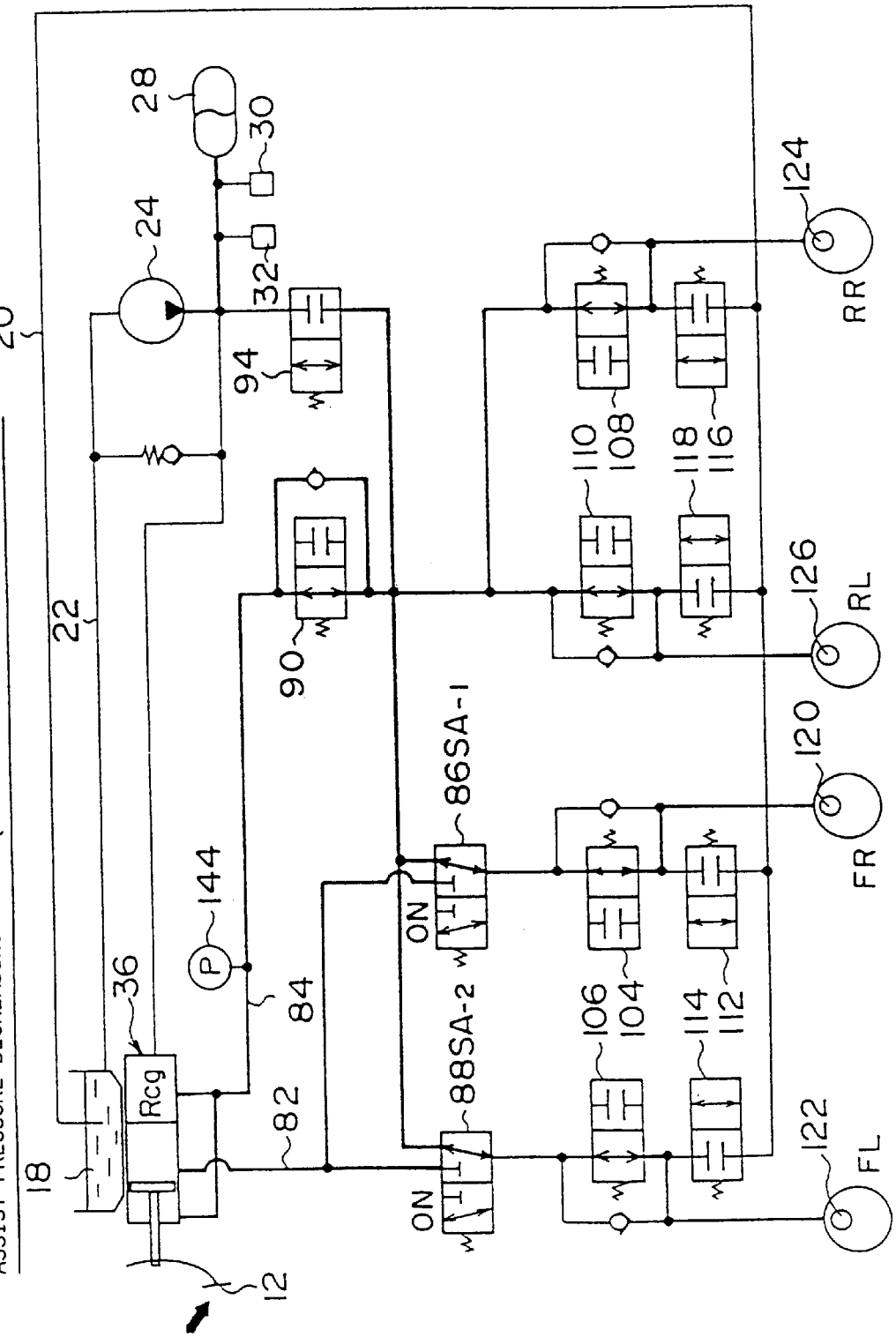
FIG. 6 is an illustration showing an assist pressure decreasing state of the brake force control apparatus according to the first embodiment of the present invention which is achieved during execution of the BA control or the BA+ABS control.

FIGS. 4 to 6 show a state of the brake force control apparatus for achieving the 3) brake assist function (hereinafter referred to as a BA function). The ECU 10 achieves the BA function by a brake operation which requires a rapid increase in a brake force, that is, by achieving the state shown in FIGS. 4 to 6 after an emergency brake operation has been performed. Hereinafter, a control for achieving the BA function in the brake force control apparatus is referred to as a BA control.

FIG. 4 shows an assist pressure increasing state which is performed during execution of the BA control. The assist pressure increasing state is set when the wheel cylinder pressure $P_{W/C}$ of each wheel is needed to increase during execution of the BA control. In the system according to the present embodiment, the assist pressure increasing state is achieved by turning on SA-1 86, SA-2 88, SA-3 90 and STR 94 as shown in FIG. 4.

In the assist pressure increasing state, all of the wheel cylinders 120 to 126 are connected to the accumulator passage 26. Accordingly, when the assist pressure increasing state is set, the wheel cylinder pressure $P_{W/C}$ of each of the wheels can be increased by using the accumulator as a fluid pressure source. The accumulator stores the accumulator pressure $P_{ACC}$ which is a high-pressure. Thus, in the assist pressure increasing state, the wheel cylinder pressure $P_{W/C}$ of each of the wheels can be increased to a pressure greater than the master cylinder pressure $P_{M/C}$.

In the assist pressure increasing state shown in FIG. 4, the fluid pressure passage 96, 98 and 100 are connected to the accumulator passage 26 as mentioned above, and are connected to the second fluid pressure passage 84 via the check valve 102. Accordingly, when the master cylinder pressure $P_{M/C}$ introduced into the second fluid pressure passage 84 is greater than the wheel cylinder pressure $P_{W/C}$ of each of the wheels, the wheel cylinder pressure $P_{W/C}$ can be increased by using the hydro-booster 36 as a fluid pressure source even in the assist pressure increasing state.

FIG. 5 shows an assist pressure holding state which is achieved during execution of the BA control. The assist pressure holding state is set when the wheel cylinder pressure $P_{W/C}$ of each of the wheels is needed to be maintained during execution of the BA control. The assist pressure holding state can be achieved by turning on SA-1 86, SA-2 88, SA-3 90 and STR 94 and turning on (opening) all holding solenoid valves S**H as shown in FIG. 5.

In the assist pressure holding state, all wheel cylinders 120 to 126 are disconnected from the hydro-booster 36 and are also disconnected from the return passage 20, and a flow of fluid from the accumulator 28 to each of the wheel cylinders 120 to 126 is prevented. Accordingly, when the assist pressure holding state is set, the wheel cylinder pressure $P_{W/C}$ of each of the wheels can be maintained at a constant pressure.

FIG. 6 shows an assist pressure decreasing state which is achieved during execution of the BA control. The assist pressure holding state is set when the wheel cylinder pressure $P_{W/C}$ of each of the wheels is needed to decrease during execution of the BA control. The assist pressure decreasing state can be achieved by turning on SA-1 86 and SA-2 88 as shown in FIG. 6.

In the assist pressure decreasing state, all wheel cylinders 120 to 126 are disconnected from the accumulator 28 and are also disconnected from the return passage 20, and the hydro-booster 36 is connected to each of the wheel cylinders 120 to 126. Accordingly, when the assist pressure decreasing state is set, the wheel cylinder pressure $P_{W/C}$ of each of the wheels can be decreased down to the master cylinder pressure $P_{M/C}$ as a lower limit.

Figure 7:
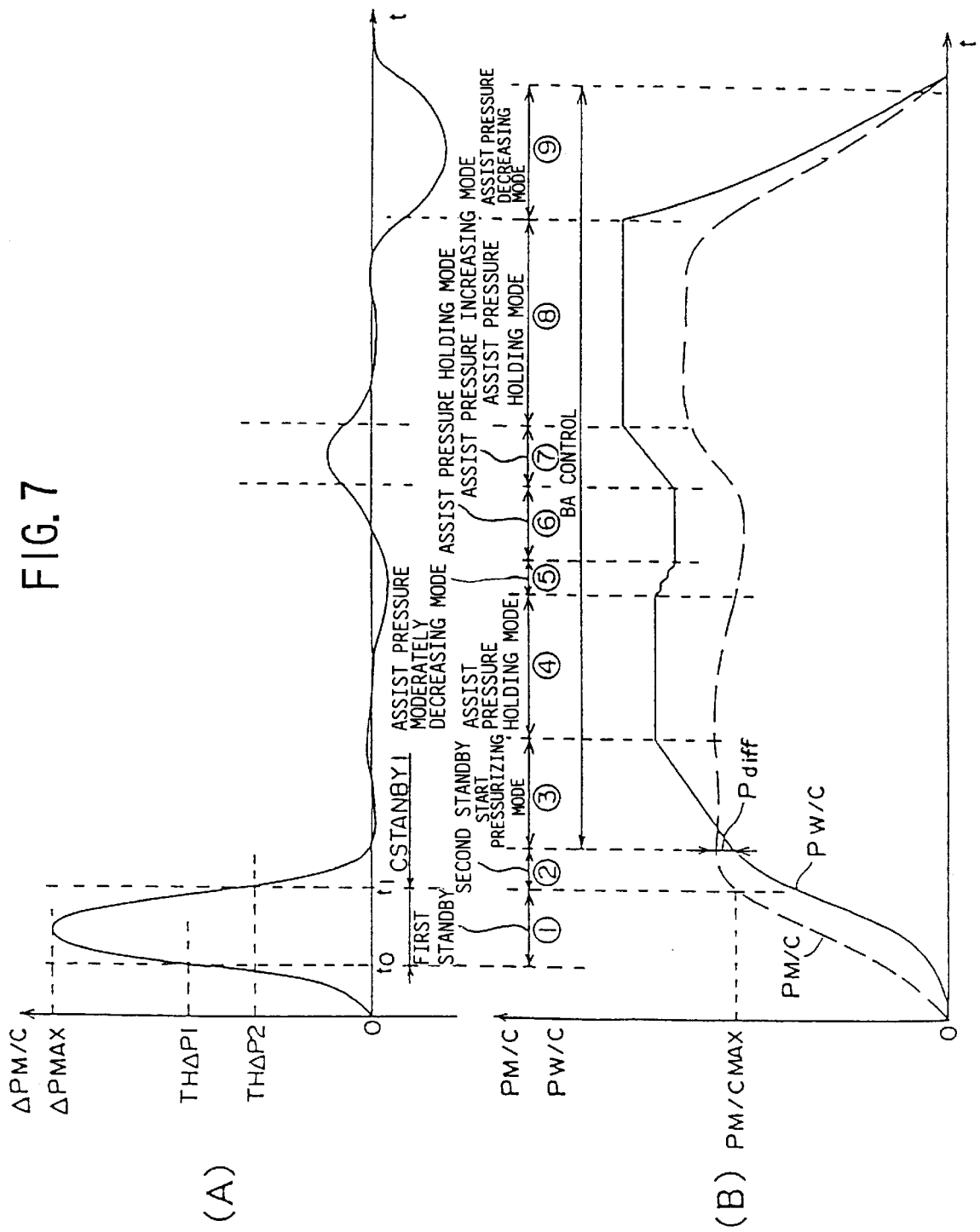
FIG. 7-(A) is a graph showing changes generated in a change rate $\Delta P_{M/C}$ of a master cylinder pressure $P_{M/C}$ when an emergency brake operation is performed in the brake force control apparatus according to the first embodiment of the present invention.

FIG. 7 shows an example of a time chart which is achieved when an emergency brake operation is performed by a driver in the brake force control apparatus according to the present embodiment. A curve shown in FIG. 7-(A) indicates an example of a change generated in an amount of change ($\Delta P_{M/C}$) of the master cylinder pressure $P_{M/C}$ per unit time (hereinafter referred to as a change rate $\Delta P_{M/C}$) when an emergency brake operation is performed. A curve indicated by a dashed line and a curve indicated by a solid line show examples of changes in the master cylinder pressure $P_{M/C}$ and the wheel cylinder pressure $P_{W/C}$ in the same condition, respectively. In the system according to the present embodiment, the master cylinder pressure $P_{M/C}$ and the change rate $\Delta P_{M/C}$ are characteristic values of an amount of operation of the brake pedal 12 and an operation speed of the brake pedal 12, respectively.

When an emergency brake operation is performed by the driver, the master cylinder pressure $P_{M/C}$ is immediately increased, as shown by a dashed line in FIG. 7-(B), to an appropriate pressure after the brake operation is started. At this time, as shown in FIG. 7-(A), the change rate $\Delta P_{M/C}$ of the master cylinder pressure $P_{M/C}$ increases toward the maximum value $\Delta P_{MAX}$ in synchronization with the rapid increase in the master cylinder pressure $P_{M/C}$ after the start of the brake operation. Additionally, the change rate $\Delta P_{M/C}$ of the master cylinder pressure $P_{M/C}$ decreases to a value near zero "0" in synchronization with convergence of the master cylinder pressure $P_{M/C}$ to an appropriate value.

As mentioned-above, the ECU 10 first detects an operation of the brake pedal 12 at a speed exceeding a predetermined speed, specifically, detects the change rate $\Delta P_{M/C}$ exceeding a first predetermined value TH$\Delta$P1 when the ECU 10 determines whether or not the emergency brake operation is being performed by the driver. When the ECU 10 detects a value of the change rate $\Delta P_{M/C}$ which satisfies a relationship $\Delta P_{M/C}$>TH$\Delta$P1, the ECU determines that it is possible that an emergency brake operation is being performed, and shifts to a first standby state (FIG. 7-(B), period (1)).

After the ECU 10 is shifted to the first standby state, the ECU 10 counts a time (t2–t1)=CSTANBY1 which is a period for the change rate $\Delta P_{M/C}$ of the master cylinder pressure $P_{M/C}$ being decreased to a speed less than a second predetermined speed TH$\Delta$P2. If the elapsed time CSTANBY1 is within a predetermined range, the ECU then determines that an emergency brake operation is being performed by the driver, and shifts to a second standby state (FIG. 7-(B), period (2)).

In the brake force control apparatus according to the present invention, a large difference Pdiff is generated between the master cylinder pressure $P_{M/C}$ and the wheel cylinder pressure $P_{W/C}$ while a rapid increase is generated in the master cylinder pressure $P_{M/C}$. In such a condition, the wheel cylinder pressure $P_{W/C}$ can be rapidly increased by using the hydro-booster 36 as a fluid pressure source rather than using the accumulator 28 as a fluid pressure source.

Accordingly, after an emergency brake operation is performed by the driver and until the difference Pdiff is decreased to a sufficiently small value, the wheel cylinder pressure $P_{W/C}$ can be rapidly increased by maintaining the regular brake control rather than performing the BA control. Accordingly, the ECU 10 starts the BA control when the difference Pdiff becomes a sufficiently small value after shifting to the above-mentioned second standby state. If the BA control is started at such a time, the wheel cylinder pressure $P_{W/C}$ can be efficiently and rapidly increased after an emergency brake operation is started.

In the brake force control apparatus according to the present embodiment, when the BA control is started, first I) start pressurizing mode is performed (FIG. 7-(B), period (3)). The (I) start pressurizing mode can be achieved by maintaining the assist pressure increasing state shown in FIG. 4 during a predetermined pressure increasing time $T_{STA}$. As mentioned above, in the assist pressure increasing state, the wheel cylinder pressure $P_{W/C}$ of each of the wheels is increased to a pressure exceeding the master cylinder pressure $P_{M/C}$ by using the accumulator as a fluid pressure source. Accordingly, when the BA control is started, the wheel cylinder pressure $P_{W/C}$ of each of the wheels is rapidly increased to a pressure exceeding the master cylinder pressure $P_{M/C}$ as the (I) start pressurizing mode is performed. Hereinafter, a pressure difference between the wheel cylinder pressure $P_{W/C}$ and the master cylinder pressure $P_{M/C}$ is referred to as an assist pressure Pa.

In the present embodiment, the pressure increasing time $T_{STA}$ is calculated based on the maximum value $\Delta P_{MAX}$ of the change rate $\Delta P_{M/C}$ generated in the master cylinder pressure $P_{M/C}$ in a process of an emergency brake operation. Specifically, the pressure increasing time $T_{STA}$ is set to be a longer time as the maximum value $\Delta P_{MAX}$ is increased and is set to be a shorter time as the maximum value $\Delta P_{MAX}$ is decreased.

The maximum value $P_{MAX}$ of the change rate $\Delta P_{M/C}$ is increased as the driver intends to more rapidly increase the brake force. Accordingly, when the maximum value $\Delta P_{MAX}$ is a large value, it is appropriate to increase the wheel cylinder pressure $P_{W/C}$ to a pressure greater than the master cylinder pressure $P_{M/C}$ after the BA control is started.

If the pressure increasing time $T_{STA}$ is set as mentioned above based on the maximum value $P_{MAX}$, after an emergency brake operation is detected, the wheel cylinder pressure $P_{W/C}$ can be more rapidly increased than the master cylinder pressure $P_{M/C}$, that is, a large assist pressure Pa can be generated as the driver intends to more rapidly increase the brake force.

In the brake force control apparatus according to the present embodiment, after the (I) start pressurizing mode is completed, one of the (II) assist pressure increasing mode, the (III) assist pressure decreasing mode, the (IV) assist pressure holding mode, the (V) assist pressure moderately increasing mode and the (VI) assist pressure moderately decreasing mode is set in response to the brake operation by the driver.

When the master cylinder pressure $P_{M/C}$ is rapidly increased during execution of the BA control, it can be determined that the driver is requesting a larger brake force. In the brake force control apparatus according to the present embodiment, in this case, the (II) assist pressure increasing mode is set (FIG. 7-(B), period (7)). The (II) assist pressure increasing mode can be achieved, similar to the (I) start pressurizing mode, by setting the brake force control apparatus in the assist pressure increasing state. In the assist pressure increasing state, the wheel cylinder pressure $P_{W/C}$ of each of the wheels can be rapidly increased to the accumulator pressure $P_{ACC}$. Thus, according to the above-mentioned process, the intention of the driver can be accurately reflected to the wheel cylinder pressure $P_{W/C}$.

When the master cylinder pressure $P_{M/C}$ is rapidly decreased during execution of the BA control, it can be determined that the driver is requesting a rapid decrease in the brake force. In the present embodiment, in this case, the (III) assist pressure decreasing mode is set (FIG. 7-(B), period (9)). The (III) assist pressure decreasing mode can be achieved by setting the brake force control apparatus in the assist pressure decreasing state. In the assist pressure decreasing state, the wheel cylinder pressure $P_{W/C}$ of each of the wheels can be rapidly decreased to the master cylinder pressure $P_{M/C}$. Thus, according to the above-mentioned process, the intention of the driver can be accurately reflected to the wheel cylinder pressure $P_{W/C}$.

When the master cylinder pressure $P_{M/C}$ is maintained at a substantially constant value during execution of the BA control, it can be determined that the driver intends to maintain the brake force. In the present embodiment, in this case, the (IV) assist pressure holding mode is set (FIG. 7-(B), periods (4) and (8)). The (IV) assist pressure holding mode can be achieved by maintaining the assist pressure holding state sown in FIG. 5. In the assist pressure holding state, the wheel cylinder pressure $P_{W/C}$ of each of the wheels can be maintained at a constant value. Thus, according to the above-mentioned process, the intention of the driver can be accurately reflected to the wheel cylinder pressure $P_{W/C}$.

When the master cylinder pressure $P_{M/C}$ is moderately increased during execution of the BA control, it can be determined that the driver is requesting a moderate increase in the brake force. In the present embodiment, in this case, the (V) assist pressure moderately increasing mode is set (not shown in the figure). The (V) assist pressure moderately increasing mode can be achieved by alternatively setting the assist pressure increasing state shown in FIG. 4 and the assist pressure holding state shown in FIG. 5. In the assist pressure moderately increasing state, the wheel cylinder pressure $P_{W/C}$ of each of the wheels can be increased stepwise toward the accumulator pressure $P_{ACC}$. Thus, according to the above-mentioned process, the intention of the driver can be accurately reflected to the wheel cylinder pressure $P_{W/C}$.

When the master cylinder pressure $P_{M/C}$ is moderately decreased during execution of the BA control, it can be determined that the driver is requesting a moderate increase in the brake force. In the present embodiment, in this case, the (VI) assist pressure moderately decreasing mode is set (FIG. 7-(B), period (5)). The (VI) assist pressure moderately decreasing mode can be achieved by alternatively setting the assist pressure decreasing state shown in FIG. 6 and the assist pressure holding state shown in FIG. 5. In the assist pressure moderately decreasing state, the wheel cylinder pressure $P_{W/C}$ of each of the wheels can be decreased stepwise toward the accumulator pressure $P_{ACC}$. Thus, according to the above-mentioned process, the intention of the driver can be accurately reflected to the wheel cylinder pressure $P_{W/C}$.

According to the above-mentioned process, the assist pressure Pa to which the intention of the drover is accurately reflected can be generated immediately after an emergency brake operation is started by the driver. Thus, according to the brake force control apparatus according to the present embodiment, a mode of increase in the brake force can be varied in response to an intention of the driver.

Additionally, according to the above-mentioned process, when a brake operation is performed by the driver after the assist pressure Pa is generated by the (I) start pressurizing mode, the wheel cylinder pressure $P_{W/C}$ can be increased or decreased in response to the brake operation. Thus, according to the above-mentioned process, an intention of the driver can be appropriately reflected to the wheel cylinder pressure $P_{W/C}$ during execution of the BA control while the assist pressure Pa is maintained at a substantially constant value.

When the wheel cylinder pressure $P_{W/C}$ of each of the wheels is rapidly increased after the BA control is started in the brake force control apparatus, an excessive slip rate may be generated in any one of the wheels. In such a case, the ECU 10 performs the ABS control in addition to the BA control. Herein after this control is referred to as a BA+ABS control.

The BA+ABS control is achieved by controlling the holding solenoid valves SH and the pressure decreasing solenoid valves SR so that the above-mentioned (i) pressure increasing mode, (ii) holding mode and (iii) pressure decreasing mode is set to a wheel (herein after referred to as ABS objective wheel) in which an excessive slip rate is generated, if necessary, while one of the states shown in FIGS. 4 to 6 is set.

That is, when the assist pressure increasing state shown in FIG. 4 or the assist pressure holding state shown in FIG. 5 is set, the accumulator pressure $P_{ACC}$ is provided to each of the holding solenoid valves SH. In this condition, the (ii) holding mode, the (iii) pressure decreasing mode and the (i) pressure increasing mode which is to increase the wheel cylinder pressure $P_{W/C}$ to a pressure exceeding the master cylinder pressure $P_{M/C}$ can be set to each of the wheels. Accordingly, when one of the states shown in FIGS. 4 to 6 is set, the BA+ABS control can be achieved by controlling the holding solenoid valves SH and the pressure decreasing solenoid valves S**R in response to requirements by the ABS control.

Additionally, when the assist pressure decreasing state shown in FIG. 6 is set, the master cylinder pressure $P_{M/C}$ is provided to each of the holding solenoid valves S**H. In this case, the (ii) holding mode, the (iii) depressurizing mode and the (i) pressurizing mode can be set to each of the wheels. The assist pressure decreasing state shown in FIG. 6 is set when the driver intends to decrease the brake force, that is, when the wheel cylinder of none of the wheels is needed to be increased. Accordingly, when the assist pressure decreasing state shown in FIG. 6 is set, the BA+ABS control can be appropriately satisfied if the (ii) holding mode, the (iii) pressure decreasing mode and the (i) pressure increasing mode are set for the ABS objective wheel.

As mentioned above, according to the brake force control apparatus of the present embodiment, after the BA control is started, the BA+ABS control can be achieved by controlling the holding solenoid valves SH and the pressure decreasing solenoid valves SR in response to requirements by the ABS control while one of the states shown in FIGS. 4 to 6 is achieved. According to the above-mentioned BA+ABS control, the wheel cylinder pressure $P_{W/C}$ of each of the wheels can be controlled to a pressure which does not generate an excessive slip rate in the corresponding wheel.

A description will now be given, with reference to FIGS. 8 to 24, of a process performed by the ECU 10 so as to achieve the above-mentioned BA control.

Figure 8:
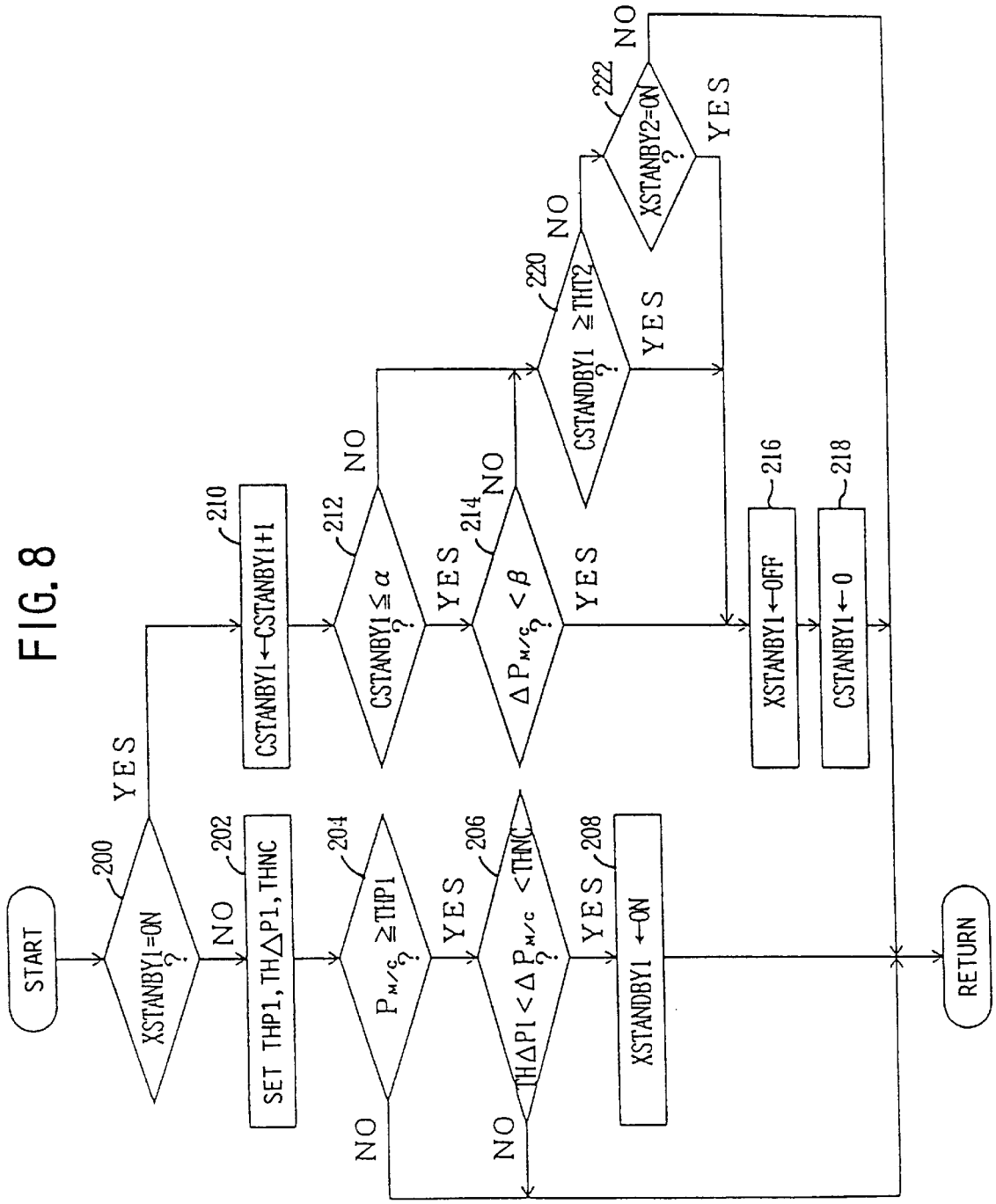
FIG. 8 is a flowchart of an example of a control routine performed to determine an establishment of a first standby state in the brake force control apparatus according to the first embodiment of the present invention.

FIG. 8 shows a flowchart of an example of a control routine performed by the ECU 10 to distinguish a condition for shifting to the first standby state and distinguish a condition for maintaining the first standby state. The routine shown in FIG. 8 is a periodic interruption routine which is started at every predetermined time. When the routine shown in FIG. 8 is started, the process of step 200 is performed first.

In step 200, it is determined whether or not a flag XSTANBY1 is turned on. XSTANBY1 is a flag which is turned on when the condition for shifting to the first standby state is established. Accordingly, when the condition for shifting to the first standby state is not established, it is determined that XSTANBY1=0N is not established. In this case, the process of step 202 is performed.

In step 202, a first predetermined amount THP1, a first predetermined rate TH P1 and a noise cut value THNC are set in response to operating conditions of the vehicle. The first predetermined amount THP1, the first predetermined rate TH P1 and the noise cut value THNC are threshold values used for distinguishing the condition for shifting to the first standby state. That is, in the present embodiment, the condition for shifting to the first standby state is determined to be established when the master cylinder pressure $P_{M/C}$ and the change rate $\Delta P_{M/C}$ satisfy relationships $P_{M/C} \geq THP1$ and $TH\Delta P1 < \Delta P_{M/C} < THNC$ as described later.

In step 202, THP1, TH$\Delta$P1 and THNC are set as shown in the following Table 1 based on a vehicle speed SPD and an elapsed time $T_{STOP}$ after the brake switch 14 is turned on.

TABLE 1

| Operating Condition | THP1 | TH$\Delta$P1 | THNC |
|---|---|---|---|
| SPD $\geq$ V$_0$ | THP1L | TH$\Delta$P1H | THNCH |
| SPD $\geq$ V$_0$ AND T$_{STOP}$ $\geq$ T$_0$ | THP1L | TH$\Delta$P1L | THNCL |
| SPD < V$_0$ | THP1H | TH$\Delta$P1M | THNCL |

As shown in the above Table 1, the first predetermined amount THP1 is set to the predetermined amount THP1L when the vehicle speed SPD is greater than the predetermined speed V$_0$. On the other hand, when the vehicle speed SPD is less than the predetermined speed V$_0$, the first predetermined amount THP1 is set to the predetermined amount THP1H. THP1L and THP1H are set so that a relationship THP1L<THP1H is satisfied. When the first amount THP1 is set as shown in the above Table 1, the relationship $P_{M/C} \geq THP1$, which is one of the conditions for shifting to the first standby state, tends to be easily established at a high-speed operation, and tends to be hardly established at a low-speed operation.

When the vehicle is moving at a low speed, it is less necessary to rapidly increase a brake force as compared to a case in which the vehicle is moving at a high speed. Additionally, a stronger deceleration feel is provided during a low-speed operation in a brake operation as compared to a case in which the vehicle is moving at a high speed. Thus, when the vehicle is moving at a low-speed, it is appropriate that the BA control can be less easily started than a case in which the vehicle is moving at a high speed. If the first predetermined amount THP1 is set to the values shown in the above Table 1, such a requirement can be achieved.

As shown in the above Table 1, the first redetermined rate THP1 is set to the predetermined rate TH P1H when the vehicle speed SPD is greater than the predetermined speed $V_0$ and the elapsed time $T_{STOP}$ after the brake switch is turned on does not reach a predetermined time $T_0$. On the other hand, when the vehicle speed SPD is less than the predetermined speed $V_0$, the first predetermined rate TH$\Delta$P1 is set to the predetermined rate TH$\Delta$P1M. TH$\Delta$P1H and TH$\Delta$P1M are set so that a relationship TH$\Delta$P1H<TH$\Delta$P1M is satisfied. If the first predetermined rate TH$\Delta$P1 is set as shown in the above Table 1, the relationship TH$\Delta$P1$\leq P_{M/C}$ which is one of the conditions for shifting to the first standby state tends to be easily established in a high-speed operation, and tends to be difficult to be established in a low-speed operation.

In a low-speed operation, since a fluctuation in a longitudinal acceleration G generated in the vehicle is large, a passenger in the vehicle tends to feel a large deceleration G. If the first predetermined rate TH P1M is set as mentioned above so that the condition for shifting to the first standby state is difficult to be established, the passenger is prevented form an unnecessary feeling of a large deceleration G due to execution of the BA control.

Additionally, the first predetermined rate TH$\Delta$P1 is set to the predetermined rate TH P1L when the vehicle speed SPD is greater than the predetermined speed $V_0$ and the elapsed time $T_{STOP}$ is greater than the predetermined time $T_0$, that is, when the predetermined time $T_0$ has been elapsed after the brake operation is started. TH$\Delta$P1L is a value further smaller than TH$\Delta$P1M. If the first predetermined rate TH$\Delta$P1 is set as mentioned above and after the relationship $T_{STOP} \geq T_0$ is established, the relationship TH$\Delta$P1$\leq P_{M/C}$ tends to be difficult to be established as compared to a state before the establishment of the relationship $T_{STOP} \geq T_0$.

In the vehicle, an emergency brake operation may be started at a certain time after a brake operation is started. In this case, since the brake pedal 12 has been pressed at the time when the emergency brake operation is started, the change rate $\Delta P_{M/C}$ after the start of the emergency brake tends to be difficult to be a high rate. Accordingly, in order to accurately detect such an emergency brake operation, after a certain time has elapsed after the start time of the brake operation, it is appropriate to set the first predetermined rate TH P1, which is a threshold value for determining a presence of the emergency brake operation, to a smaller value than before. If the first predetermined rate TH P1 is set as shown in the above Table 1, such a requirement can be achieved.

As shown in the above Table 1, the noise cut value THNC is set to the predetermined value THNCH when the vehicle speed SPD is greater than the predetermined speed $V_0$ and the elapsed time after the start of the brake operation does not reach the predetermined time $T_0$. On the other hand, if the vehicle speed SPD is greater than the predetermined speed $V_0$ and the elapsed time $T_{STOP}$ is greater than the predetermined time $T_0$, or if the vehicle speed SPD is less than the predetermined speed $V_0$, the noise cut value THNC is set to the predetermined value THNCL. THNCH and THNCL are set so that the relationship THNCH>THNCL is satisfied.

When $SPD \geq V_0$ is established and $T_{STOP} \geq T_0$ is not established, a large change rate $\Delta P_{M/C}$ is generated in association with the emergency brake operation. Accordingly, in this case, it is appropriate to handle a relatively large change rate $\Delta P_{M/C}$ as effective data. On the other hand, when both $SPD \geq V_0$ and $T_{STOP} \geq T_0$ are established, or when $SPD < V_0$ is established, the change rate $\Delta P_{M/C}$ tends to be difficult to be a large value. Accordingly, in such a case, it is appropriate to handle a relatively large change rate $\Delta P_{M/C}$ as an abnormal value. If the noise cut value THNC is set as shown in the above Table 1, such a requirement can be achieved.

After the first predetermined amount THP1, the first predetermined rate TH P1 and the noise cut value THNC are set in the above-mentioned manner, the process of step 204 is performed.

In step 204, it is determined whether or not the master cylinder pressure $P_{M/C}$ is greater than the first predetermine amount THP1. If it is determined that $P_{M/C} \geq THP1$ is not established, it is determined that the condition for shifting to the first standby state is not established, and then the routine is ended. On the other hand, if it is determined that $P_{M/C} \geq THP1$ is established, the process of step 206 is performed.

In step 206, it is determined whether or not the change rate $\Delta P_{M/C}$ is greater than the first predetermined rate TH$\Delta$P1 and is smaller than the noise cut value THNC. If it is determined that TH$\Delta$P1<$\Delta P_{M/C}$<THNC is not established, it is determined that the condition for shifting to the first standby state is not established, and the routine is ended. On the other hand, if it is determined that the above condition is established, the process of step 208 is performed.

In step 208, the flag XSTANBY1 is turned on so as to indicate that the condition for shifting to the fist standby state is established. After the process of step 208 is completed, the routine is ended.

If the routine is started after the flag XSTANBY1 is turned on in step 208 in a previous routine, it is determined that XSTANBY1=ON is established in step 200. In this case, the process of step 210 is performed subsequent to step 200.

In step 210, a counter CSTANBY1 is incremented. The counter CSTANBY1 is a counter for counting an elapsed time after the establishment of the condition for shifting to the first standby state. The count time of the counter CSTANBY1 is reset to "0" by an initial process when an operation of the vehicle is started. After the process of step 210 is completed, the process of step 212 is then performed.

In step 212, it is determined whether or not the time counted by the counter CSTANBY1 is less than a predetermined time $\alpha$. The predetermined time $\alpha$ is less than the time period during which the change rate $\Delta P_{M/C}$ is maintained to be a large value when an emergency brake operation is performed. If it is determined that CSTANBY1$\leq \alpha$ is established, the process of step 214 is performed.

In step 214, it is determined whether or not the change rate $\Delta P_{M/C}$ is less than a predetermined value $\beta$. If it is determined that $\Delta P_{M/C} < \beta$ is established, it can be determined that the change rate $\Delta P_{M/C}$ becomes a small value in a very short time after the condition for shifting to the first standby state is established. In this case, it is determined that the brake operation by the driver is not an emergency brake operation, and then the process of step 216 is performed.

In step 216, the flag XSTANBY1 is turned off so as to cancel the first standby state. After the process of step 216 is performed, the process of step 218 is performed.

In step 218, a count time of the counter CSTANBY1 is reset to "0". After the process of step 218 is completed, the routine is ended.

In the present routine, if it is determined, in step 212, that CSTANBY<$\alpha$ is not established, or if it is determined, in step 214, that $\Delta P_{M/C}$<$\beta$ is not established, it can be determined that a phenomenon, in which the change rate $\Delta P_{M/C}$ becomes a small value in a very short time after the condition for shifting to the first standby state is established, does not occur. In such a case, the process of step 220 is performed.

In step 220, it is determined whether or not the count value of the counter CSTANBY1 is greater than a second predetermined time THT2. The second predetermined time THT2 is a value for setting an upper limit of the time for maintaining the first standby state after the establishment of the condition for shifting to the first standby state. Accordingly, if it is determined, in step 220, that CSTANBY$\geq$THT2 is established, it can be determined that the time for maintaining the first standby state reaches the upper limit. In such a case, the process of steps 216 and 218 is performed, and then the routine is ended. On the other hand, if it is determined, in step 220 that CSTANBY$\geq$THT2 is not established, it can be determined that the time for maintaining the first standby state has not been reached the upper limit. In such a case, the process of steps 222 is performed.

In step 222, it is determined whether or not a flag XSTANBY2 is turned on. The flag XSTANBY2 is turned on when it is determined that a condition for shifting to a second standby state is established in a routine described later. When it is determined that XSTANBY=ON is established, it is determined that the first standby state is not needed to be maintained. In this state, the process of steps 216 and 218 is performed, and then the routine is ended. On the other hand, if it is determined that XSTANBY=ON is not established, it is determined that the first standby condition is needed to be maintained. In this state, no process is performed thereafter, and the routine is ended.

Figure 9:
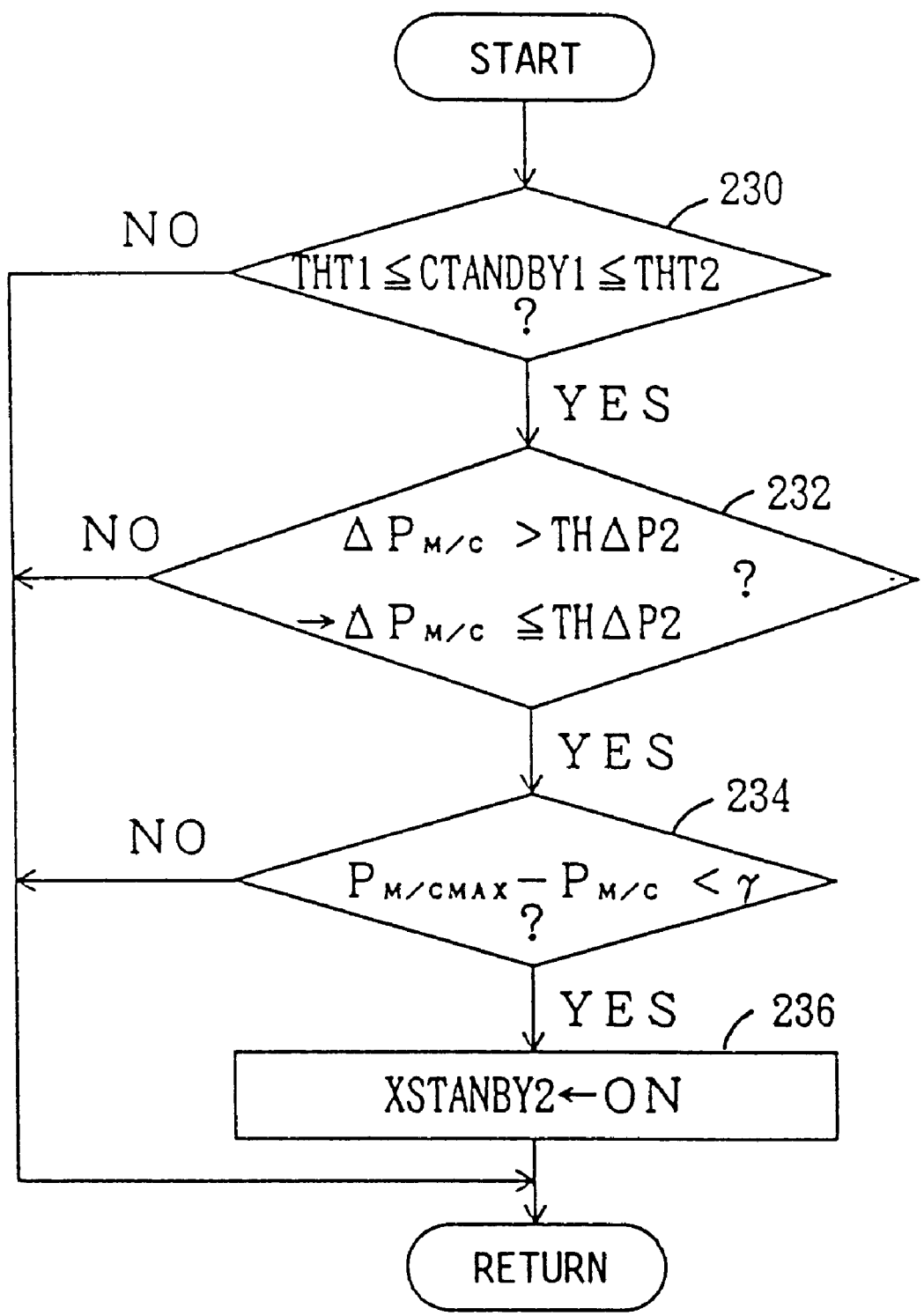
FIG. 9 is a flowchart of an example of a control routine performed to determine an establishment of a second standby state in the brake force control apparatus according to the first embodiment of the present invention.

FIG. 9 shows a flowchart of an example of a control routine performed by the ECU 10 so as to distinguish a condition for shifting to the second standby state. The routine shown in FIG. 9 is a periodic interruption routine started at every predetermined time. When the routine shown in FIG. 9 is started, the process of step 230 is performed first.

In step 230, it is determined whether or not the count time of the counter CSTANBY1, that is, an elapsed time after the establishment of the condition for shifting to the first standby state is greater than the first predetermined time THT1 and is less than the second predetermined time THT2. The second predetermined time THT2 is the upper limit value for maintaining the first standby state. On the other hand, the first predetermined time THT1 is a value which determines a lower limit time for the brake pedal 12 continuing a high-speed operation.

Accordingly, in the brake force control apparatus according to the present embodiment, when the operating speed of the brake pedal 12 becomes a sufficiently small value after the brake operation is started and before THT1$\leq$CSTANBY1 is established, it can be determined that the brake operation is not an emergency brake operation. If it is determined, in step 230, that THT1$\leq$CSTANBY1 is not established, no process is performed thereafter, and the routine is ended. On the other hand, if it is determined that the above-mentioned condition is established, the process of step 232 is then performed.

In step 232, it is determined whether or not the change rate $\Delta P_{M/C}$ is changed from a rate exceeding the second predetermined rate TH$\Delta$P2 to a rate less than the second predetermined rate TH$\Delta$P2 from a previous process cycle to the present process cycle. The second predetermined rate TH$\Delta$P2 is a threshold value for determining whether or not the master cylinder pressure $P_{M/C}$ is rapidly increasing, that is, whether or not the brake pedal 12 is operated at a high speed.

In step 232, if it is determined that the change rate $\Delta P_{M/C}$ is not changed from a rate exceeding the second predetermined rate TH$\Delta$P2 to a rate less than the second predetermined rate TH$\Delta$P2 during a period from the previous process cycle to the present process cycle, it can be determined that the high-speed operation is not completed during a period from the previous process cycle to the present process cycle. In this case, no process is performed thereafter, and the routine is ended.

On the other hand, if it is determined, in step 232, that the change rate $\Delta P_{M/C}$ is changed from a rate exceeding the second predetermined rate TH$\Delta$P2 to a rate less than the second predetermined rate TH$\Delta$P2 during a period from the previous process cycle to the present process cycle, it can be determined that the high-speed operation is completed during a period from the previous process cycle to the present process cycle. In this case, the process of step 234 is performed.

In step 234, it is determined whether or not a difference "$P_{M/VMAX}$–$P_{M/C}$" between the maximum value $P_{M/VMAX}$ of the master cylinder pressure $P_{M/C}$ detected after the establishment of the first standby state and the master cylinder pressure $P_{M/C}$ immediately after the establishment of the condition of step 232 is smaller than a predetermined value $\tau$.

If it is determined that $P_{M/VMAX}$–$P_{M/C}$<$\tau$ is established, it can be determined that a large pressing force F is still applied to the brake pedal 12. In this case, the process of step 236 is then performed. On the other hand, if it is determined that the condition of step 234 is not established, it is determined that the pressing force to the brake pedal 12 has already been decreased. In this case, the process for shifting to the second standby state is not performed, and the routine is ended.

In step 236, the flag XSTANBY2 is turned on so as to indicate that the second standby condition is established. When the process of step 236 is completed, the routine is ended.

Figure 10:
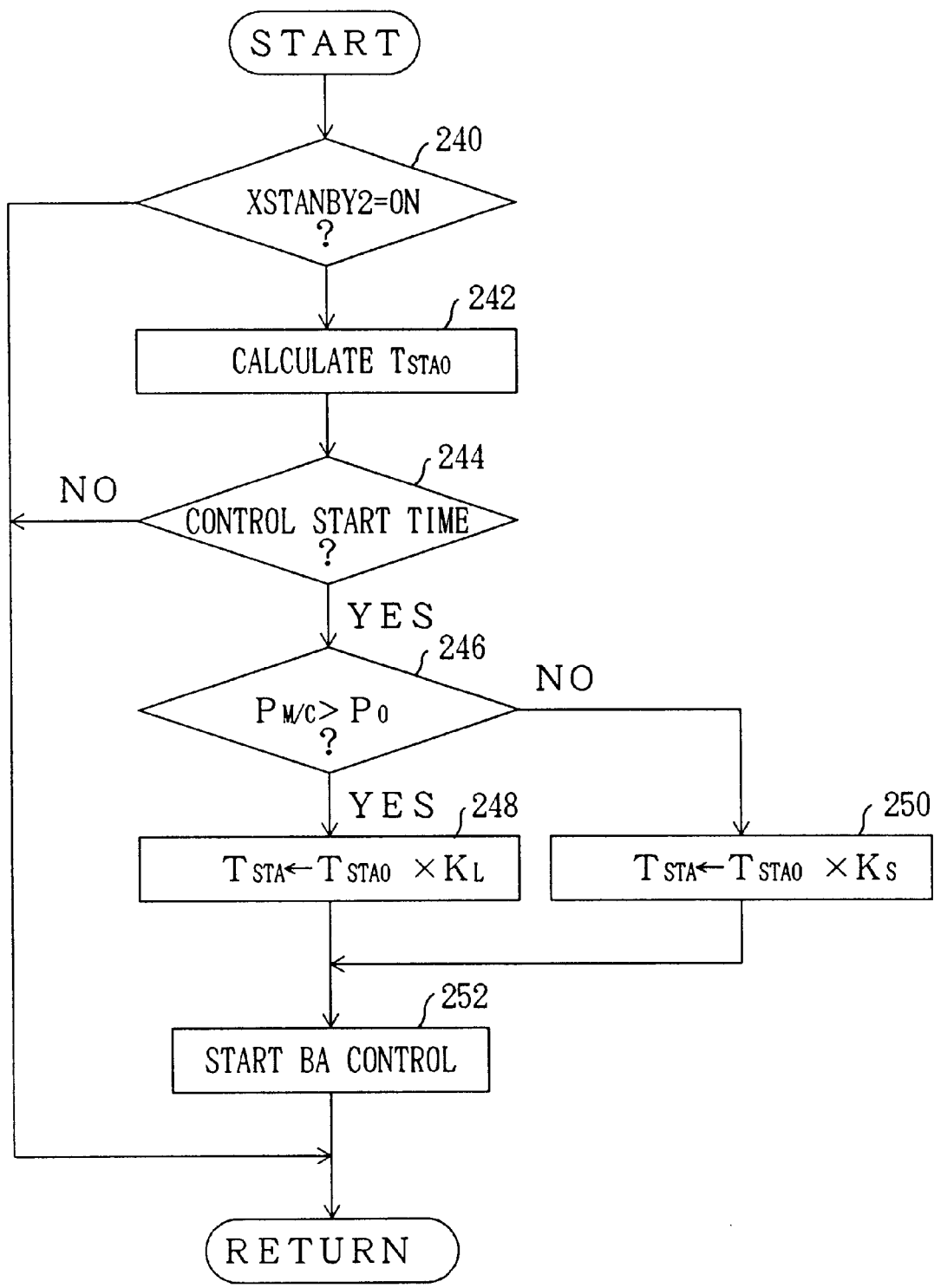
FIG. 10 is a flowchart of an example of a control routine performed to determine an establishment of a condition for starting the BA control and to calculate a pressure increasing time of a start pressurizing mode in the brake force control apparatus according to the first embodiment of the present invention.

FIG. 10 shows a flowchart of an example of a control routine performed by the ECU 10 so as to distinguish a condition for starting the BA control and calculate a pressure increasing time $T_{STA}$ of the start pressurizing mode. The routine shown in FIG. 10 is a periodic interruption routine started at every predetermined time. When the routine shown in FIG. 10 is started, the process of step 240 is performed first.

In step 240, it is determined whether or not the flag XSTANBY2 is turned on. If it is determined that XSTANBY2=ON is not established, it can be determined that the BA control is not needed to start. In this case, no process is performed thereafter, and the routine is ended. On the other hand, if it is determined that XSTANBY2=ON is established, the process of step 242 is then performed.

In step 242, a reference pressure increasing time $T_{STA0}$ which is a reference value of the pressure increasing time $T_{STA}$ is calculated. The reference pressure increasing time $T_{STA0}$ is determined based on the operating speed of the brake pedal 12 generated during a process of an emergency brake operation by referring to a map stored in the ECU 10. Specifically, the reference pressure increasing time $T_{STA0}$ is determined based on the maximum value $P_{MAX}$ of the change rate $\Delta P_{M/C}$ detected after the establishment of the condition for shifting to the first standby state.

Figure 11:
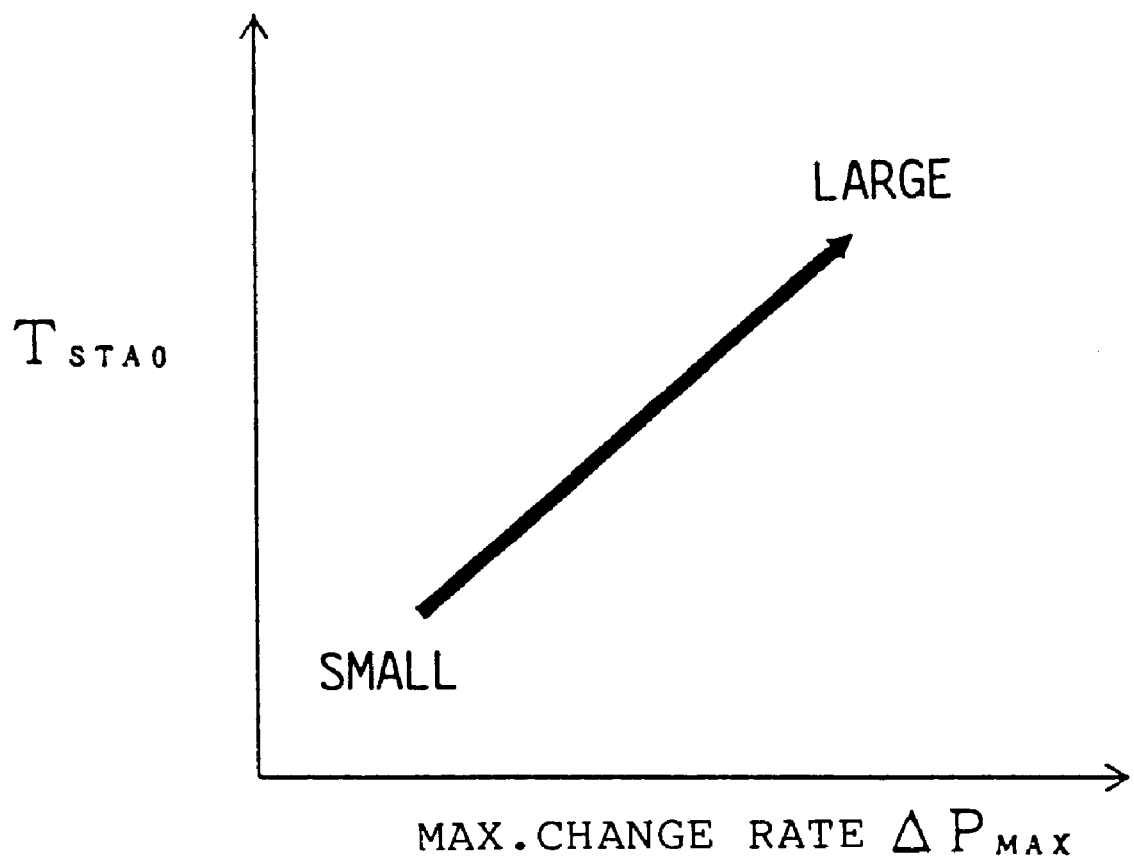
FIG. 11 is an example of a map with respect to a reference pressure increasing time $T_{STA0}$ which referred in a control routine shown in FIG. 10.
Figure 12:
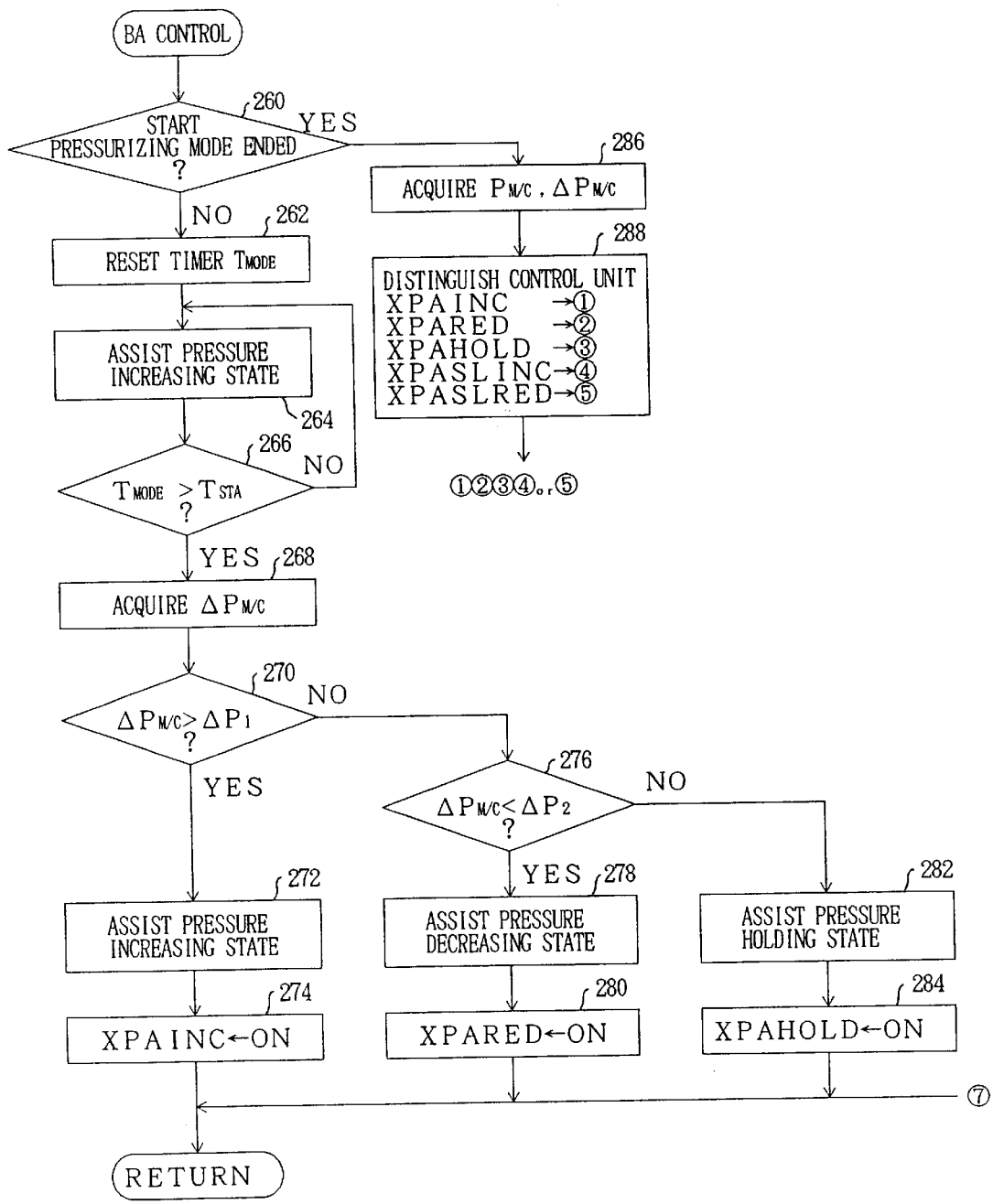
FIG. 12 is a part 1 of a flowchart of a control routine performed to achieve the BA control in the brake force control apparatus according to the first embodiment of the present invention.

FIG. 11 is an example of the map referred to in step 242. In the present embodiment, the map of the reference pressure increasing time $T_{STA0}$ is set so that the reference pressure increasing time $T_{STA0}$ is increased as the maximum value $P_{MAX}$ of the change rate $\Delta P_{M/C}$ is increased. Accordingly, the reference pressure increasing time $T_{STA0}$ is increased as the operating speed of the brake pedal is increased. When the above process is completed, the process of step 244 is then performed.

In step 244, it is determined whether or not a time for starting the BA control is reached. As mentioned above, in the present embodiment, after an emergency brake operation is performed, the BA control is performed when a condition is established in which use of the accumulator 28 as a fluid pressure source is advantageous over use of the hydro-booster 36 as a fluid pressure source for increasing the wheel cylinder pressure $P_{W/C}$. That is, the BA control is started when the difference Pdiff between the master cylinder pressure $P_{M/C}$ and the wheel cylinder pressure $P_{W/C}$ becomes a sufficiently small value. In step 244, it is determined whether or not such a time is reached. If it is determined that the time for starting the BA control has not been reached, no process is performed thereafter, and the routine is ended. On the other hand, if it is determined that the time for starting the BA control is reached, the process of step 246 is performed.

In step 246, it is determined whether or not the master cylinder pressure $P_{M/C}$ is greater than a predetermined pressure $P_0$. After the BA control is started, the wheel cylinder pressure $P_{W/C}$ is increased by using the accumulator 28 as a fluid pressure source. The change rate $\Delta P_{W/C}$ generated when the wheel cylinder pressure $P_{W/C}$ is increased by using the accumulator as a pressure fluid source is deceased as the pressure difference between the wheel cylinder pressure $P_{W/C}$ and the accumulator pressure $P_{ACC}$ is decreased. Accordingly, after the BA control is started, in order to generate the assist pressure Pa by setting the start pressurizing mode, the longer the pressure increasing time $T_{STA}$ must be, the higher the wheel cylinder pressure $P_{W/C}$ at the start time of the BA control.

In step 246, if it is determined that $P_{M/C}>P_0$ is established, it can be determined that the wheel cylinder pressure $P_{W/C}$ generated at the start time of the BA control is high. In this case, the process of step 248 is performed so as to increase the pressure increasing time $T_{STA}$ to be a long time. On the other hand, if it is determined that $P_{M/C}>P_0$ is not established, it can be determined that the wheel cylinder pressure $P_{W/C}$ generated at the start time of the BA control is low. In this case, the process of step 250 is performed so as to increase the pressure decrease time $T_{STA}$ to be a short time.

In step 248, the pressure increasing time $T_{STA}$ is calculated by multiplying the reference pressure increasing time $T_{STA0}$ calculated in step 242 by a correction factor $K_L$. The correction factor $K_L$ is a factor which is previously prepared to set the pressure increasing time $T_{STA}$ to be a long time.

In step 250, the pressure increasing time $T_{STA}$ is calculated by multiplying the reference pressure increasing time $T_{STA0}$ calculated in step 242 by a correction factor $K_S$. The correction factor $K_S$ is a factor which is previously prepared to set the pressure increasing time $T_{STA}$ to be a short time. After the process of step 248 or step 250 is completed, the process of step 250 is performed.

In step 252, a process for turning off the flag XSTANBY2 is performed and a process for permitting a start of the BA control is performed. When the process of step 252 is performed, thereafter execution of the BA control is enabled. After the process of step 252 is completed, the routine is ended.

FIGS. 12 to 18 show parts of a flowchart of an example of a control routine performed by the ECU 10 to achieve the BA function in the brake force control apparatus. This routine is repeatedly performed after execution of the BA control is permitted in step 252. When the present routine is started, the process of step 260 is performed first.

In step 260, after the BA control is started, it is determined whether or not the (I) start pressurizing mode is ended. If it is determined that the (I) start pressurizing mode has not been ended, the process of step 262 is performed.

In step 262, a timer $T_{MODE}$ is reset. The timer $T_{MODE}$ is a timer which continuously counts up toward a predetermined upper limit value. In the present routine, the timer $T_{MODE}$ is used for counting a continuation time of each of the control modes for achieving the BA function. After the process of step 262 is completed, then, the process of step 264 is performed.

In step 264, a process is performed for setting the brake force control apparatus in the assist pressure increasing state shown in FIG. 4. After the process of step 264 is performed, the wheel cylinder pressure $P_{W/C}$ of each of the wheels starts to increase with a predetermined change rate by using the accumulator 28 as a fluid pressure source. After the process of step 264 is completed, the process of step 266 is then performed.

In step 266, it is determined whether or not the count value of the timer $T_{MODE}$ exceeds the pressure increasing time $T_{STA}$ calculated in step 248 or step 250. If it is determined that $T_{MODE}>T_{STA}$ is not established, the process of step 264 is repeated. According to the above process, after the BA control is started and until the pressure increasing time $T_{STA}$ is passed, the brake force control apparatus can be maintained in the assist pressure increasing state. In the present embodiment, the process of steps 260 to 266 achieves the (I) start pressurizing start mode.

As mentioned above, the pressure increasing time $T_{STA}$ is increased to be a longer time as the operating speed of the brake pedal 12 is increased to be a higher speed in a process of an emergency brake operation, that is, as the emergency brake operation requires a more rapid increase in the brake force. Additionally, the pressure increasing time $T_{STA}$ is corrected based on the master cylinder pressure $P_{M/C}$ at the start time of the BA control by considering a pressure increasing slope of the wheel cylinder pressure $P_{W/C}$ during execution of the (I) start pressurizing mode. Thus, according to the brake force control apparatus of the present embodiment, the assist pressure Pa to which a driver's intention is accurately reflected can be generated by setting the (I) start pressurizing mode.

Although, in the present embodiment, the driver's intention is reflected tot he assist pressure Pa by setting, if necessary, the pressure increasing time $T_{STA}$ of the (I) start pressurizing mode, a method for reflecting the driver's intention to the assist pressure Pa is not limited to abovementioned method. That is, the driver's intention may be reflected to the assist pressure Fa by pressure increasing slope of the wheel cylinder pressure $P_{W/C}$ in association with execution of the (I) start pressurizing mode based on the operating speed of the brake operation generated in a process of an emergency brake operation.

In the brake force control apparatus according to the present embodiment, when the pressure increasing time $T_{STA}$ is passed after the (I) start pressurizing mode is started, it is determined, in step 266, that $T_{MODE}>T_{STA}$ is established. In this case, the process of step 268 and subsequent steps is performed so as to end the (I) start pressurizing mode and start another control mode.

Figure 19:
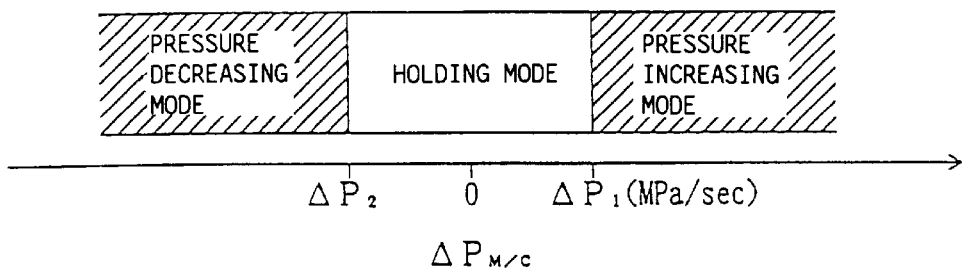
FIG. 19 is an illustration of a table indicating a control mode to be performed subsequent to a start pressurizing mode when the BA control is performed in the brake force control apparatus according to the first embodiment of the present invention.

FIG. 19 shows an illustration for indicating a table representing a control mode performed subsequent to the (I) start pressurizing mode in relation to the change rate $\Delta P_{M/C}$ at an end time of the (I) start pressurizing mode. This table is hereinafter referred to as a start pressurizing end time table. In the present embodiment, a control mode which is set subsequent to the (I) start pressurizing mode is determined in accordance with the start pressurizing end time table shown in FIG. 19.

In step 268, the change rate $\Delta P_{M/C}$ generated in the master cylinder pressure $P_{M/C}$ at the end time of the (I) start pressurizing mode is acquired.

In step 270, it is determined whether or not the thus acquired change rate $\Delta P_{M/C}$ exceeds a predetermined positive value $P_1$. If it is determined that $\Delta P_{M/C}>\Delta P_1$ (>0) is established, it can be determined that an increase of the brake force is requested by the driver. In this case, the control mode subsequent to the start pressurizing mode is determined to be the (II) assist pressure increasing mode, and then the process of step 272 is performed.

In step 272, a process for setting the brake force control apparatus in the assist pressure increasing state shown in FIG. 4 is performed so as to start the (II) assist pressure increasing mode. After the process of step 272 is performed, the wheel cylinder pressure $P_{W/C}$ of each wheel is rapidly increased by using the accumulator 28 as a fluid pressure source. After the process of step 272 is completed, the process of step 274 is performed.

In step 274, a flag XPAINC is turned on so as to indicate that the control mode currently performed is the (II) assist pressure increasing mode. After the process of step 274 is completed, the routine is ended.

If it is determined, in step 270, that $\Delta P_{M/C}>\Delta P_1$ is not established, the process of step 276 is performed.

In step 276, it is determined whether or not the change rate $\Delta P_{M/C}$ acquired in step 268 is less than a negative predetermined value $\Delta P_2$. If it is determined that $\Delta P_{M/C}<\Delta P_2$ (<0) is established, it can be determined that a request is made by the driver to decrease the brake force. In this case, the control mode subsequent to the (I) start pressurizing mode is determined to be the (III) assist pressure increasing mode, and the process of step 78 is performed.

In step 278, in order to start the (III) assist pressure decreasing mode, the a process is performed for setting the brake force control apparatus in the assist pressure decreasing state shown in FIG. 6. After the process of step 278 is performed, the wheel cylinder pressure $P_{W/C}$ of each wheel is decreased down to the master cylinder pressure $P_{M/C}$ as a lower limit. After the process of step 278 is completed, the process of step 280 is then performed.

In step 280, a flag XPARED is turned on so as to indicate that the control mode currently performed is the (III) assist pressure decreasing mode. After the process of step 280 is completed, the routine is ended.

If it is determined, in step 276, that $\Delta P_{M/C}<\Delta P_2$ is not established, that is, if it is determined that the change rate $\Delta P_{M/C}$ is maintained near "0" when the start pressurizing mode is completed, it can be determined that a request is made by the driver to maintain the brake force. In this case, the process of step 282 is performed.

In step 282, in order to start the (IV) assist pressure holding mode, the a process is performed for setting the brake force control apparatus in the assist pressure decreasing state shown in FIG. 5. After the process of step 282 is performed, the wheel cylinder pressure $P_{W/C}$ of each wheel is maintained without being increased or decreased. After the process of step 278 is completed, the process of step 284 is then performed.

In step 284, a flag XPAHOLD is turned on so as to indicate that the control mode currently performed is the (IV) assist pressure decreasing mode. After the process of step 284 is completed, the routine is ended.

After the process of steps 260 to 284 is performed and when the present routine is started again, it is determined, in step 260, that the (I) start pressurizing mode has already been completed. In this case, the process of step 286 is performed subsequent to step 260.

In step 286, the master cylinder pressure $P_{M/C}$ currently generated in the system and the change rate $\Delta P_{M/C}$ is acquired. After the process of step 286 is completed, the process of step 288 is performed.

Figure 13:
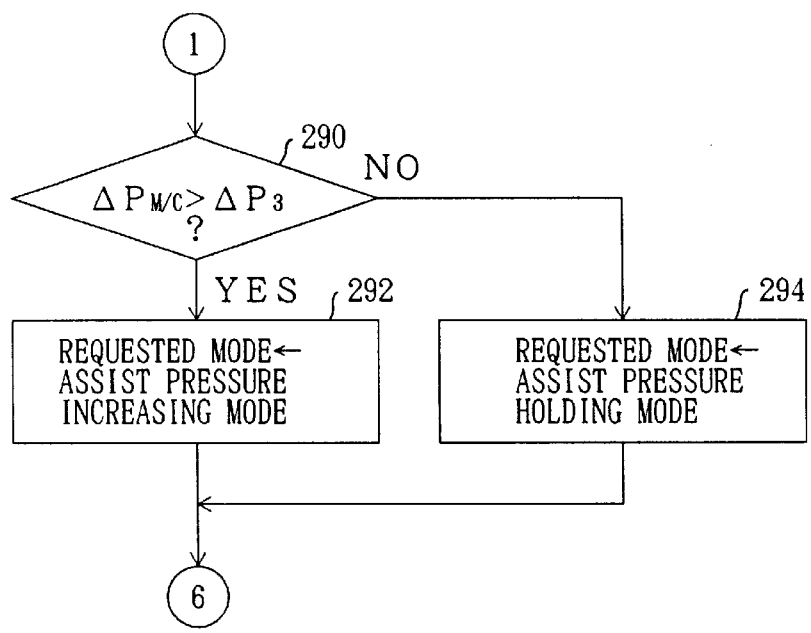
FIG. 13 is a part 2 of a flowchart of a control routine performed to achieve the BA control in the brake force control apparatus according to the first embodiment of the present invention.

In step 288, it is determined which control mode is currently performed in the brake force control apparatus. In step 288, if the flag XPAINC is turned on, it is determined that the control mode currently performed is the (II) assist pressure increasing mode. In this case, the process of step 290 shown in FIG. 13 is performed subsequent to step 288.

Figure 20:
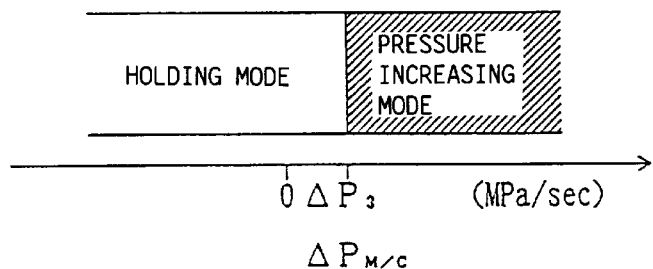
FIG. 20 is an illustration of a table indicating a control mode to be performed subsequent to an assist pressure increasing mode when the BA control is performed in the brake force control apparatus according to the first embodiment of the present invention.

FIG. 20 shows an illustration for indicating a table representing a control mode performed subsequent to the currently performed mode when the currently performed control mode is the assist pressure increasing mode in relation to the change rate $\Delta P_{M/C}$ of the master cylinder pressure $P_{M/C}$. This table is hereinafter referred to as a pressure increasing time table. In the present embodiment, a control mode which is set subsequent to the (II) assist pressure increasing mode is determined in accordance with the pressure increasing time table shown in FIG. 20 in the process of step 290 and subsequent steps.

In step 290, it is determined whether or not the change rate $\Delta P_{M/C}$ exceeds a predetermined positive value $\Delta P_3$. If it is determined that $\Delta P_{M/C}>\Delta P_3$ (>0) is established, it can be determined that an increase of the brake force is requested by the driver. In this case, the process of step 292 is performed subsequent to step 290. On the other hand, if it is determined that the change rate $\Delta P_{M/C}$ satisfying the above-mentioned condition is not generated, it can be determined that a request is made by the driver to maintain the brake force. In this case, the process of step 294 is performed subsequent to step 290.

In step 292, in order to enable a further increase in the brake force, a process is performed for requesting a continuous execution of the (II) assist pressure increasing mode, that is, for setting the (II) assist pressure increasing mode as a requested mode.

Figure 18:
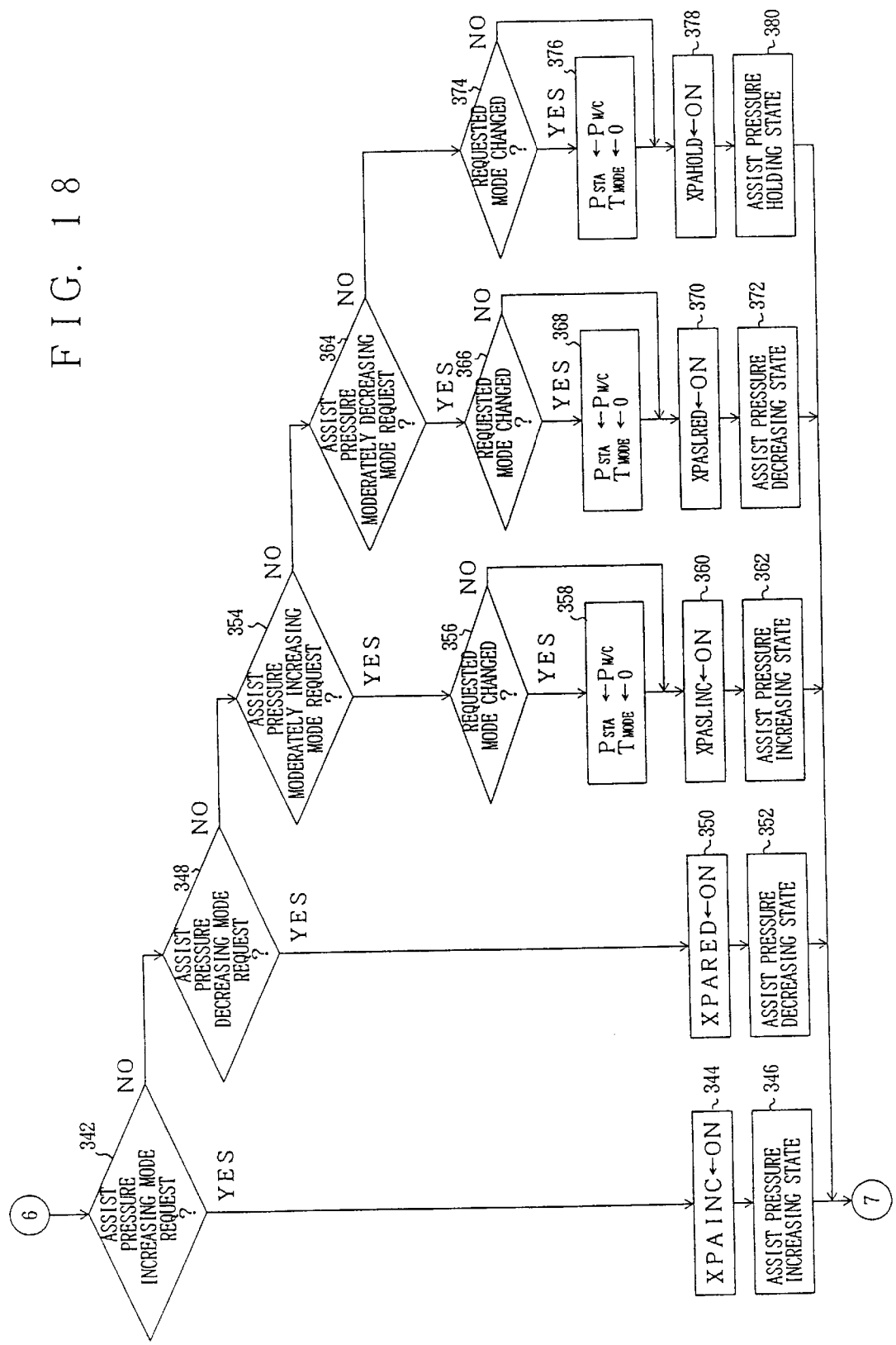
FIG. 18 is a part 7 of a flowchart of a control routine performed to achieve the BA control in the brake force control apparatus according to the first embodiment of the present invention.

In step 294, in order to enable holding of the brake force, a process is performed for requesting execution of the (IV) assist pressure holding mode, that is, for setting the (IV) assist pressure holding mode as a requested mode. After the process of step 292 or step 294, the process of step 342 shown in FIG. 18 is performed.

Figure 14:
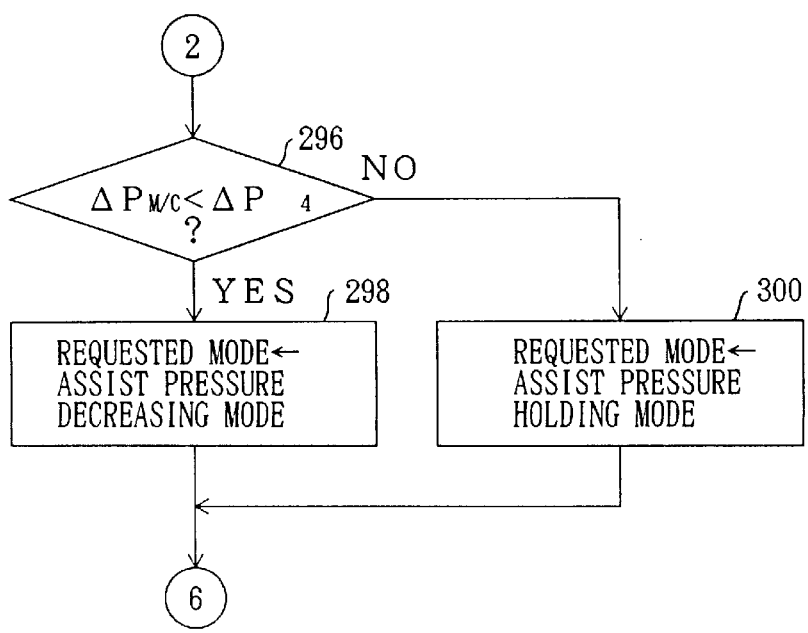
FIG. 14 is a part 3 of a flowchart of a control routine performed to achieve the BA control in the brake force control apparatus according to the first embodiment of the present invention.

In the present routine, if it is determined, instep 288, that the flag PARED is turned on, it is determined that the control mode currently performed is the (III) assist pressure decreasing mode. In this case, the process of step 296 shown in FIG. 14 is performed subsequent to step 288.

Figure 21:
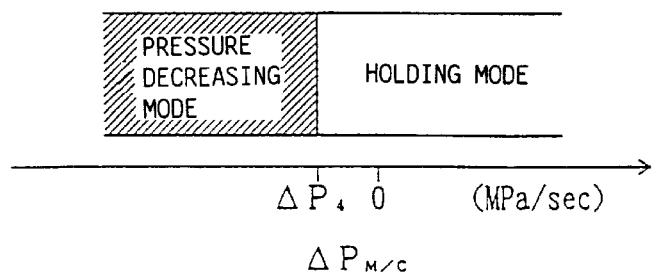
FIG. 21 is an illustration of a table indicating a control mode to be performed subsequent to an assist pressure decreasing mode when the BA control is performed in the brake force control apparatus according to the first embodiment of the present invention.

FIG. 21 shows an illustration for indicating a table representing a control mode performed subsequent to the currently performed mode when the currently performed control mode is the (III) assist pressure decreasing mode in relation to the change rate $\Delta P_{M/C}$ of the master cylinder pressure $P_{M/C}$. This table is hereinafter referred to as a pressure decreasing time table. In the present embodiment, a control mode which is set subsequent to the (III) assist pressure decreasing mode is determined in accordance with the pressure decreasing time table shown in FIG. 21 in the process of step 296 and subsequent steps.

In step 296, it is determined whether or not a change rate $\Delta P_{M/C}$ below a predetermined negative value $\Delta P_4$ is generated in the master cylinder pressure $P_{M/C}$. If it is determined that $\Delta P_{M/C} > \Delta P_4$ (>0) is established, it can be determined that a decrease of the brake force is requested by the driver. In this case, the process of step 298 is performed subsequent to step 296. On the other hand, if it is determined that the change rate $\Delta P_{M/C}$ satisfying the above-mentioned condition is not generated, it can be determined that a request is made by the driver to maintain the brake force. In this case, the process of step 300 is performed subsequent to step 296.

In step 298, in order to enable a further decrease in the brake force, a process is performed for requesting a continuous execution of the (III) assist pressure decreasing mode, that is, for setting the (III) assist pressure decreasing mode as a requested mode.

In step 300, in order to enable holding of the brake force, a process is performed for requesting execution of the (IV) assist pressure holding mode, that is, for setting the (IV) assist pressure holding mode as a requested mode. After the process of step 298 or step 300, the process of step 342 shown in FIG. 18 is performed.

Figure 15:
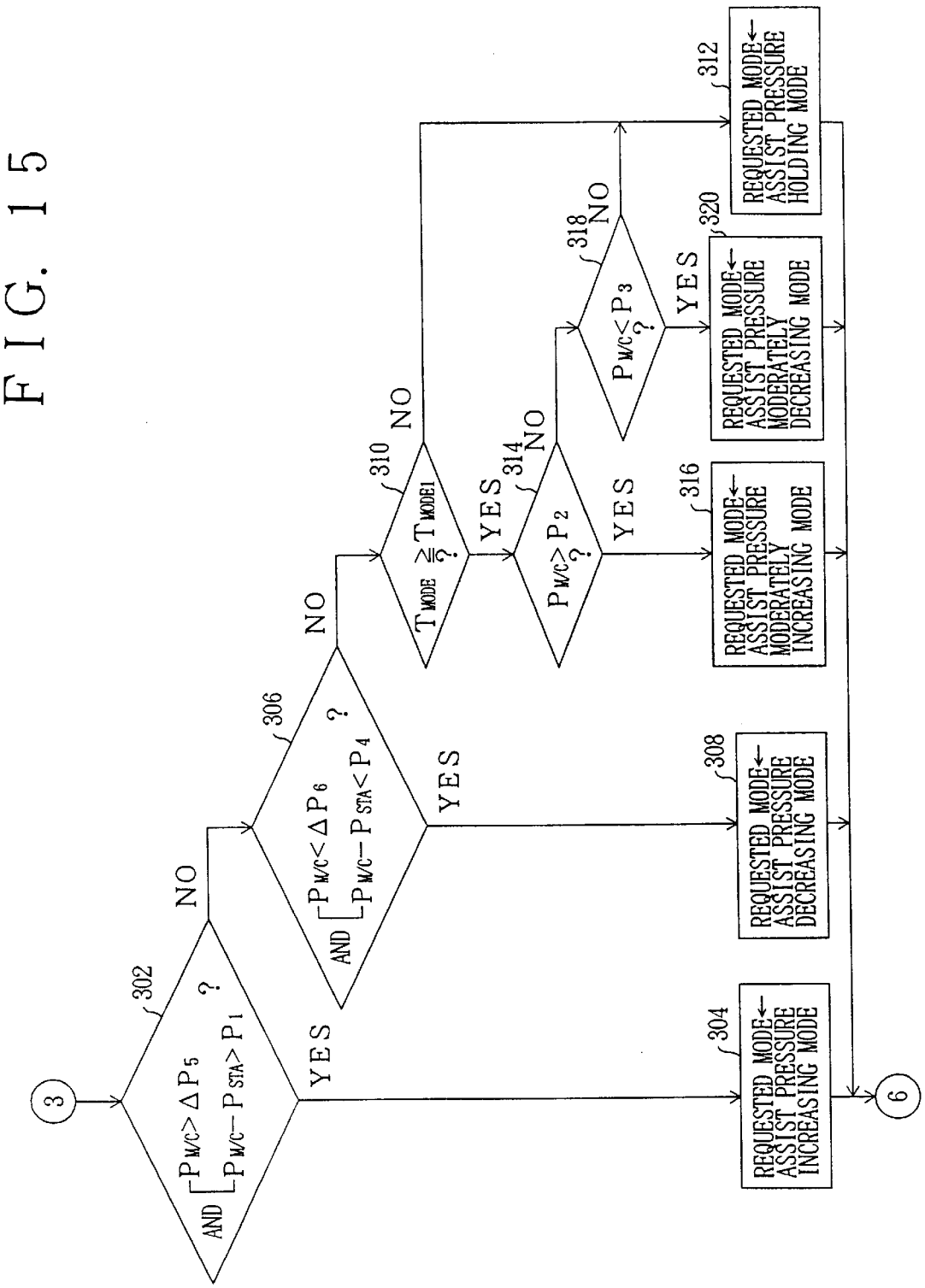
FIG. 15 is a part 4 of a flowchart of a control routine performed to achieve the BA control in the brake force control apparatus according to the first embodiment of the present invention.

In the present routine, if it is determined, in step 288, that the flag XPAHOLD is turned on, it is determined that the control mode currently performed is the (IV) assist pressure holding mode. In this case, the process of step 302 shown in FIG. 15 is performed subsequent to step 288.

Figure 22:
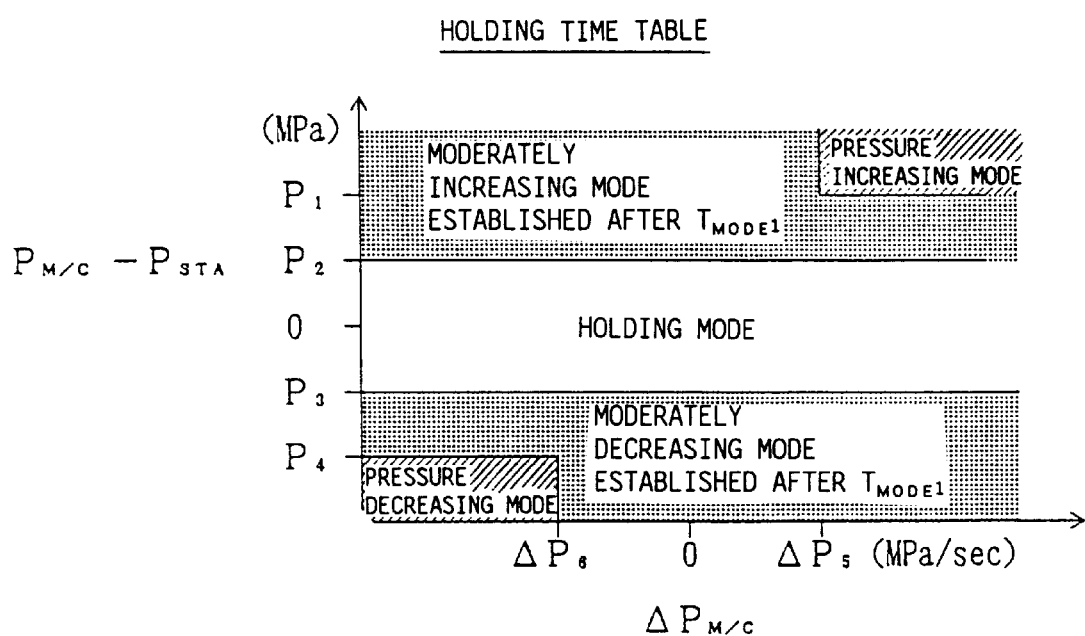
FIG. 22 is an illustration of a table indicating a control mode to be performed subsequent to an assist pressure holding mode when the BA control is performed in the brake force control apparatus according to the first embodiment of the present invention.

FIG. 22 shows an illustration for indicating a table representing a control mode performed subsequent to the currently performed mode when the currently performed control mode is the assist pressure holding mode in relation to 1) the change rate $\Delta P_{M/C}$ of the master cylinder pressure $P_{M/C}$ and 2) an amount of change "$P_{M/C}-P_{STA}$" of the master cylinder pressure $P_{M/C}$. This table is hereinafter referred to as a holding time table. In the present embodiment, a control mode which is set subsequent to the (IV) assist pressure holding mode is determined in accordance with the holding time table shown in FIG. 22 in the process of step 302 and subsequent steps. It should be noted that the amount of change "$P_{M/C}-P_{STA}$" shown in FIG. 22 corresponds to a difference between the current master cylinder pressure $P_{M/C}$ and the master cylinder pressure $P_{M/C}$ detected at the start time of the currently performed control mode, that is, an amount of change generated in the master cylinder pressure $P_{M/C}$ after the current control mode is started.

In step 302, it is determined whether or not a change rate $\Delta P_{M/C}$ exceeding a predetermined positive value $P_5$ is generated in the master cylinder pressure $P_{M/C}$, and whether or not the amount of change "$P_{M/C}-P_{STA}$" exceeding the predetermined positive value $P_1$, is generated. If it is determined that $\Delta P_{M/C} > \Delta P_5$ (>0) is established and "$P_{M/C}-P_{STA}$">$P_1$ (>0) is established, it can be determined that a rapid increase of the brake force is requested by the driver who has intended to maintain the brake force. In this case, the process of step 304 is performed subsequent to step 302.

In step 304, in order to enable a rapid increase in the brake force, a process is performed for requesting execution of the (II) assist pressure increase mode, that is, for setting the (II) assist pressure increasing mode as a requested mode. After the process of step 304 is completed, the process of step 342 shown in FIG. 18 is performed.

On the other hand, if the condition of step 302 is not established, it can be determined that the driver does not intend to rapidly increase the brake force. In this case, the process of step 306 is performed.

In step 306, it is determined whether or not a change rate $\Delta P_{M/C}$ below a predetermined negative value $\Delta P_6$ is generated in the master cylinder pressure $P_{M/C}$, and whether or not the amount of change "$P_{M/C}-P_{STA}$" below the predetermined negative value $P_4$ is generated. If it is determined that $\Delta P_{M/C} < \Delta P_6$ (>0) is established and "$P_{M/C}-P_{STA}$"<$P_4$ (<0) is established, it can be determined that a rapid decrease of the brake force is requested by the driver who has intended to maintain the brake force. In this case, the process of step 308 is performed subsequent to step 306.

In step 308, in order to enable a rapid decrease in the brake force, a process is performed for requesting execution of the (III) assist pressure decreasing mode, that is, for setting the (III) assist pressure decreasing mode as a requested mode. After the process of step 308 is completed, the process of step 342 shown in FIG. 18 is performed.

On the other hand, if the condition of step 306 is not established, it can be determined that the driver does not intend to rapidly decrease the brake force. In this case, the process of step 310 is performed.

In step 310, it is determined whether or not the count value of the timer $T_{MODE}$ reaches a predetermined time $T_{MODE1}$. The predetermined time $T_{MODE1}$ is a value substantially equal to an upper limit value for a time needed for the amount of change $P_{M/C}-P_{STA}$ becoming the predetermined value $P_1$ or less than the predetermined value $P_4$ when the driver operates the brake pedal 12 so as to intend to rapidly change the brake force. Accordingly, if $T_{MODE} \geq T_{MODE1}$ is not established, a possibility of brake operation which intends to rapidly change the brake force cannot be neglected. In such a case, the process of step 312 is performed.

In step 312, the process is performed for requesting a continuous execution of the (IV) assist pressure holding mode, that is, for setting the (IV) assist pressure holding mode as a requested mode. After the process of step 312 is completed, the process of step 342 shown in FIG. 18 is performed.

If it is determined, in step 310, that $T_{MODE} \geq T_{MODE1}$ is not established in a condition in which both the condition of step 302 and the condition of step 306 are not established, it can be determined that a brake operation which intends to rapidly change the brake force is not performed by the driver. In this case, the process of step 314 is performed subsequent to step 310.

In step 314, it is determined whether or not the amount of change $P_{M/C}-P_{STA}$ exceeding the predetermined positive value $P_2$ is generated in the master cylinder pressure $P_{M/C}$. As a result, if it is determined that $P_{M/C}-P_{STA} > P_2$ (>0) is established, it can be determined that a rapid increase of the brake force is requested by the driver who has intended to maintain the brake force. In this case, the process of step 316 is performed subsequent to step 314.

In step 316, in order to enable a rapid increase in the brake force, a process is performed for requesting execution of the (V) assist pressure moderately increasing ode, that is, for setting the (V) assist pressure moderately increasing mode as a requested mode. After the process of step 316 is completed, the process of step 342 shown in FIG. 18 is performed.

On the other hand, if the condition of step 314 s not established, it can be determined that the driver is not requesting execution of the (V) assist pressure moderately increasing mode. In this case, the process of step 318 is performed subsequent to step 314.

In step 320, in order to enable a rapid decrease in the brake force, a process is performed for requesting execution of the (VI) assist pressure moderately decreasing mode, that is, for setting the (VI) assist pressure moderately decreasing mode as a requested mode. After the process of step 320 is completed, the process of step 342 shown in FIG. 18 is performed.

On the other hand, if the condition of step 318 is not established, it can be determined that the driver intends to maintain the brake force, that is, the driver is requesting a continuous execution of the (IV) assist pressure holding mode. In this case, the process of step 312 is performed subsequent to step 318.

Figure 16:
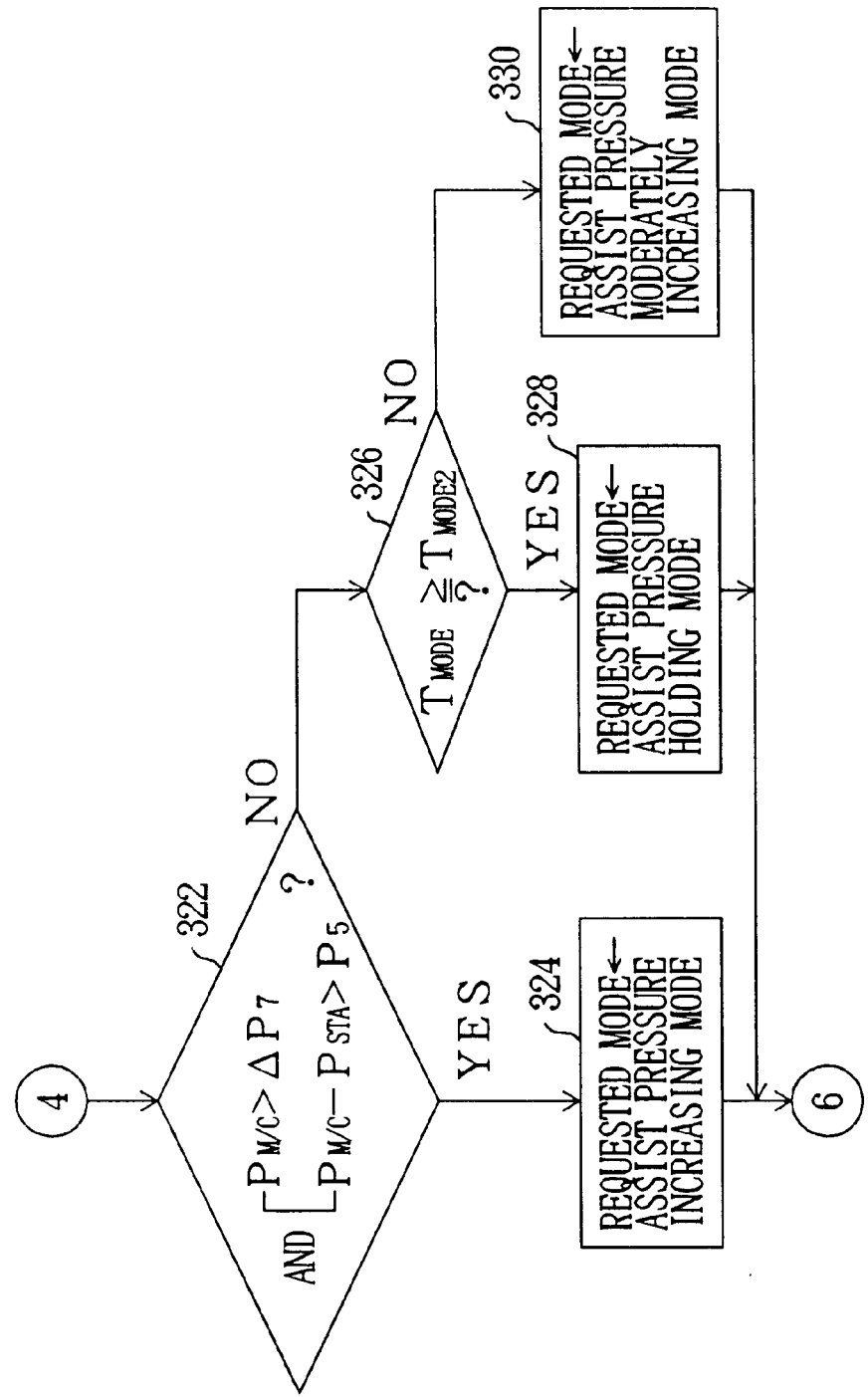
FIG. 16 is a part 5 of a flowchart of a control routine performed to achieve the BA control in the brake force control apparatus according to the first embodiment of the present invention.

In the present routine, if it is determined, in step 288, that a flag XPASLINC is turned on, it is determined that the currently performed control mode is the (V) assist pressure moderately increasing mode. In this case, the process of step 322 shown in FIG. 16 is performed subsequent to step 288. It should be noted that the flag XPASLINC is a flag which is turned on when the (V) assist pressure moderately increasing mode is selected as the control mode, as described later.

Figure 23:
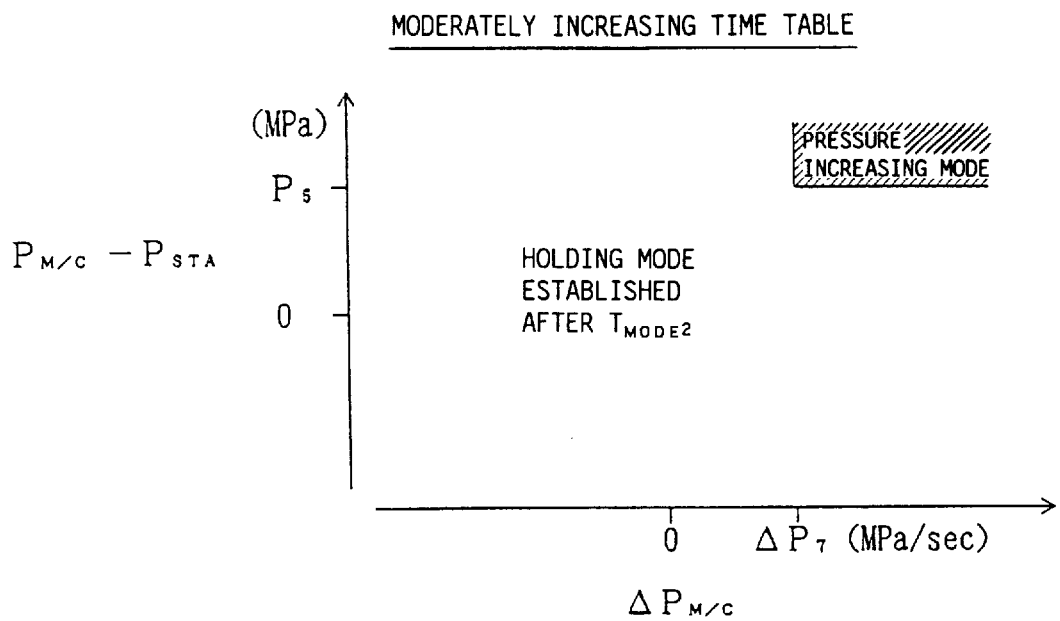
FIG. 23 is an illustration of a table indicating a control mode to be performed subsequent to an assist pressure moderately increasing mode when the BA control is performed in the brake force control apparatus according to the first embodiment of the present invention.

FIG. 23 shows an illustration for indicating a table representing a control mode performed subsequent to the currently performed mode, when the currently performed control mode is the assist pressure moderately increasing mode, in relation to 1) the change rate $\Delta P_{M/C}$ of the master cylinder pressure $P_{M/C}$ and 2) an amount of change "$P_{M/C}-P_{STA}$" of the master cylinder pressure $P_{M/C}$. This table is hereinafter referred to as a moderately increasing time table. In the present embodiment, a control mode which is set subsequent to the (V) assist pressure moderately increasing mode is determined in accordance with the holding time table shown in FIG. 23 in the process of step 322 and subsequent steps.

In step 322, it is determined whether or not a change rate $\Delta P_{M/C}$ exceeding a predetermined positive value $\Delta P_7$ is generated in the master cylinder pressure $P_{M/C}$, and whether or not the amount of change "$P_{M/C}-P_{STA}$" exceeding the predetermined positive value $P_5$ is generated. If it is determined that $\Delta P_{M/C} > \Delta P_7$ (>0) is established and "$P_{M/C}-P_{STA}$">$P_5$ (>0) is established, it can be determined that a rapid increase of the brake force is requested by the driver who has intended to moderately increase the brake force. In this case, the process of step 324 is performed subsequent to step 322.

In step 324, in order to enable a rapid increase in the brake force, a process is performed for requesting execution of the (II) assist pressure increasing mode, that is, for setting the (II) assist pressure increasing mode as a requested mode. After the process of step 324 is completed, the process of step 342 shown in FIG. 18 is performed.

On the other hand, if the condition of step 322 is not established, it can be determined that the driver does not intend to rapidly increase the brake force. In this case, the process of step 326 is performed.

In step 326, it is determined whether or not the count value of the timer $T_{MODE}$ reaches a predetermined time $T_{MODE2}$. In the brake force control apparatus according to the present embodiment, the (V) assist pressure moderately increasing mode is achieved by alternatively repeating the assist pressure increasing state shown in FIG. 4 and the assist pressure holding state shown in FIG. 5. The predetermined time $T_{MODE2}$ is set to a period during which the brake force control apparatus should be maintained in the assist pressure increasing state when execution of the (V) assist pressure moderately increasing mode is requested.

Accordingly, if it is determined, in step 326, that $T_{MODE} \geq T_{MODE2}$ is established, it can be determined that the period for maintaining the brake force control apparatus being set in the assist pressure increasing state has ended, that is, a time for setting the brake force control apparatus in the assist pressure maintaining state has been reached. In this case, the process of step 328 is performed subsequent to step 326.

In step 328, the process is performed for requesting a continuous execution of the (IV) assist pressure holding mode, that is, for setting the (IV) assist pressure holding mode as a requested mode. After the process of step 328 is completed, the process of step 342 shown in FIG. 18 is performed.

On the other hand, if it is determined, in step 326, that $T_{MODE} \geq T_{MODE2}$ is not established, the period for maintaining the brake force control apparatus in the assist pressure increasing state has not ended. In this case, the process of step 330 is performed subsequent to step 326.

In step 330, a process is performed for requesting execution of the (V) assist pressure moderately increasing mode, that is, for setting the (V) assist pressure moderately increasing mode as a requested mode. After the process of step 330 is completed, the process of step 342 shown in FIG. 18 is performed. According to the above-mentioned process, when the condition for requesting the (II) assist pressure increasing mode (the condition of step 322) is not established after execution of the (V) assist pressure moderately increasing mode is requested, the requested mode can be changed to (IV) assist pressure holding mode after the request is maintained for the predetermined time $T_{MODE2}$.

Figure 17:
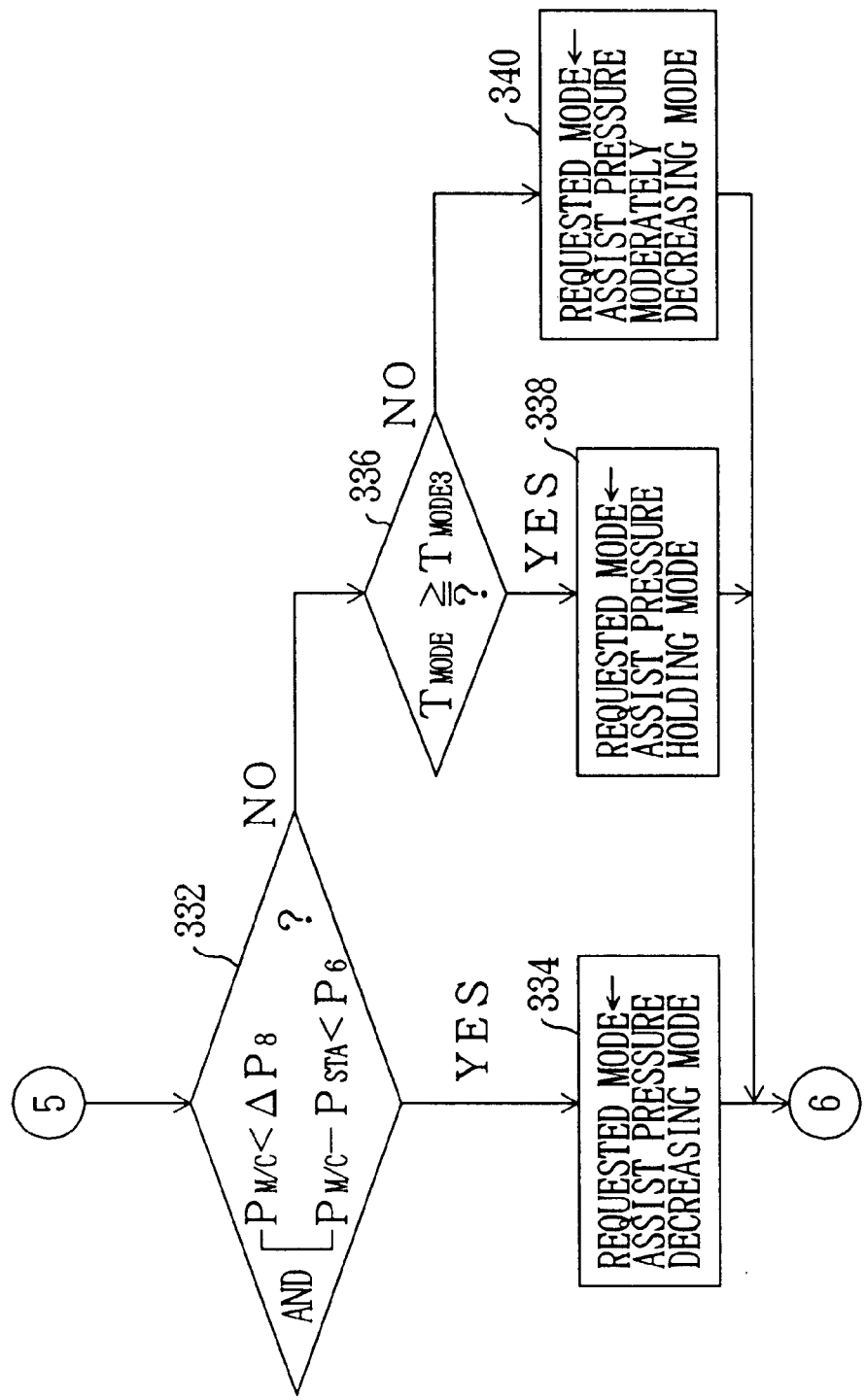
FIG. 17 is a part 6 of a flowchart of a control routine performed to achieve the BA control in the brake force control apparatus according to the first embodiment of the present invention.

In the present routine, if it is determined, in step 288, that a flag XPASLRED is turned on, it is determined that the currently performed control mode is the (VI) assist pressure moderately decreasing mode. In this case, the process of step 332 shown in FIG. 17 is performed subsequent to step 288. It should be noted that the flag XPASLRED is a flag which is turned on when the (VI) assist pressure moderately decreasing mode is selected as the control mode, as described later.

Figure 24:
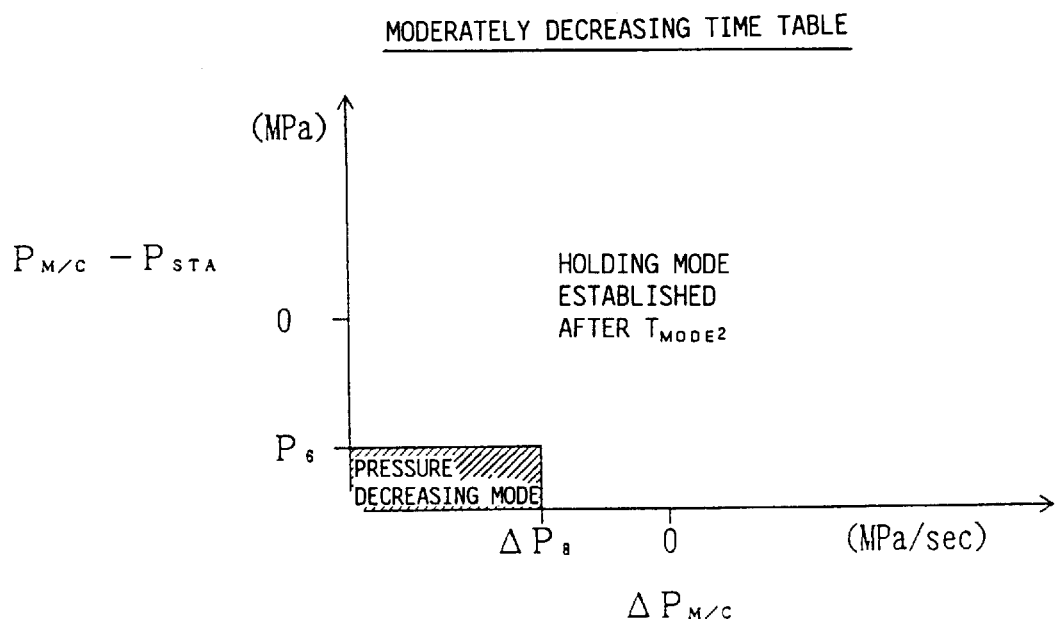
FIG. 24 is an illustration of a table indicating a control mode to be performed subsequent to an assist pressure moderately decreasing mode when the BA control is performed in the brake force control apparatus according to the first embodiment of the present invention.

FIG. 24 shows an illustration for indicating a table representing a control mode performed subsequent to the currently performed mode, when the currently performed control mode is the (VI) assist pressure moderately decreasing mode, in relation to 1) the change rate $\Delta P_{M/C}$ of the master cylinder pressure $P_{M/C}$ and 2) an amount of change "$P_{M/C}-P_{STA}$" of the master cylinder pressure $P_{M/C}$. This table is hereinafter referred to as a moderately decreasing time table. In the present embodiment, a control mode which is set subsequent to the (VI) assist pressure moderately decreasing mode is determined in accordance with the moderately decreasing time table shown in FIG. 24 in the process of step 332 and subsequent steps.

In step 332, it is determined whether or not a change rate $\Delta P_{M/C}$ less than a predetermined negative value $\Delta P_8$ is generated in the master cylinder pressure $P_{M/C}$, and whether or not the amount of change "$P_{M/C}-P_{STA}$" exceeding the predetermined negative value $P6$ is generated. If it is determined that $\Delta P_{M/C} < \Delta P_8$ (<0) is established and "$P_{M/C}-$ $P_{STA}"<P_6$ (<0) is established, it can be determined that a rapid decrease of the brake force is requested by the driver who has intended to moderately increase the brake force. In this case, the process of step 334 is performed subsequent to step 332.

In step 334, in order to enable a rapid increase in the brake force, a process is performed for requesting execution of the (III) assist pressure decreasing mode, that is, for setting the (II) assist pressure decreasing mode as a requested mode. After the process of step 334 is completed, the process of step 342 shown in FIG. 18 is performed.

On the other hand, if the condition of step 322 is not established, it can be determined that the driver does not intend to rapidly decrease the brake force. In this case, the process of step 336 is performed.

In step 336, it is determined whether or not the count value of the timer $T_{MODE}$ reaches a predetermined time $T_{MODE3}$. In the brake force control apparatus according to the present embodiment, the (VI) assist pressure moderately decreasing mode is achieved by alternatively repeating the assist pressure decreasing state and the assist pressure holding state. The predetermined time $T_{MODE3}$ is set to a period during which the brake force control apparatus should be maintained in the assist pressure decreasing state when execution of the (VI) assist pressure moderately decreasing mode is requested.

Accordingly, if it is determined, in step 336, that $T_{MODE} \geq T_{MODE3}$ is established, it can be determined that the period for maintaining the brake force control apparatus in the assist pressure decreasing state has ended, that is, a time for setting the brake force control apparatus in the assist pressure maintaining state has been reached. In this case, the process of step 338 is performed subsequent to step 336.

In step 338, the process is performed for requesting a continuous execution of the (IV) assist pressure holding mode, that is, for setting the (IV) assist pressure holding mode as a requested mode. After the process of step 338 is completed, the process of step 342 shown in FIG. 18 is performed.

On the other hand, if it is determined, in step 326, that $T_{MODE} \geq T_{MODE3}$ is not established, the period for maintaining the brake force control apparatus in the assist pressure decreasing state has not ended. In this case, the process of step 340 is performed subsequent to step 336.

In step 340, a process is performed for requesting a continuous execution of the (VI) assist pressure moderately decreasing mode, that is, for setting the (VI) assist pressure moderately decreasing mode as a requested mode. After the process of step 340 is completed, the process of step 342 shown in FIG. 18 is performed. According to the abovementioned process, when the condition for requesting the (III) assist pressure decreasing mode (the condition of step 332) is not established after execution of the (VI) assist pressure moderately decreasing mode is requested, the requested mode can be changed to (IV) assist pressure holding mode after the request is maintained for the predetermined time $T_{MODE3}$.

A mentioned above, according to the present routine, a control mode to be performed next is determined based on the currently performed control mode and the brake operation by the driver, and the thus determined control ode can be set as a requested mode.

In step 342, it is determined whether or not execution of the (II) assist pressure increasing mode is requested. As a result, if it is determined that the (II) assist pressure increasing mode is requested, the process of step 344 is then performed.

In step 344, the flag XPAINC is turned on, and the flags corresponding to other control modes are turned off. When the process of step 344 is performed, it is determined in the subsequent cycle that the currently performed control mode is the (II) assist pressure increasing mode. After the process of step 344 is completed, the process of step 346 is performed.

In step 346, the brake force control apparatus is set in the assist pressure increasing state shown in FIG. 4. When the process of step 346 is performed, the wheel cylinder pressure $P_{W/C}$ of each wheel is rapidly increased by using the accumulator 28 as a fluid pressure. After the process of step 346 is completed, the routine is ended.

If it is determined, in step 342, that execution of the (II) assist pressure increasing mode is not requested, the process of step 348 is then performed.

In step 348, it is determined whether or not execution of the (III) assist pressure decreasing mode is requested. As a result, if it is determined that the (III) assist pressure decreasing mode is requested, the process of step 350 is then performed.

In step 350, the flag XPARED is turned on, and the flags corresponding to other control modes are turned off. When the process of step 350 is performed, it is determined in the subsequent cycle that the currently performed control mode is the (III) assist pressure decreasing mode. After the process of step 350 is completed, the process of step 352 is performed.

In step 352, the brake force control apparatus is set in the assist pressure decreasing state shown in FIG. 5. When the process of step 352 is performed, the wheel cylinder pressure $P_{W/C}$ of each wheel is rapidly decreased down to the master cylinder pressure $P_{M/C}$ as a lower limit. After the process of step 352 is completed, the routine is ended.

If it is determined, in step 348, that execution of the (III) assist pressure decreasing mode is not requested, the process of step 354 is then performed.

In step 354, it is determined whether or not execution of the (V) assist pressure moderately increasing mode is requested. As a result, if it is determined that the (V) assist pressure moderately increasing mode is requested, the process of step 356 is then performed.

In step 356, it is determined whether or not the requested mode is changed during a period from the immediately proceeding cycle to the present cycle. If it is determined that the requested ode is changed, it can be determined that the (V) assist pressure moderately increasing mode will be performed after the present cycle. In this case, the process of step 358 is performed. On the other hand, if it is determined that the requested mode is not changed in the period from the immediately preceding cycle to the present cycle, it can be determined that the (V) assist pressure moderately increasing mode has been performed from the immediately preceding cycle. In this case, the process of step 358 is skipped, and the process of step 358 is then performed.

In step 358, the current master cylinder pressure $P_{M/C}$ is stored as the start time master cylinder pressure $P_{STA}$, and the count value of the timer $T_{MODE}$ is cleared to "0". After the process of step 358 is completed, the process of step 360 is performed. According to the above process, the start time master cylinder pressure PSTA and the timer $T_{MODE}$ are cleared to the initial values every time when execution of the (V) assist pressure moderately increasing mode is started.

In step 360, the flag XPASLINC is turned on, and flags corresponding to other control modes are turned off. When the process of step 360 is performed, it is determined in the subsequent cycle that the currently performed control mode is the (V) assist pressure moderately increasing mode. After the process of step 360 is completed, the process of step 362 is then performed.

In step 362, the brake force control apparatus is set in the assist pressure increasing state shown in FIG. 4. After the process of step 362 is completed, the routine is ended. As mentioned above, in the present embodiment, the requested mode is changed to the (IV) assist pressure holding mode when the predetermined time $T_{MODE2}$ has elapsed after the (V) assist pressure moderately increasing mode is rendered to be the request mode. Thus, according to the above-mentioned process, the wheel cylinder pressure $P_{W/C}$ can be stepwise and moderately increased by the predetermined time $T_{MODE2}$ as a unit time every time when execution of the (V) assist pressure moderately increasing mode is requested.

If it is determined, in step 354, that (V) assist pressure moderately increasing mode is not requested, the process of step 364 is performed.

In step 364, it is determined whether or not execution of the (VI) assist pressure moderately decreasing mode is requested. If it is determined that execution of the (VI) assist pressure moderately decreasing mode is requested, the process of step 366 is then performed.

In step 366, it is determined whether or not the requested mode has been changed in the period from the immediately preceding cycle to the present cycle. If it is determined that the requested mode has been changed, it can be determined that the (VI) assist pressure moderately decreasing mode is performed after the present cycle. In this case, the process of step 368 is performed. On the other hand, if it is determined that the requested mode has not been changed during the period from the immediately preceding cycle to the present cycle, it can be determined that the (VI) assist pressure moderately decreasing mode has been performed from the preceding cycle. In this case, the process of step 368 is skipped, and the process of step 370 is then performed.

In step 368, similar to step 358, the start time master cylinder pressure PSTA and the timer $T_{MODE}$ are cleared to the initial values. After the process of step 368 is completed, the process of step 370 is performed. According to the above-mentioned process, the start time master cylinder pressure PSTA and the timer $T_{MODE}$ can be cleared to the initial values every time when the (VI) assist pressure moderately increasing mode is started.

In step 370, the flag XPASLRED is turned on, and the flags corresponding to other control modes are turned off. When the process of step 370 is performed, it is determined in the subsequent cycle that the currently performed control mode is the (VI) assist pressure moderately decreasing mode. After the process of step 370 is completed, the process of step 372 is performed.

In step 372, the brake force control apparatus is set in the assist pressure decreasing state shown in FIG. 6. After the process of step 372 is completed, the routine is ended. As mentioned above, in the present embodiment, the requested mode is changed to the (IV) assist pressure holding mode when the predetermined time $T_{MODE3}$ has elapsed after the (V) assist pressure moderately increasing mode is rendered to be the request mode. Thus, according to the above-mentioned process, the wheel cylinder pressure $P_{W/C}$ can be stepwise and moderately decreased by the predetermined time $T_{MODE2}$ as a unit time every time when execution of the (VI) assist pressure moderately decreasing mode is requested.

If it is determined, in step 364, that (VI) assist pressure moderately decreasing mode is not requested, it can be determined that execution of the (IV) assist pressure holding mode is requested. In this case, the process of step 374 is performed subsequent to step 364.

In step 374, it is determined whether or not the requested mode has been changed in the period from the immediately preceding cycle to the present cycle. If it is determined that the requested mode has been changed, it can be determined that the (IV) assist pressure holding mode is performed after the present cycle. In this case, the process of step 376 is performed. On the other hand, if it is determined that the requested mode has not been changed during the period from the immediately preceding cycle to the present cycle, it can be determined that the (IV) assist pressure holding mode has been performed from the preceding cycle. In this case, the process of step 376 is skipped, and the process of step 378 is then performed.

In step 376, similar to steps 358 and 368, the start time master cylinder pressure $P_{STA}$ and the timer $T_{MODE}$ are cleared to the initial values. After the process of step 376 is completed, the process of step 378 is performed. According to the above-mentioned process, the start time master cylinder pressure $P_{STA}$ and the timer $T_{MODE}$ can be cleared to the initial values every time when the (IV) assist pressure holding mode is started.

In step 378, the flag XPAHOLD is tuned on, and the flags corresponding to other control modes are turned off. When the process of step 378 is performed, it is determined in the subsequent cycle that the currently performed control mode is the (IV) assist pressure holding mode. After the process of step 378 is completed, the process of step 380 is performed.

In step 380, the brake force control apparatus is set to the assist pressure holding state shown in FIG. 5. After the process of step 380 is performed, the wheel cylinder pressure $P_{W/C}$ of each wheel can be maintain at a constant value. After the process of step 380 is completed, the routine is ended.

As mentioned above, according to the routine shown in FIGS. 12 to 18, the assist pressure Pa corresponding to the operating speed of the brake operation generated in the process of an emergency brake operation can be generated. Additionally, the wheel cylinder pressure $P_{W/C}$ can be appropriately increased or decreased in response to an increase or decrease in the master cylinder pressure $P_{M/C}$, that is, in response to a brake operation of the driver in association with execution of the BA control. Thus, according to the brake force control apparatus of the present embodiment, when an emergency brake operation is performed by the driver, it can be achieved that 1) a brake force which is intended by the driver can be rapidly generated, and 2) the driver's intention can be always reflected to the brake force during execution of the BA control.

It should be noted that, in the above-mentioned embodiment, the "operating speed detecting means" can be achieved by the ECU 10 calculating the change rate $\Delta P_{M/C}$ of the master cylinder pressure $P_{M/C}$ based on the output signal of the fluid pressure sensor 144; the "emergency brake operation detecting means" can be achieved by the ECU 10 executing the routine shown in FIGS. 8 and 9; and the "brake fluid pressure increasing means" can be achieved by the ECU 10 executing the process of step 240, 242, 252 and 260 to 266.

Additionally, the accumulator 28 corresponds to the "first assist pressure generating means"; the "assist time control means" can be achieved by the ECU 10 executing the step 240, 242, 252, and 260 to 266; and the "pressure increasing time correcting means" can be achieved by the ECU 10 executing step 246, 248 and 250.

Further, in the above-mentioned embodiment, the accumulator 28, STR 94 and SA-3 90 correspond to the "second assist pressure generating means", and the "assist slope control means" can be achieved by the ECU 10 which controls to alternatively repeat the assist pressure increasing state (the state shown in FIG. 4) and the assist pressure holding state (the state shown in FIG. 5) by the predetermined pressure increasing time at a predetermined frequency so that a pressure increasing slope corresponding to the maximum value $\Delta P_{MAX}$ of the change rate $\Delta P_{M/C}$ is achieved.

Additionally, in the present embodiment, the hydraulic circuit of the brake force control apparatus corresponds to the "brake fluid pressure control mechanism", and the "brake fluid pressure adjusting means" is achieved by the ECU 10 executing the above-mentioned steps 268 to 380.

Additionally, in the above-mentioned embodiment, the "brake start time operation detecting means" can be achieved by the ECU 10 performing the process of the above-mentioned steps 356, 358, 366, 368, 374 and 376; the "first control state selecting means", the "third control state selecting means" and the "pressure increasing and decreasing slope changing means" can be achieved by the ECU 10 performing the process of the above-mentioned steps 302, 304, 306, 308, 322 and 324.

Further, in the above-mentioned embodiment, the "second control state selecting means" is achieved by the ECU 10 performing the process of the above-mentioned steps 312 to 320, 322 and 324; and the "fourth control state selecting means" is achieved by the ECU 10 performing the process of the above-mentioned steps 268 to 272, 276, 278 and 282.

It should be noted that, in the above-mentioned embodiment, the (V) assist pressure moderately increasing mode is achieved by alternatively repeating the assist pressure increasing state shown in FIG. 4 and the assist pressure holding state shown in FIG. 5 and the (VI) assist pressure moderately decreasing mode is achieved by alternatively repeating the assist pressure decreasing state shown in FIG. 6 and the assist pressure holding state shown in FIG. 5 so that the slope of the increasing rate of the (II) assist pressure increasing mode is differed from that of the (V) assist pressure moderately increasing mode and the slope of the decreasing rate of the (III) assist pressure decreasing mode is differed from that of the (VI) assist pressure moderately decreasing mode. However, the present invention is not limited to this method, and the same function may be achieved by changing the slope of the increasing rate or decreasing rate used in the (II) assist pressure increasing mode and the (III) assist pressure decreasing mode.

Figure 25:
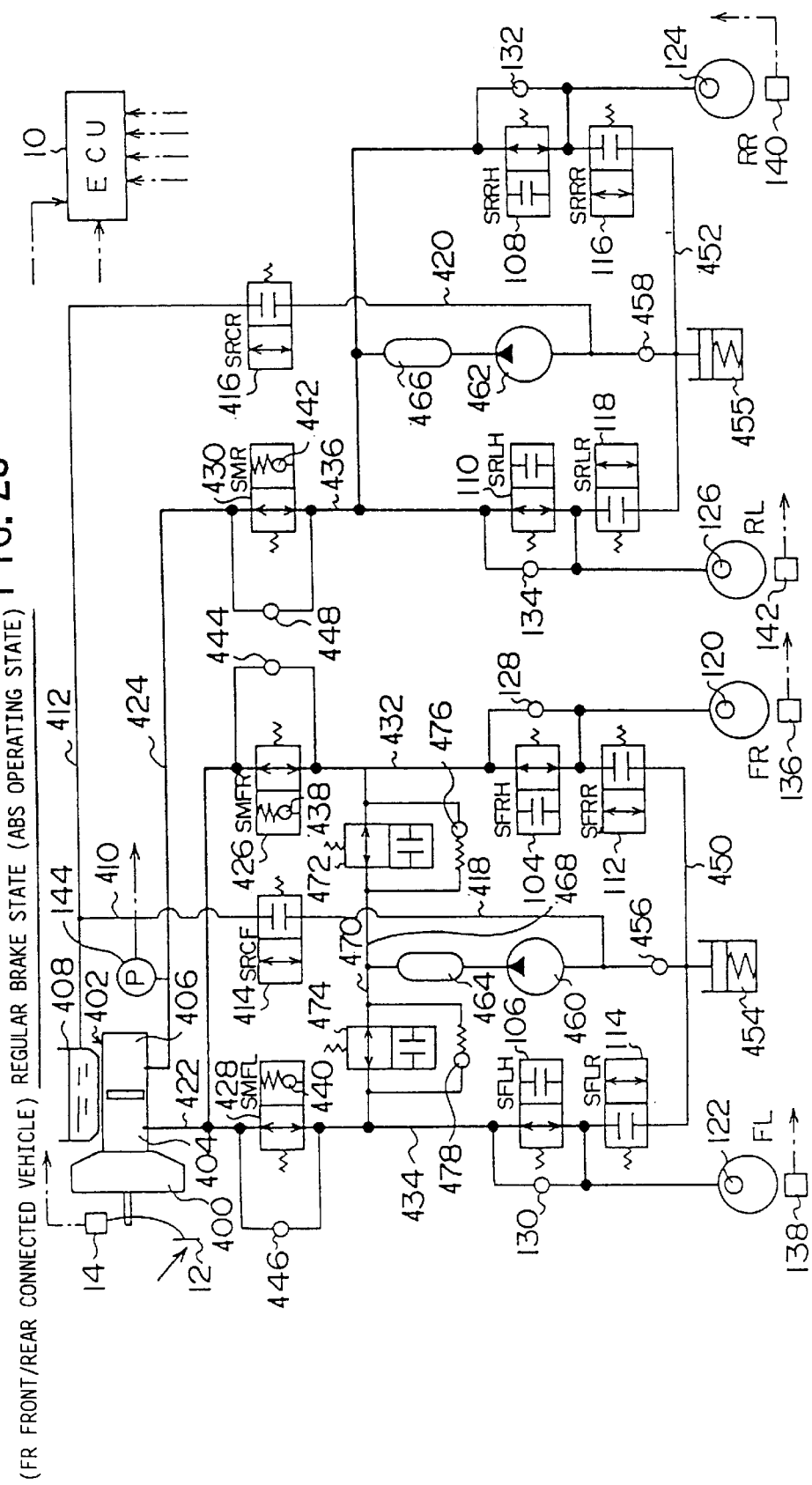
FIG. 25 is a system structure diagram showing an ABS operating state of a brake force control apparatus according to a second embodiment of the present invention.

A description will now be given, with reference to FIGS. 25 to 30, of a second embodiment of the present invention. FIG. 25 shows a system structure diagram of a pump-up type brake force control apparatus (hereinafter simply referred to as a brake force control apparatus) according to the second embodiment of the present invention. In FIG. 25, parts that are the same as the parts shown in FIG. 1 are given the same reference numerals, and descriptions thereof will be omitted.

The brake force control apparatus according to the present embodiment is suitable for a brake force control apparatus used for a front-engine rear-drive automobile (FR automobile). The brake force control apparatus according to the present embodiment is controlled by an ECU 10. Similar to the above-mentioned first embodiment, the ECU 10 controls an operation of the brake force control apparatus by executing control routines shown in FIGS. 8 to 10 and FIGS. 12 to 18.

The brake force control apparatus comprises a brake pedal 12. A brake switch 14 is provided near the brake pedal 12. The ECU 10 determined whether or not the brake pedal is depressed based on an output signal of the brake switch 14.

The brake pedal 12 is connected to a vacuum booster 400. The vacuum booster 400 generates an assist force Fa, which has a predetermined power ratio with respect to a brake pressing force F, when the brake pedal is depressed. A master cylinder 402 is fixed to the vacuum booster 400. The master cylinder 402 is of a tandem center valve type, and includes a first hydraulic pressure chamber 404 and a second hydraulic pressure chamber 406. The first hydraulic pressure chamber 404 and the second hydraulic pressure chamber 406 generate a master cylinder pressure $P_{M/C}$ corresponding to a combined force of the brake pressing force F and the assist force Fa.

A reservoir tank 408 is provided above the master cylinder 402. The reservoir tank 408 is connected to a front reservoir passage 410 and a rear reservoir passage 412. The front reservoir passage 410 is connected to a front reservoir cut solenoid valve 414 (hereinafter referred to as SRCF 414). Similarly, the rear reservoir passage 412 is connected to a rear reservoir cut solenoid valve 416 (hereinafter referred to as SRCR 416).

A front pump passage 418 is connected to SRCF 414. Similarly, a rear pump passage 420 is connected to SRCR 416. SRCF 414 is a two-position solenoid valve which disconnects the front reservoir passage 410 and the front pump passage 418 from each other by being turned off and connects them to each other by being turned on. SRCR 416 is a two-position solenoid valve which disconnects the rear reservoir passage 412 and the rear pump passage 420 from each other by being turned off and connects them to each other by being turned on.

A first fluid pressure passage 422 and a second fluid pressure passage 424 are connected to the first hydraulic pressure chamber 404 and the second hydraulic pressure chamber 406 of the master cylinder 402, respectively. The first fluid pressure passage 422 is connected to a right front master cut solenoid valve 426 (hereinafter referred to as SMFR 426) and a left master cut solenoid valve 428 (hereinafter referred to as SMFL 428). The second fluid pressure passage 422 is connected to a rear master cut solenoid valve 430 (hereinafter referred to as SMR 430).

SMFR 426 is connected to a fluid passage 432 provided to a front right wheel FR. Similarly, SMFL 428 is connected to a fluid passage 434 provided to a front left wheel FR. Additionally, SMR 430 is connected to a fluid pressure passage 436 provided to the rear left and rear right wheels RL and RR.

Constant pressure relief valves 438, 440 and 442 are provided inside SMFR 426, SMFL 428 and SMR 430, respectively. SMFR 426 is a two-position solenoid valve which connects the first fluid pressure passage 422 and the fluid pressure passage 432 to each other by being turned off and connects the first fluid passage 422 and the fluid passage 432 via the constant pressure relief valve 438 by being turned on. Additionally, SMFL 428 is a two-position solenoid valve which connects the first fluid pressure passage 422 and the fluid pressure passage 434 to each other by being turned off and connects the first fluid passage 422 and the fluid passage 434 via the constant pressure relief valve 440 by being turned on. Similarly, SMR 430 is a two-position solenoid valve which connects the second fluid pressure passage 424 and the fluid passage 436 to each other by being turned off and connects the second fluid passage 424 and the fluid passage 436 via the constant pressure relief valve 442 by being turned on.

A check valve 444 is provided between the first fluid pressure passage 422 and the fluid pressure passage 432 so as to permit a flow of fluid only in a direction from the first fluid pressure passage 422 to the fluid pressure passage 432. Similarly, a check valve 446 is provided between the first fluid pressure passage 422 and the fluid pressure passage 434 so as to permit a flow of fluid only in a direction from the first fluid pressure passage 422 to the fluid pressure passage 434. Similarly, a check valve 448 is provided between the second fluid pressure passage 424 and the fluid pressure passage 436 so as to permit a flow of fluid only in a direction from the second fluid pressure passage 424 to the fluid pressure passage 436.

Similar to the above-mentioned first embodiment, the fluid pressure passages 432 and 434 provided to the front left and front right wheels and the fluid passage 436 provided to the rear left and rear right wheels are connected to the holding solenoid valves SH, the pressure decreasing solenoid valves SR, the wheel cylinders 120 to 126 and the check valves 128 to 134. Additionally, a front pressure decreasing passage 450 is connected to the holding solenoid valves SFRR 112 and SFLR 114 of the front left and front right wheels. Further, a rear pressure decreasing passage 452 is connected to the holding solenoid valves SRRR 116 and SRLR 118 of the rear left and rear right wheels.

A front reservoir 454 and a rear reservoir 455 are connected to the front pressure decreasing passage 450 and the rear pressure decreasing passage 452, respectively. The front reservoir 454 and the rear reservoir 455 are connected to an inlet of the front pump 460 and an inlet of the rear pump 462 via check valves 456 and 458, respectively. An outlet of the front pump 460 and an outlet of the rear pump 462 are connected to dampers 464 and 466, respectively, so as to absorb pulsation of a discharge pressure. The damper 464 is connected to a front right pump passage 468 provided to the front right wheel FR and a front left pump passage 470 provided to the front left wheel FL. The damper 466 is connected to the fluid passage 436.

The front right pump passage 468 is connected to the fluid passage 432 via a front right pump solenoid valve 472 (hereinafter referred to as SPFL 472). Additionally, the front left pump passage 470 is connected to the fluid passage 434 via a front left pump solenoid valve 474 (hereinafter referred to as SPFR 474). SPFL 472 is a two-position solenoid valve which connects the front right pump passage 468 and the fluid passage 432 to each other by being turned off and disconnects them from each other by being turned on. Similarly, SPFR 474 is a two-position solenoid valve which connects the front left pump passage 470 and the fluid passage 434 to each other by being turned off and disconnects them from each other by being turned on.

A constant pressure relief valve 476 is provided between the fluid pressure passage 432 and the front right pump passage 468 so as to permit a flow of fluid only in a direction from the fluid pressure passage 432 to the front right pump passage 468. A constant pressure relief valve 478 is provided between the fluid pressure passage 434 and the front left pump passage 470 so as to permit a flow of fluid only in a direction from the fluid pressure passage 434 to the front left pump passage 470.

The wheel speed sensors 136, 138, 140 and 142 are provided near the respective wheels. The ECU 10 detects rotational speed $V_W$ of each of the wheels based on the outputs of the wheel speed sensors 136 to 142. Additionally, a fluid pressure sensor 144 is provided to the second fluid pressure passage which is connected to the master cylinder 402. The ECU 10 detects the master cylinder pressure $P_{M/C}$ based on an output signal of the fluid pressure sensor 144.

A description will now be given of an operation of the brake force control apparatus according to the present embodiment. The brake force control apparatus according to the present embodiment achieves the following functions by operating various solenoid valves provided in the fluid circuit: (1) a regular brake function; (2) an ABS function; and (3) a BA function.

The "(1) regular brake function" is achieved by turning off all of the solenoid valves provided in the brake force control apparatus as shown in FIG. 25. Hereinafter a state shown in FIG. 25 is referred to as a regular brake state. Additionally, a control for achieving the regular brake function in the brake force control function is referred to as a regular brake control.

In the regular brake state shown in FIG. 25, both the wheel cylinders 120 and 122 of the front left and front right wheels FL and FR are connected to the first hydraulic pressure chamber 404 of the master cylinder 402 via the first fluid pressure passage 422. Additionally, both the wheel cylinders 124 and 126 of the rear left and rear right wheels RL and RR are connected to the second hydraulic pressure chamber 406 of the master cylinder 402 via the second fluid pressure passage 424. In this case, the wheel cylinder pressure $P_{W/C}$ of the wheel cylinders 120 to 126 is controlled to be always equal to the master cylinder pressure $P_{M/C}$. Accordingly, the regular brake function can be achieved in the state shown in FIG. 25.

The "(2) ABS function" can be achieved by turning on the front pump 460 and the rear pump 462 and operating the holding solenoid valves SH and the pressure decreasing solenoid valves SR in response to requirements by the ABS. Hereinafter, a control to achieve the ABS function in the brake force control apparatus is referred to as ABS control.

The ECU 10 starts the ABS control when the vehicle is in a braking state and an excessive slip rate is detected in any one of the wheels. The ABS control is started in a condition where the brake pedal 12 is depressed, that is, in a condition where the master cylinder 402 is generating the master cylinder pressure $P_{M/C}$ which is a high pressure.

During execution of the ABS control, the master cylinder pressure $P_{M/C}$ is introduced into the fluid pressure passages 432 and 434 provided to the front right and front left wheels and the fluid pressure passage 436 provided to the rear left and rear right wheels. Accordingly, in this condition, if the holding solenoid valves SH are open and the pressure decreasing solenoid valves SR are closed, the wheel cylinder pressure $P_{W/C}$ for each of the wheels can be increased. Hereinafter, this state is referred to as (i) pressure increasing mode.

Additionally, the wheel cylinder pressure $P_{W/C}$ for each wheel can be maintained by closing both the holding solenoid valves SH and the pressure decreasing solenoid valves SR while the ABS control is performed. Hereinafter, this state is referred to as (ii) holding mode. Further, the wheel cylinder pressure $P_{W/C}$ for each wheel can be decreased by closing the holding solenoid valves SH and opening the pressure decreasing solenoid valves SR while the ABS control is performed. Hereinafter, this state is referred to as (iii) pressure decreasing mode.

The ECU 10 controls the holding solenoid valves SH and the pressure decreasing solenoid valves SR so that the above-mentioned (i) pressurizing mode, (ii) holding mode and (iii) pressure increasing mode are achieved, if necessary, in response to a slip state of each wheel while the ABS control is performed. When the holding solenoid valves SH and the pressure decreasing solenoid valves SR are controlled as mentioned above, the wheel cylinder pressure $P_{W/C}$ for each of the wheels is controlled to be a pressure which does not generate an excessive slip rate in the respective wheels. Thus, according to the above-mentioned control, the ABS function can be achieved in the brake force control apparatus.

During execution of the ABS control, the brake fluid in the wheel cylinders 120 to 126 enters the front reservoir 454 and the rear reservoir 455 through the front pressure decreasing passage 450 and the rear pressure decreasing passage 452. The brake fluid entering the front reservoir 454 and the rear reservoir 455 is pumped up by the front pump 460 and the rear pump 462, and is supplied to the fluid pressure passages 432, 434 and 436.

A part of the brake fluid supplied to the fluid pressure passages 432, 434 and 436 enters the wheel cylinders 120 to 126 when the pressure increasing mode is performed. Additionally, the remainder of the brake fluid flows into the master cylinder 402 so as to compensate for the brake fluid which has flowed out. Thus, according to the present embodiment, an excessive travel of the brake pedal 12 in not generated during the ABS control.

Figure 26:
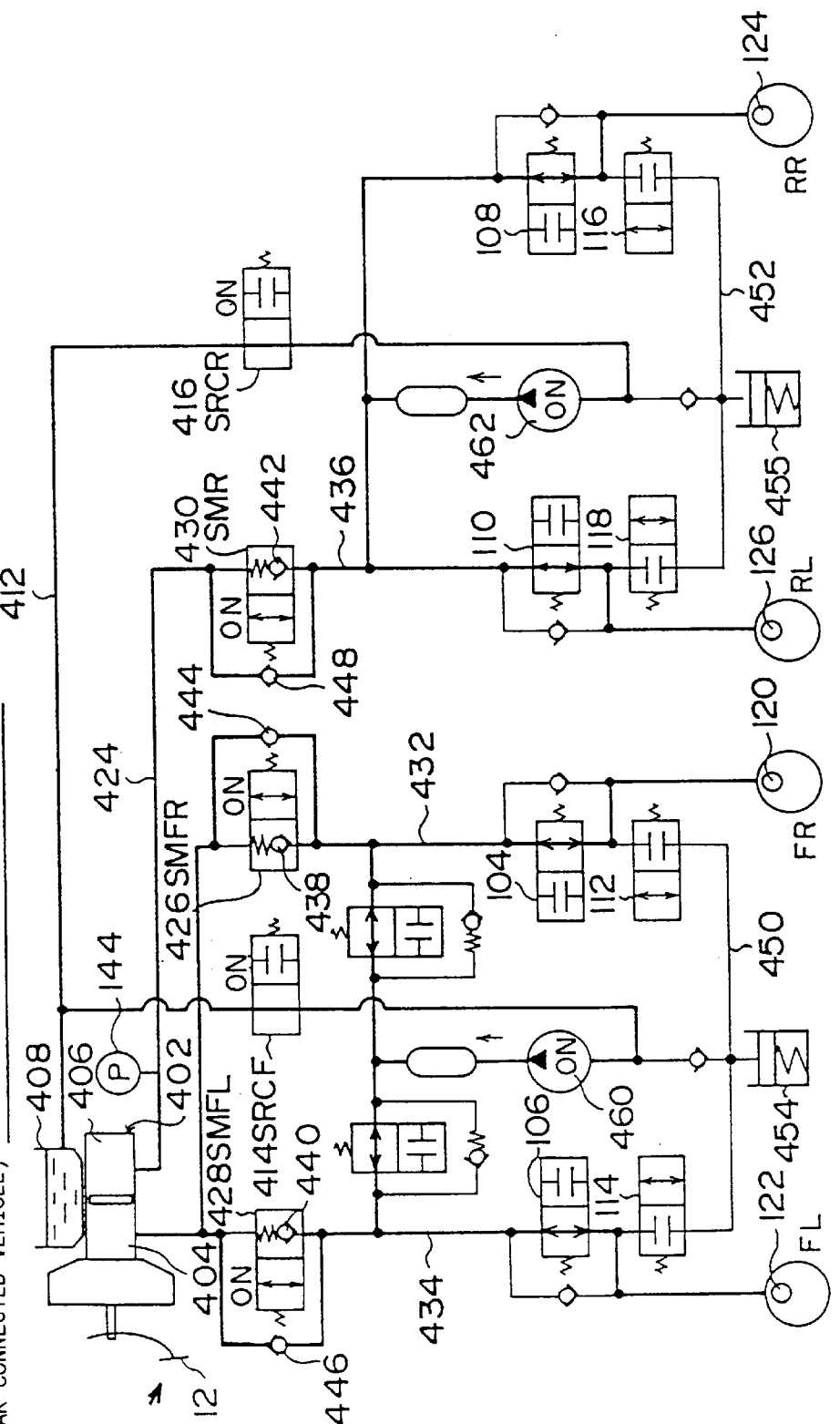
FIG. 26 is a diagram showing an assist pressure increasing state achieved during the BA control in the brake force control apparatus according to the second embodiment of the present invention.
Figure 27:
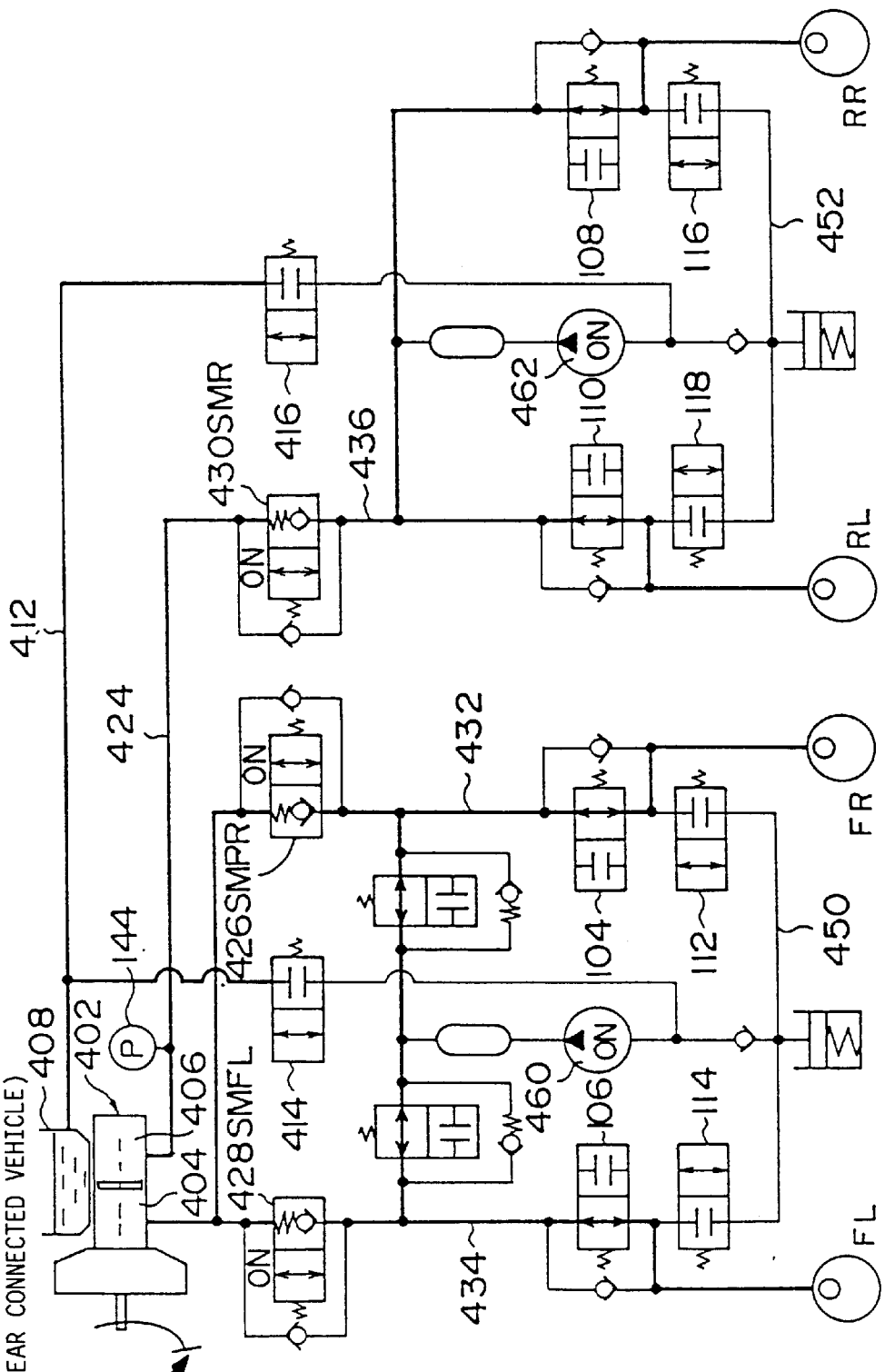
FIG. 27 is a diagram showing an assist pressure holding state achieved during the BA control in the brake force control apparatus according to the second embodiment of the present invention.
Figure 28:
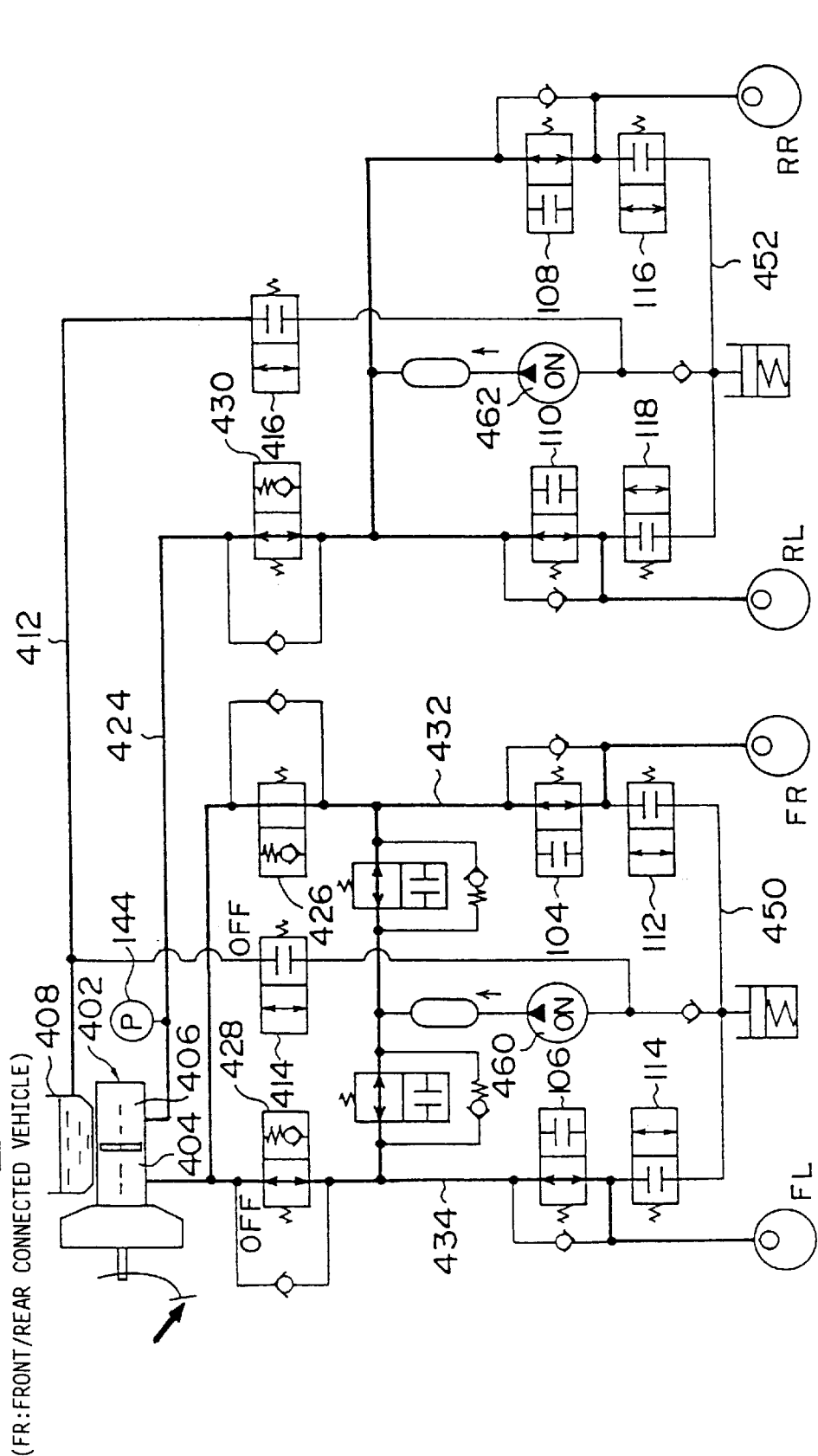
FIG. 28 is a diagram showing an assist pressure decreasing state achieved during the BA control or a BA+ABS control in the brake force control apparatus according to the second embodiment of the present invention.

FIGS. 26 to 28 show a state of the brake force control apparatus to achieve the "(3) BA function". The ECU achieves the BA function by setting, if necessary, the state shown in FIGS. 26 to 28 after a brake operation for requesting a rapid increase in the brake force is performed by the driver, that is, after an emergency brake operation is performed. Hereinafter, a control for achieving the BA function in the brake force control apparatus is referred to as BA control.

FIG. 26 shows the assist pressure increasing state which is set during execution of the BA control. The assist pressure increasing state is set when the wheel cylinder pressure $P_{W/C}$ of each wheel is needed to be increased during execution of the BA control, that is, when execution of one of (I) start pressurizing mode, (II) assist pressure increasing mode, (III) assist pressure decreasing mode and (V) assist pressure moderately increasing mode is requested.

In the system according to the present embodiment, as shown in FIG. 26, the assist pressure increasing state can be archived by turning on the reservoir cut solenoid valves SRCF 414 and SRCR 416 and the master cut solenoid valves SMFR 426, SMFL 428 and SMR 430 and also turning on the front pump 460 and the rear pump 462.

When the assist pressure increasing state shown in FIG. 26 is set, the brake fluid stored in the reservoir tank 408 is pumped up by the front pump 460 and the rear pump 462, and is supplied to the fluid pressure passages 432, 434 and 436. In the assist pressure increasing state, a flow of the brake fluid in a direction from the fluid pressure passages 432, 434 and 436 to the master cylinder 402 is prevented by SMFR 326, SMFL 328 and SMR 330 until the pressure within the fluid pressure passages 432, 434 and 436 exceeds a valve opening pressure of the constant pressure relief valves 438, 440 and 442 and becomes higher than the master cylinder pressure $P_{M/C}$.

Accordingly, after the assist pressure increasing state shown in FIG. 26 is set, a fluid pressure higher than the master cylinder pressure $P_{M/C}$ is generated in the fluid pressure passages 432, 434 and 436. In the assist pressure increasing state, the wheel cylinders 120 to 126 are connected to the respective fluid pressure passages 332, 334 and 336. Accordingly, after the assist pressure increasing state is set, the wheel cylinder pressure $P_{W/C}$ of each wheel is rapidly increased to a pressure exceeding the master cylinder pressure $P_{M/C}$ by using the front pump 460 and the rear pump 462 as a fluid pressure source.

In the assist pressure increasing state shown in FIG. 26, the fluid pressure passages 432, 434 and 436 are connected to the master cylinder 402 via check valves 444, 446 and 448, respectively. Thus, when the master cylinder pressure $P_{M/C}$ is higher than the wheel cylinder pressure of each wheel, the wheel cylinder pressure $P_{W/C}$ can be increased by using the master cylinder 402 as a fluid pressure source even in the assist pressure increasing state.

FIG. 27 shows the assist pressure holding state which is set during execution of the BA control. The assist pressure holding state is set when the wheel cylinder pressure $P_{W/C}$ of each wheel is needed to be maintained during execution of the BA control, that is, when execution of the "(IV) assist pressure holding mode" is requested. As shown in FIG. 27, the assist pressure holding state can be achieved by turning on the master cut solenoid valves SMFR 426, SMFL 428 and SMR 430.

In the assist pressure holding state shown in FIG. 27, the front pump 460 and the reservoir tank 408 are disconnected from each other by SRCF 414, and the rear pump 462 and the reservoir tank 408 are disconnected from each other by SRCF 416. Accordingly, in the assist pressure holding state, the brake fluid is not discharged from the front pump 460 and the rear pump 462 to the fluid pressure passages 432, 434 and 436. Additionally, in the assist pressure holding state shown in FIG. 27, the fluid pressure passages 432, 434 and 436 are substantially disconnected from the master cylinder 402 by SMFR 426, SMFL 424 and SMR 430. Thus, in the assist pressure holding state shown in FIG. 27, the wheel cylinder pressure $P_{W/C}$ of each wheel can be maintained at a constant value.

FIG. 28 shows the assist pressure decreasing state which is set during execution of the BA control. The assist pressure decreasing state is set when the wheel cylinder pressure $P_{W/C}$ of each wheel is needed to be decreased during execution of the BA control, that is, when execution of one of the "(III) assist pressure decreasing mode" and the "(VI) assist pressure moderately decreasing mode" is requested. As shown in FIG. 28, the assist pressure decreasing state can be achieved by turning off all of the solenoid valves.

In the assist pressure decreasing state shown in FIG. 28, the front pump 460 and the rear pump 462 are disconnected from the reservoir tank 408. Accordingly, the brake fluid is not discharged from the front pump 460 and the rear pump 462 to the fluid pressure passages 432, 434 and 436. Additionally, in the assist pressure decreasing state shown in FIG. 28, the wheel cylinders 120 to 126 of the wheels are connected to the respective fluid pressure passages 332, 334 and 336. Accordingly, when the assist pressure decreasing state is set, the wheel cylinder pressure $P_{W/C}$ of each wheel can be decreased down to the master cylinder pressure $P_{M/C}$ as a lower limit.

In the present embodiment, the ECU 10 achieves the BA function when an emergency brake operation is performed by combining the assist pressure increasing state, assist pressure holding state and the assist pressure decreasing state shown in FIGS. 26 to 28 as is in the above-mentioned first embodiment. Thus, according to the brake force control apparatus of the present embodiment, similar to the above-mentioned first embodiment, when an emergency brake operation is performed by the driver, a brake force conforming to the driver's intention can be immediately generated and the driver's intention can be reflected to the brake force during execution of the BA control.

In the brake force control apparatus according to the present embodiment, after the above-mentioned BA control is started, an excessive slip rate may be generated in any one of the wheels as the wheel cylinder pressure $P_{W/C}$ is rapidly increased. In such a case, the ECU 10 starts the BA+ABS control. A description will now be given, with reference to FIGS. 28, 29 and 30, of an operation of the brake force control apparatus associated with the BA+ABS function.

After the BA+ABS control is started and when a brake operation to increase a brake force is performed by the driver, the brake force control apparatus according to the present embodiment attempts to control the wheel cylinder pressure $P_{W/C}$ for an ABS objective wheel to be at a pressure requested by the ABS control and to increase the wheel cylinder pressure $P_{W/C}$ of other wheels.

Figure 29:
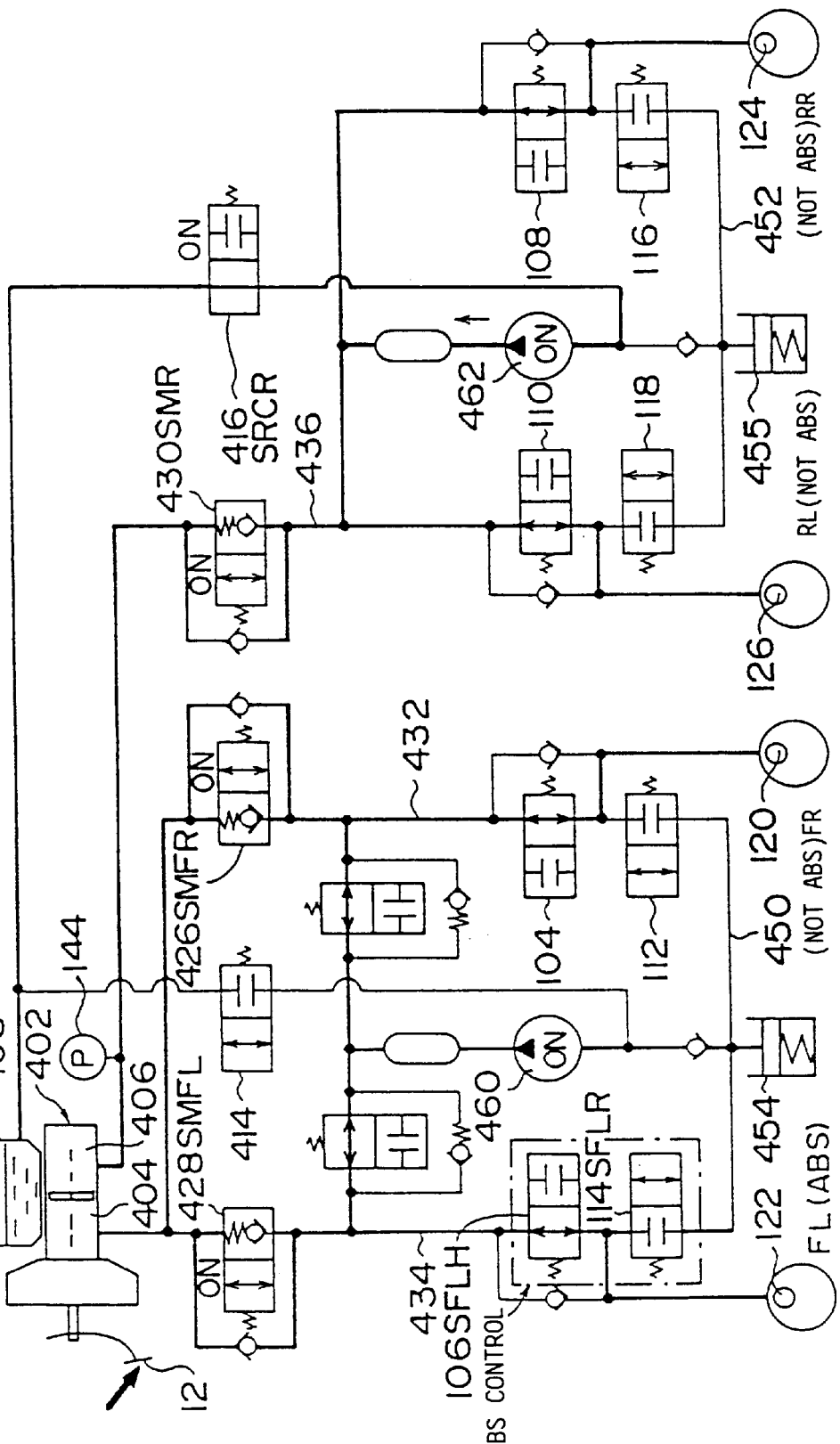
FIG. 29 is a diagram showing an assist pressure increasing state achieved during the BA+ABS control in the brake force control apparatus according to the second embodiment of the present invention.

FIG. 29 shows a state which is set to achieve the above-mentioned function during execution of the BA+ABS control in which the front left wheel FL is the ABS objective wheel. Hereinafter, the state shown in FIG. 29 is referred to as an assist pressure increasing (ABS) state. The assist pressure increasing (ABS) state can be set by turning on the rear reservoir cut solenoid valve SRCR 416 and the master cur the master cut solenoid valves SMFR 426, SMFL 428 and SMR 430 and turning on the front pump 460 and the rear pump 462, and appropriately controlling, if necessary, the holding solenoid valve SFLH 106 and the pressure decreasing solenoid valve SFLR 114 corresponding to the front left wheel FL.

In the assist pressure increasing (ABS) state, similar to the assist pressure increasing state shown in FIG. 26, the brake fluid discharged from the rear pump 462 is supplied to the wheel cylinders 124 and 126 corresponding to the rear left and rear right wheels RL and RR. Accordingly, when the assist pressure increasing (ABS) state is set, the wheel cylinder pressure $P_{W/C}$ of the rear left and rear right wheels RL and RR is increased similar to the case in which the assist pressure increasing state is set during the BA control.

The BA+ABS control in which the front left wheel FL is set to be an ABS objective wheel is started by execution of the "(ii) pressure decreasing mode" for the front left wheel FL. Accordingly, the brake fluid enters the front reservoir 454 simultaneously when the BA+ABS control is started. In the assist pressure increasing (ABS) state shown in FIG. 29, the front pump 460 suctions and delivers the thus entering brake fluid in the front reservoir 454.

The brake fluid delivered by the front pump 460 is mainly supplied to the wheel cylinder 120 corresponding to the front right wheel FR, and is also supplied to the wheel cylinder 122 when the "(i) pressure increasing mode" is performed. According to the above control, the wheel cylinder pressure $P_{W/C}$ corresponding to the front right wheel FR can be increased similar to a case in which the assist pressure increasing state is set during the BA control, while the wheel cylinder pressure $P_{W/C}$ corresponding to the front left wheel FL is controlled to be an appropriate value so that an excessive slip rate is not generated in the front left wheel FL.

As mentioned above, according to the assist pressure increasing (ABS) state shown in FIG. 29, the wheel cylinder pressure $P_{W/C}$ for the front right wheel FR and the rear left and rear right wheels RL and RR which are not set as the ABS objective wheel can be rapidly increased as is in the case where the assist pressure increasing state is set during the BA control, while the wheel cylinder pressure $P_{W/C}$ for the front left wheel FL which is the ABS objective wheel is controlled to a pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to the ABS control while an attempt is made to maintain the wheel cylinder pressure $P_{W/C}$ of other wheels.

Figure 30:
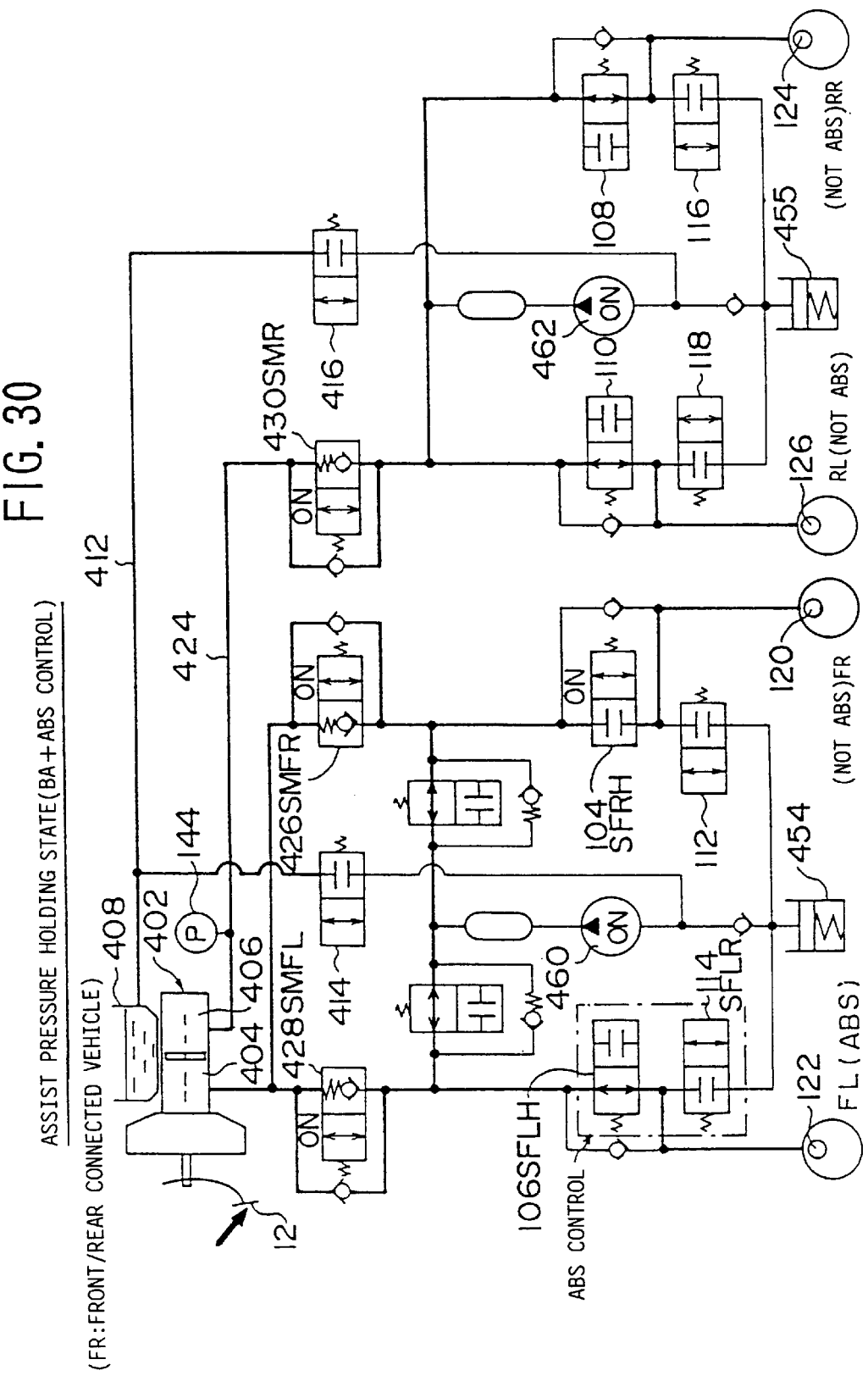
FIG. 30 is a diagram showing an assist pressure holding state achieved during the BA+ABS control in the brake force control apparatus according to the second embodiment of the present invention.

FIG. 30 shows a state which is set to achieve the above-mentioned function during execution of the BA+ABS control in which the front left wheel FL is set to the ABS objective wheel. Hereinafter, the state shown in FIG. 30 is referred to as an assist pressure holding (ABS) state. The assist pressure holding (ABS) state can be set by turning on the master cut solenoid valves SMFR 426, SMFL 428 and SMR 430, and turning on the front pump 460 and the rear pump 462, and turning on the holding solenoid valve SFRH 104 corresponding to the front right wheel FR, and appropriately controlling, if necessary, the holding solenoid valve SFLH 106 and the pressure decreasing solenoid valve SFLR 114 corresponding to the front left wheel FL.

In the assist pressure holding (ABS) state, similar to the assist pressure increasing state shown in FIG. 27, the rear pump 462 is disconnected from the reservoir tank 408. Additionally, the fluid pressure passage 430 is substantially disconnected from the master cylinder 402 as is in the case where the assist pressure holding state is set as shown in FIG. 27. Accordingly, when the assist pressure holding (ABS) state is set, the wheel cylinder pressure $P_{W/C}$ for the rear left and rear right wheels RL and RR is maintained at a constant value as is in the case where the assist pressure holding state is achieved during the BA control.

The brake fluid discharged from the wheel cylinder 122 is stored in the front reservoir 454 at the same time when the assist pressure holding (ABS) state is set or before the assist pressure holding (ABS) state is set. The front pump 460 suctions and delivers the brake fluid stored in the front reservoir 454 while the assist pressure holding (ABS) state is set.

In the assist pressure holding state, the wheel cylinder 120 corresponding to the front right wheel FR is disconnected from the front pump 460 by SFRH 104. Thus, the brake fluid delivered by the front pump 460 is supplied only to the wheel cylinder 122 corresponding to the front left wheel FL. Additionally, a flow of the brake fluid from the front pump 460 to the wheel cylinder 122 is permitted only when the "(i) pressure increasing mode" is performed with respect to the front left wheel FL. According to the above control, the wheel cylinder pressure $P_{W/C}$ for the front right wheel FR is maintained at a constant value while the wheel cylinder pressure $P_{W/C}$ for the front left wheel FL is controlled to be an appropriate pressure which does not generate an excessive slip rate in the front left wheel FL.

As mentioned above, according to the assist pressure increasing (ABS) state shown in FIG. 30, the wheel cylinder pressure $P_{W/C}$ for the front right wheel FR and the rear left and rear right wheels RL and RR which are not the ABS objective wheels can be maintained at a constant value as is in the case where the assist pressure holding state is set during the BA control, while the wheel cylinder pressure $P_{W/C}$ for the front left wheel FL which is the ABS objective wheel is controlled to be an appropriate pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to a request by the ABS control while an attempt is made to decrease the wheel cylinder pressure $P_{W/C}$ of other wheels.

The above-mentioned function can be achieved by appropriately controlling the holding solenoid valves SH and the pressure decreasing solenoid valves SR while the assist pressure decreasing state shown in FIG. 28 is achieved so that one of the "(i) pressure increasing mode", the "(ii) holding mode" and the "(iii) pressure decreasing mode" is achieved for the ABS objective wheel. Hereinafter, the state in which the above-mentioned control is performed is referred to as assist pressure decreasing (ABS) state.

That is, when the assist pressure decreasing (ABS) state is set, each of the holding solenoid valves is connected to the master cylinder 402. Accordingly, if the assist pressure decreasing (ABS) state is set, the wheel cylinder pressure $P_{W/C}$ corresponding to the wheels which are not the ABS objective wheel can be decreased down to the master cylinder as a lower limit. Additionally, as for the ABS objective wheel, the wheel cylinder pressure $P_{W/C}$ can be maintained or decreased by setting the "(ii) holding mode" or the "(iii) pressure decreasing mode".

The assist pressure decreasing (ABS) state is set when the driver intends to decrease the brake force, that is, when there is no need to increase the wheel cylinder pressure $P_{W/C}$ for any one of wheels. Accordingly, the wheel cylinder pressure $P_{W/C}$ of the ABS objective wheel can be appropriately controlled to a pressure required by the BA+ABS control by achieving the (ii) holding mode and the (iii) pressure decreasing mode.

As mentioned above, according to the above-mentioned assist pressure decreasing (ABS) state, the wheel cylinder pressure $P_{W/C}$ for the front right wheel FR and the rear left and rear right wheels RL and RR which are not the ABS objective wheels can be decreased down to the master cylinder pressure $P_{M/C}$ as a lower limit as is in the case where the assist pressure decreasing state is set during the BA control, while the wheel cylinder pressure $P_{W/C}$ for the front left wheel FL which is the ABS objective wheel is controlled to be an appropriate pressure responding to a requested by the ABS control.

As mentioned-above, in the brake force control apparatus according to the present embodiment, after the BA control is started and when an excessive slip rate is generated in any one of the wheels, the ABS function and the BA function can be simultaneously performed, the ABS function controlling the wheel cylinder pressure $P_{W/C}$ for the ABS objective wheel to an appropriate pressure requested by the ABS control, the BA function increasing or decreasing the wheel cylinder pressure $P_{W/C}$ for a wheel which is not the ABS objective wheel within a high-pressure area relative to the master cylinder pressure $P_{M/C}$ in response to a brake operation performed by the driver.

Figure 31:
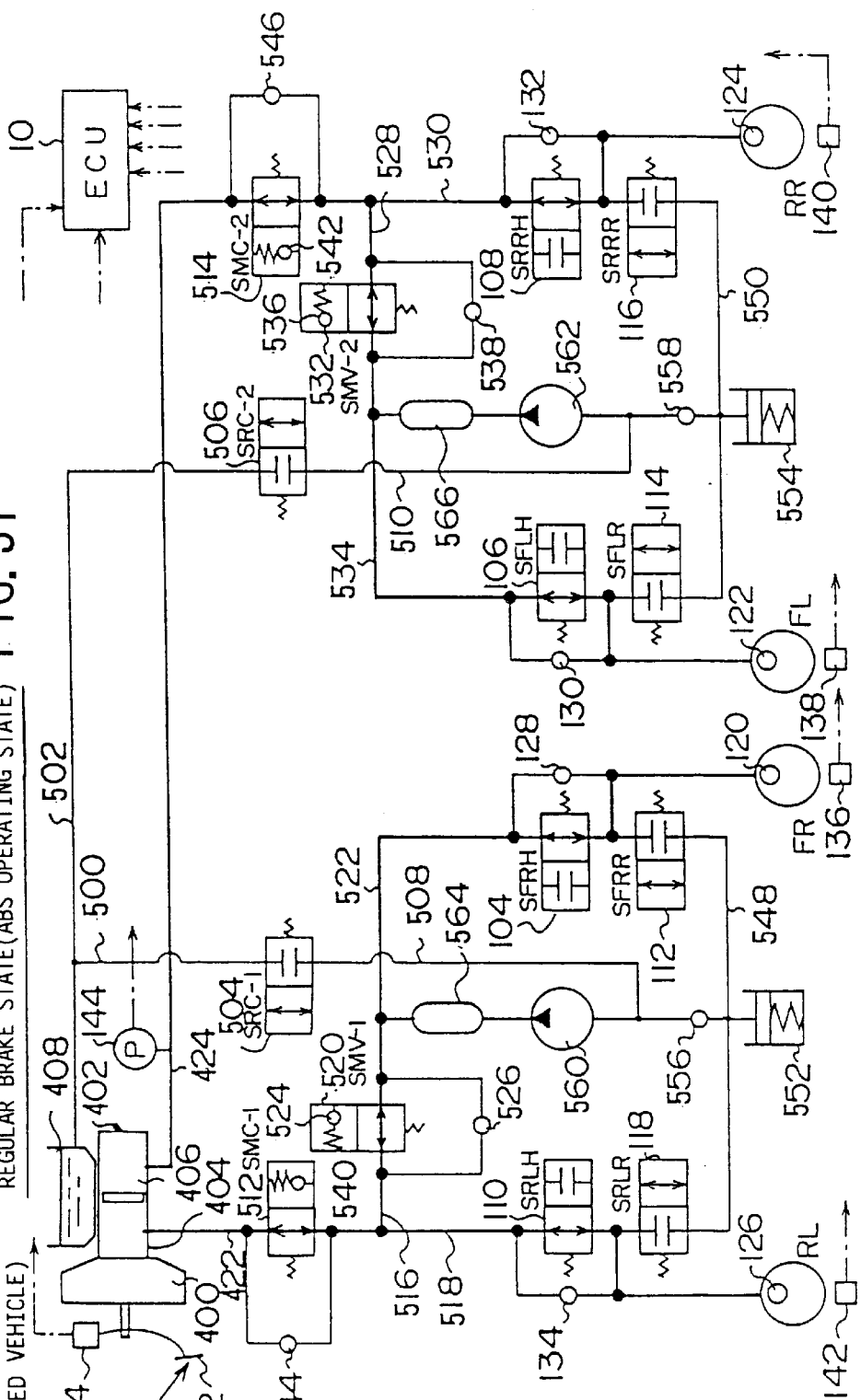
FIG. 31 is a system structure diagram showing an ABS operating state of a brake force control apparatus according to a third embodiment of the present invention.

A description will now be given, with reference to FIGS. 31 to 36, of a third embodiment of the present invention. FIG. 31 shows a system structure diagram of a pump-up type brake force control apparatus (hereinafter simply referred to as a brake force control apparatus) according to the third embodiment of the present invention. In FIG. 31, parts that are the same as the parts shown in FIG. 25 are given the same reference numerals, and descriptions thereof will be omitted.

The brake force control apparatus according to the present embodiment is suitable for a brake force control apparatus used for a front-engine front-drive automobile (FF automobile). The brake force control apparatus according to the present embodiment is controlled by an ECU 10. Similar to the above-mentioned first embodiment and the second embodiment, the ECU 10 controls an operation of the brake force control apparatus by executing control routines shown in FIGS. 8 to 10 and FIGS. 12 to 18.

The brake force control apparatus comprises a brake pedal 12. A brake switch 14 is provided near the brake pedal 12. The ECU 10 determined whether or not the brake pedal is depressed based on an output signal of the brake switch 14.

The brake pedal 12 is connected to a vacuum booster 400. The vacuum booster 400 is fixed to a master cylinder 402.

A first hydraulic pressure chamber 404 and a second hydraulic pressure chamber 406 are formed in the master cylinder 402. The master cylinder pressure $P_{M/C}$ is generated in the first hydraulic pressure chamber 404 and the second hydraulic pressure chamber 406, the master cylinder pressure $P_{M/C}$ corresponding to a combined force of a brake force F and an assist force Fa generated by the vacuum booster 400.

A reservoir tank 408 is provided above the master cylinder 402. The reservoir tank 408 is connected to a first reservoir passage 500 and a second reservoir passage 502. The first reservoir passage 500 is connected to a first reservoir cut solenoid valve 504 (hereinafter referred to as SRC-1 504). Similarly, the second reservoir passage 502 is connected to a second reservoir cut solenoid valve 506 (hereinafter referred to as SRC-2 506).

A first pump passage 508 is connected to SRC-1 504. Similarly, a second pump passage 510 is connected to SRC-2 506. SRC-1 504 is a two-position solenoid valve which disconnects the first reservoir passage 500 and the first pump passage 508 from each other by being turned off and connects them to each other by being turned on. SRC-2 506 is a two-position solenoid valve which disconnects the second reservoir passage 502 and the second pump passage 510 from each other by being turned off and connects them to each other by being turned on.

A first fluid pressure passage 422 and a second fluid pressure passage 424 are connected to the first hydraulic pressure chamber 404 and the second hydraulic pressure chamber 406 of the master cylinder 402, respectively. The first fluid pressure passage 422 is connected to a first master cut solenoid valve 512 (hereinafter referred to as SMC-1 512) and a second master cut solenoid valve 514 (hereinafter referred to as SMC-2 514).

SMC-1 512 is connected to a first pump pressure passage 516 and a fluid passage 518 provided to a rear left wheel RL. The first pump pressure passage 516 is connected to a first pump solenoid valve 520 (hereinafter referred to as SMV-1 520). SMV-1 520 is connected to a fluid passage 522 provided to the front right wheel FR. A constant pressure relief valve 524 is provided in SMV-1 520. SMV-1 520 is a two-position solenoid valve which connects the first pump pressure passage 516 and the fluid passage 522 to each other by being turned off and disconnects them from each other by being turned on. A check valve 526 is provided between the first pump pressure passage 516 and the fluid passage 522 so as to permit a flow of fluid only in a direction from the first pump pressure passage 516 and the fluid passage 522.

SMC-1 514 is connected to a second pump pressure passage 528 and a fluid passage 530 provided to a rear right wheel RR. The second pump pressure passage 528 is connected to a second pump solenoid valve 532 (hereinafter referred to as SMV-2 532). SMV-2 532 is connected to a fluid passage 534 provided to the front left wheel FL. A constant pressure relief valve 536 is provided in SMV-2 532. SMV-2 532 is a two-position solenoid valve which connects the second pump pressure passage 528 and the fluid passage 534 to each other by being turned off and disconnects them from each other by being turned on. A check valve 538 is provided between the second pump pressure passage 528 and the fluid passage 534 so as to permit a flow of fluid only in a direction from the second pump pressure passage 528 and the fluid passage 534.

Constant pressure relief valves 540 and 542 are provided inside SMC-1 512 and SMC-2 514, respectively. SMC-1 512 is a two-position solenoid valve which connects the first fluid pressure passage 422 and the fluid pressure passage 518 (and the first pump pressure passage 516) to each other by being turned off and connects them to each other via the constant pressure relief valve 540 by being turned on. SMC-2 514 is a two-position solenoid valve which connects the second fluid pressure passage 424 and the fluid pressure passage 530 (and the second pump pressure passage 518) to each other by being turned off and connects them to each other via the constant pressure relief valve 542 by being turned on.

A check valve 544 is provided between the first fluid pressure passage 422 and the fluid pressure passage 518 so as to permit a flow of fluid only in a direction from the first fluid pressure passage 422 to the fluid pressure passage 518. Similarly, a check valve 546 is provided between the second fluid pressure passage 424 and the fluid pressure passage 530 so as to permit a flow of fluid only in a direction from the second fluid pressure passage 424 to the fluid pressure passage 530.

Similar to the above-mentioned first and second embodiments, the fluid pressure passages 516, 522, 528 and 534 provided to the front left and front right wheels and the rear left and rear right wheels are connected to the holding solenoid valves SH, the pressure decreasing solenoid valves SR, the wheel cylinders 120 to 126 and the check valves 128 to 134. Additionally, a first pressure decreasing passage 548 is connected to the holding solenoid valves SFRR 112 and SRLR 118 of the front right and rear left wheels FR and RF. Further, a second pressure decreasing passage 550 is connected to the holding solenoid valves SFLR 114 and SRRR 116 of the front left and rear right wheels FL and RR.

A first reservoir 552 and a second reservoir 550 are connected to the first pressure decreasing passage 548 and the second pressure decreasing passage 550, respectively. The first reservoir 552 and the second reservoir 554 are connected to an inlet of the first pump 560 and an inlet of the second pump 562 via check valves 556 and 558, respectively. An outlet of the first pump 560 and an outlet of the second pump 562 are connected to dampers 564 and 566, respectively, so as to absorb pulsation of a discharge pressure. The dampers 564 and 566 are connected to the fluid passages 522 and 534, respectively.

The wheel speed sensors 136, 138, 140 and 142 are provided near the respective wheels. The ECU 10 detects rotational speed $V_W$ of each of the wheels based on the outputs of the wheel speed sensors 136 to 142. Additionally, a fluid pressure sensor 144 is provided to the second fluid pressure passage 424 which is connected to the master cylinder 402. The ECU 10 detects the master cylinder pressure $P_{M/C}$ based on an output signal of the fluid pressure sensor 144.

A description will now be given of an operation of the brake force control apparatus according to the present embodiment. The brake force control apparatus according to the present embodiment achieves the following functions by operating various solenoid valves provided in the fluid circuit: (1) a regular brake function; (2) an ABS function; and (3) a BA function.

The "(1) regular brake function" is achieved by turning off all of the solenoid valves provided in the brake force control apparatus as shown in FIG. 31. Hereinafter a state shown in FIG. 31 is referred to as a regular brake state. Additionally, a control for achieving the regular brake function in the brake force control function is referred to as a regular brake control.

In the regular brake state shown in FIG. 31, the wheel cylinders 120 and 126 of the front right and rear left wheels FR and RL are connected to the first hydraulic pressure chamber 404 of the master cylinder 402 via the first fluid pressure passage 422. Additionally, the wheel cylinders 122 and 124 of the front left and rear right wheels FL and RR are connected to the second hydraulic pressure chamber 406 of the master cylinder 402 via the second fluid pressure passage 424. In this case, the wheel cylinder pressure $P_{W/C}$ of the wheel cylinders 120 to 126 is controlled to be always equal to the master cylinder pressure $P_{M/C}$. Accordingly, the regular brake function can be achieved in the state shown in FIG. 31.

The "(2) ABS function" can be achieved by turning on the first pump 560 and the second pump 562 and operating the holding solenoid valves SH and the pressure decreasing solenoid valves SR in response to requirements by the ABS. Hereinafter, a control to achieve the ABS function in the brake force control apparatus is referred to as ABS control.

During execution of the ABS control, the master cylinder pressure $P_{M/C}$ is introduced into the four fluid pressure passages 518, 522, 528 and 534 provided to the front right and front left wheels and the rear left and rear right wheels. Accordingly, in this condition, if the holding solenoid valves SH are open and the pressure decreasing solenoid valves SR are closed, the wheel cylinder pressure $P_{W/C}$ for each of the wheels can be increased. Hereinafter, this state is referred to as (i) pressure increasing mode.

Additionally, the wheel cylinder pressure $P_{W/C}$ for each wheel can be maintained by closing both the holding solenoid valves SH and the pressure decreasing solenoid valves SR while the ABS control is performed. Hereinafter, this state is referred to as (ii) holding mode. Further, the wheel cylinder pressure $P_{W/C}$ for each wheel can be decreased by closing the holding solenoid valves SH and opening the pressure decreasing solenoid valves SR while the ABS control is performed. Hereinafter, this state is referred to as (iii) pressure decreasing mode.

The ECU 10 controls the holding solenoid valves SH and the pressure decreasing solenoid valves SR so that the above-mentioned (i) pressurizing mode, (ii) holding mode and (iii) pressure increasing mode are achieved, if necessary, in response to a slip state of each wheel while the ABS control is performed. When the holding solenoid valves SH and the pressure decreasing solenoid valves SR are controlled as mentioned above, the wheel cylinder pressure $P_{W/C}$ for each of the wheels is controlled to be a pressure which does not generate an excessive slip rate in the respective wheels. Thus, according to the above-mentioned control, the ABS function can be achieved in the brake force control apparatus.

During execution of the ABS control, the brake fluid in the wheel cylinders 120 to 126 enters the first reservoir 552 and the second reservoir 554 through the first pressure decreasing passage 548 and the second pressure decreasing passage 550. The brake fluid entering the first reservoir 552 and the second reservoir 554 is pumped up by the first pump 560 and the second pump 562, and is supplied to the fluid pressure passages 522 and 534.

A part of the brake fluid supplied to the fluid pressure passages 522 and 534 enters the wheel cylinders 120 to 126 when the (i) pressure increasing mode is performed for each wheel. Additionally, the remainder of the brake fluid flows into the master cylinder 402 so as to compensate for the brake fluid which has flowed out. Thus, according to the present embodiment, an excessive travel of the brake pedal 12 in not generated during the ABS control.

Figure 32:
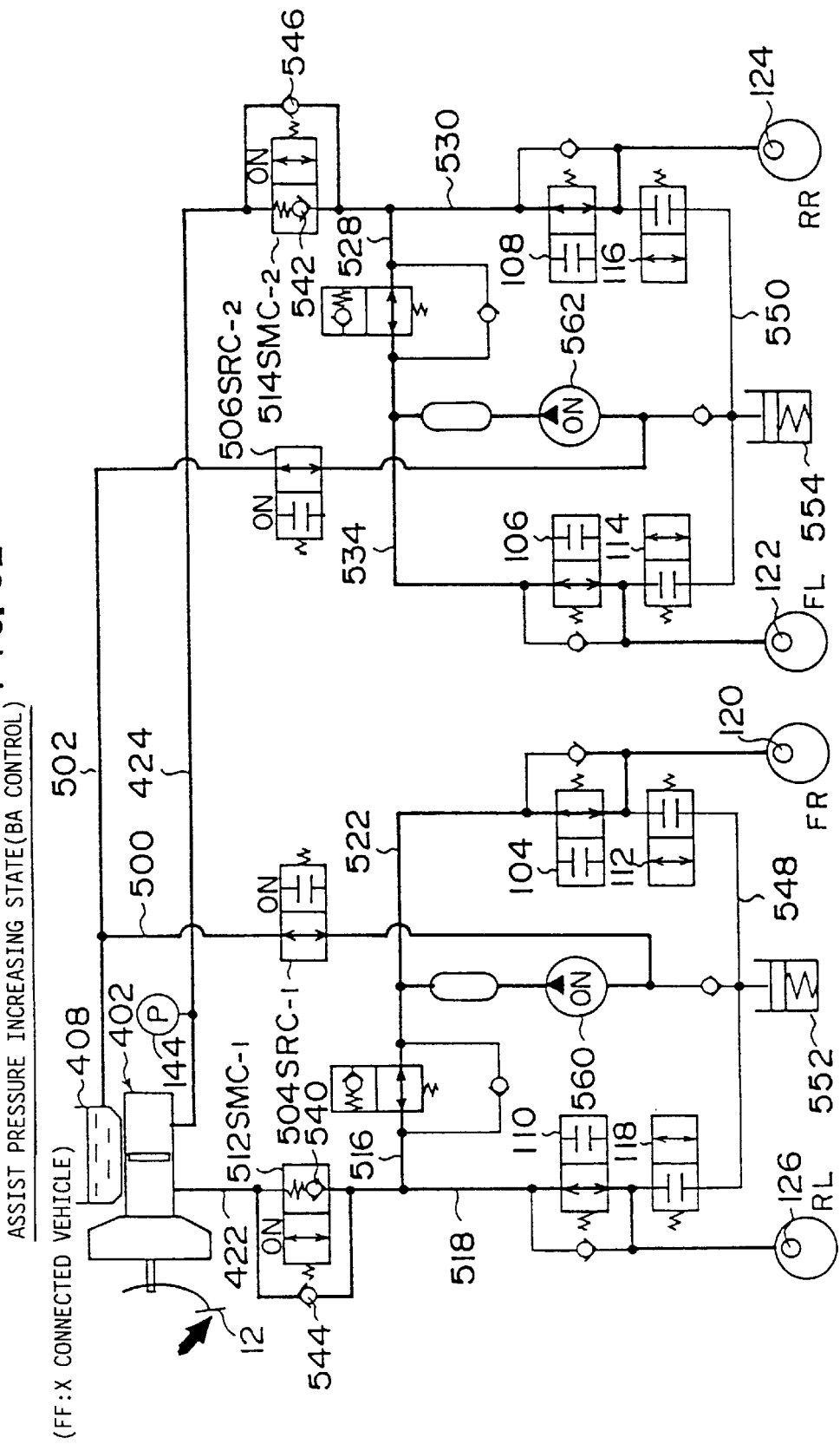
FIG. 32 is a diagram showing an assist pressure increasing state achieved during the BA control in the brake force control apparatus according to the third embodiment of the present invention.
Figure 33:
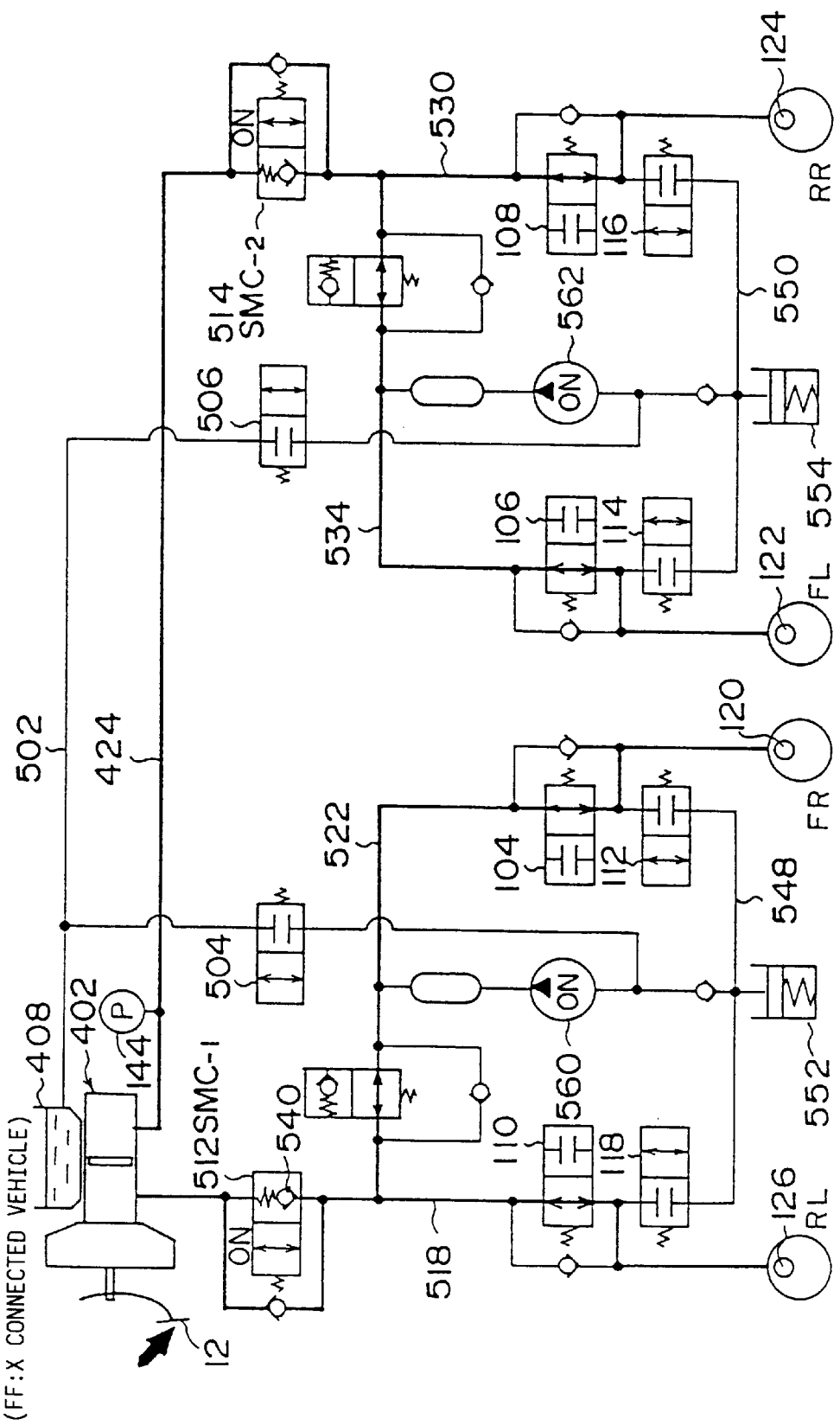
FIG. 33 is a diagram showing an assist pressure holding state achieved during the BA control in the brake force control apparatus according to the third embodiment of the present invention.
Figure 34:
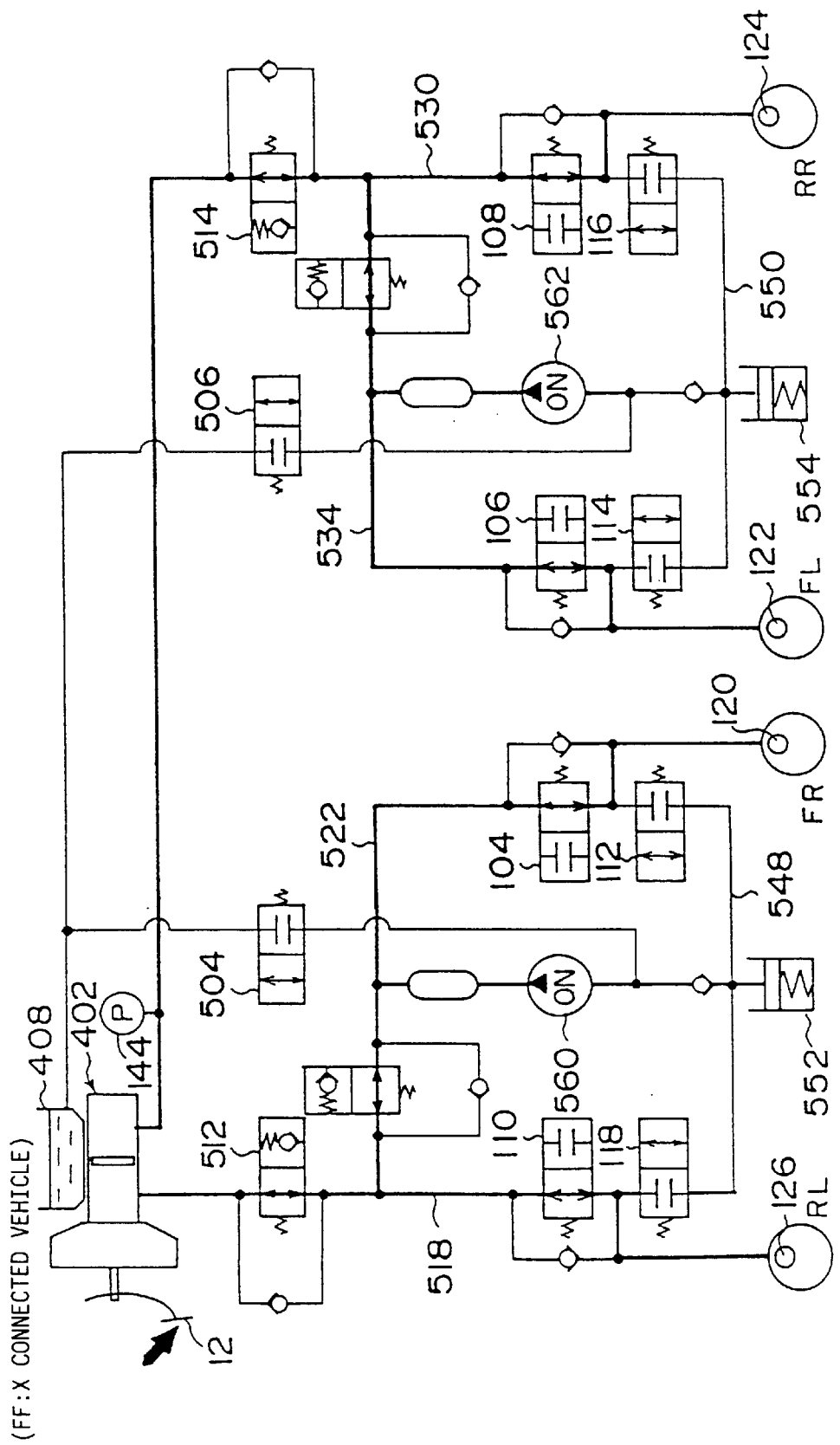
FIG. 34 is a diagram showing an assist pressure decreasing state achieved during the BA control or a BA+ABS control in the brake force control apparatus according to the third embodiment of the present invention.

FIGS. 32 to 34 show a state of the brake force control apparatus to achieve the "(3) BA function". The ECU achieves the BA function by setting, if necessary, the state shown in FIGS. 32 to 34 after a brake operation for requesting a rapid increase in the brake force is performed by the driver, that is, after an emergency brake operation is performed. Hereinafter, a control for achieving the BA function in the brake force control apparatus is referred to as BA control.

FIG. 32 shows the assist pressure increasing state which is set during execution of the BA control. The assist pressure increasing state is set when the wheel cylinder pressure $P_{W/C}$ of each wheel is needed to be increased during execution of the BA control, that is, when execution of one of (I) start pressurizing mode, (II) assist pressure increasing mode, (III) assist pressure decreasing mode and (V) assist pressure moderately increasing mode is requested.

In the system according to the present embodiment, as shown in FIG. 32, the assist pressure increasing state can be archived by turning on the reservoir cut solenoid valves SRC-1 504 and SRC-2 506 and the master cut solenoid valves SMC-1 512 and SMC-2 514 and also turning on the first pump 560 and the second pump 562.

When the assist pressure increasing state is set during execution of the BA control, the brake fluid stored in the reservoir tank 408 is pumped up by the first pump 560 and the second pump 562, and is supplied to the fluid pressure passages 522 and 534. In the assist pressure increasing state, the fluid pressure passage 522 is connected to each of the wheel cylinder 120 of the front right wheel FR and the wheel cylinder 126 of the rear left wheel RL. Additionally, in the assist pressure increasing state, a flow of the brake fluid in a direction from the fluid pressure passage 522 to the master cylinder 402 is prevented by SMC-1 512 until the pressure within the fluid pressure passages 522 exceeds a valve opening pressure of the constant pressure relief valves 540 and becomes higher than the master cylinder pressure $P_{M/C}$.

Similarly, in the assist pressure increasing state, the fluid pressure passage 534 is connected to each of the wheel cylinder 122 of the front left wheel FL and the wheel cylinder 124 of the rear right wheel RR. Additionally, in the assist pressure increasing state, a flow of the brake fluid in a direction from the fluid pressure passage 534 to the master cylinder 402 is prevented by SMC-2 514 until the pressure within the fluid pressure passages 534 exceeds a valve opening pressure of the constant pressure relief valves 542 and becomes higher than the master cylinder pressure $P_{M/C}$.

Accordingly, after the assist pressure increasing state shown in FIG. 32 is set, the wheel cylinder pressure $P_{W/C}$ of each wheel is rapidly increased to a pressure exceeding the master cylinder pressure $P_{M/C}$ by using the first pump 560 and the second pump 462 as a fluid pressure source.

In the assist pressure increasing state shown in FIG. 32, the fluid pressure passages 518, 522, 528 and 530 are connected to the master cylinder 402 via check valves 544 and 546, respectively. Thus, when the master cylinder pressure $P_{M/C}$ is higher than the wheel cylinder pressure $P_{W/C}$ of each wheel, the wheel cylinder pressure $P_{W/C}$ can be increased by using the master cylinder 402 as a fluid pressure source even in a state where the BA function is performed.

FIG. 33 shows the assist pressure holding state which is set during execution of the BA control. The assist pressure holding state is set when the wheel cylinder pressure $P_{W/C}$ of each wheel is needed to be maintained during execution of the BA control, that is, when execution of the "(IV) assist pressure holding mode" is requested. As shown in FIG. 33, the assist pressure holding state can be achieved by turning on the master cut solenoid valves SMC-1 512 and SMC-2 514.

In the assist pressure holding state shown in FIG. 33, the first pump 560 and the reservoir tank 408 are disconnected from each other by SRC-1 504, and the second pump 562 and the reservoir tank 408 are disconnected from each other by SRC-2 506. Accordingly, in the assist pressure holding state, the brake fluid is not discharged from the first pump 560 and the second pump 562 to the fluid pressure passages 522 and 534. Additionally, in the assist pressure holding state shown in FIG. 33, the fluid pressure passages 518, 522, 530 and 534 are substantially disconnected from the master cylinder 402 by SMC-1 512 and SMC-2 514. Thus, in the assist pressure holding state shown in FIG. 33, the wheel cylinder pressure $P_{W/C}$ of each wheel can be maintained at a constant value.

FIG. 34 shows the assist pressure decreasing state which is set during execution of the BA control. The assist pressure decreasing state is set when the wheel cylinder pressure $P_{W/C}$ of each wheel is needed to be decreased during execution of the BA control, that is, when execution of one of the "(III) assist pressure decreasing mode" and the "(VI) assist pressure moderately decreasing mode" is requested. As shown in FIG. 34, the assist pressure decreasing state can be achieved by turning off all of the solenoid valves.

In the assist pressure decreasing state shown in FIG. 34, the first pump 560 and the second pump 562 are disconnected from the reservoir tank 408. Accordingly, the brake fluid is not discharged from the first pump 560 and the second pump 562 to the fluid pressure passages 522 and 534. Additionally, in the assist pressure decreasing state, each of the wheel cylinders 120 to 126 of the wheels is connected to the master cylinder 402. Accordingly, when the assist pressure decreasing state is set, the wheel cylinder pressure $P_{W/C}$ of each wheel can be decreased down to the master cylinder pressure $P_{M/C}$ as a lower limit.

In the present embodiment, the ECU 10 achieves the BA function when an emergency brake operation is performed by combining the assist pressure increasing state, assist pressure holding state and the assist pressure decreasing state shown in FIGS. 32 to 34 as is in the above-mentioned first embodiment. Thus, according to the brake force control apparatus of the present embodiment, similar to the above-mentioned first and second embodiments, when an emergency brake operation is performed by the driver, a brake force conforming to the driver's intention can be immediately generated and the driver's intention can be reflected to the brake force during execution of the BA control.

In the brake force control apparatus according to the present embodiment, after the above-mentioned BA control is started, an excessive slip rate may be generated in any one of the wheels as the wheel cylinder pressure $P_{W/C}$ is rapidly increased. In such a case, the ECU 10 starts the BA+ABS control. A description will now be given, with reference to FIGS. 34, 35 and 36, of an operation of the brake force control apparatus associated with the BA+ABS function.

After the BA+ABS control is started and when a brake operation to increase a brake force is performed by the driver, the brake force control apparatus according to the present embodiment attempts to control the wheel cylinder pressure $P_{W/C}$ for an ABS objective wheel to be at a pressure requested by the ABS control and to increase the wheel cylinder pressure $P_{W/C}$ of other wheels.

Figure 35:
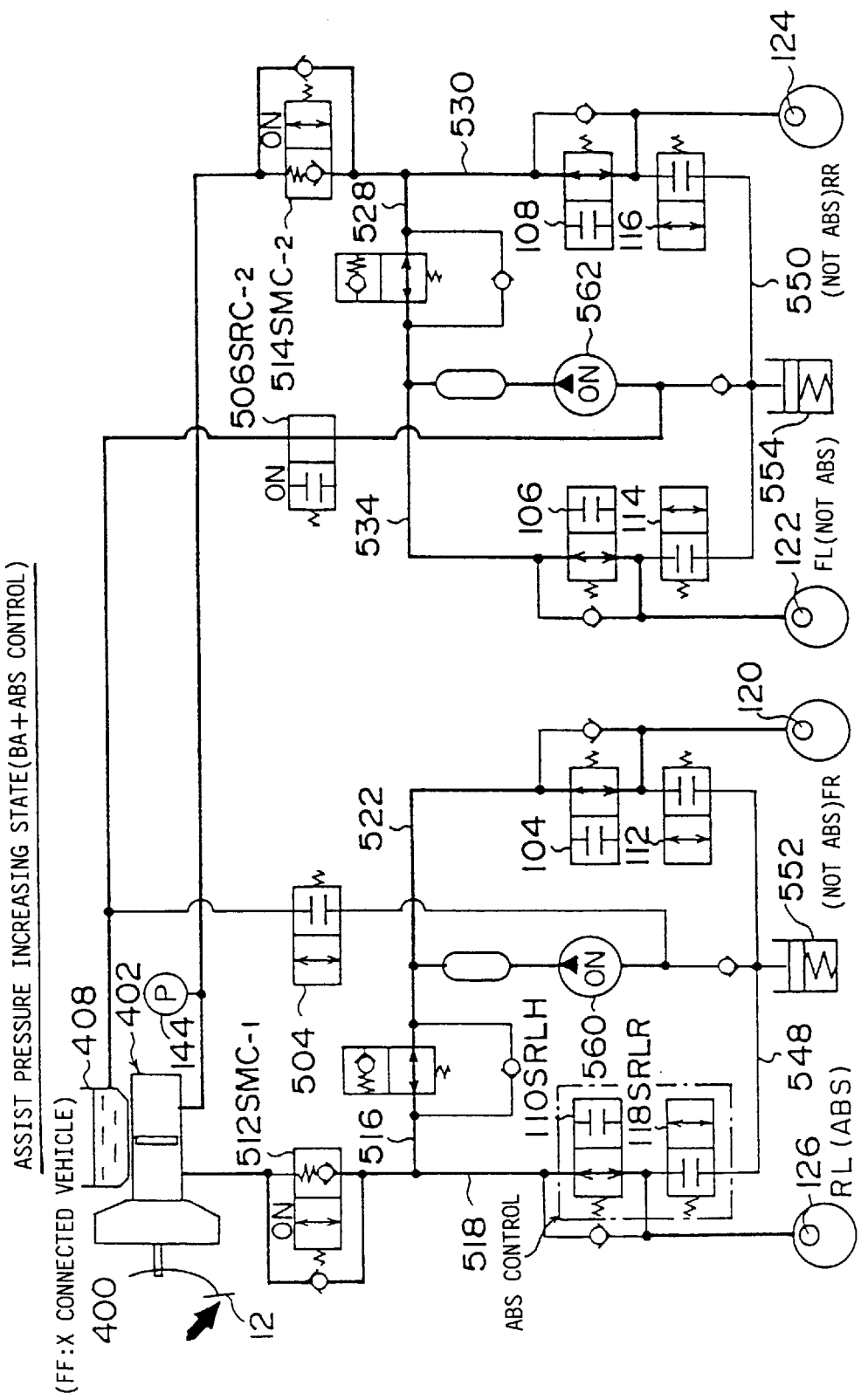
FIG. 35 is a diagram showing an assist pressure increasing state achieved during the BA+ABS control in the brake force control apparatus according to the third embodiment of the present invention.

FIG. 35 shows a state which is set to achieve the above-mentioned function during execution of the BA+ABS control in which the rear left wheel RL is the ABS objective wheel. Hereinafter, the state shown in FIG. 35 is referred to as an assist pressure increasing (ABS) state. The assist pressure increasing (ABS) state can be set by turning on the second reservoir cut solenoid valve SRC-2 506 and the master cut solenoid valves SMC-1 512 and SMC-2 514 and turning on the first pump 560 and the second pump 562, and appropriately controlling, if necessary, the holding solenoid valve SRLH 110 and the pressure decreasing solenoid valve SRLR 118 corresponding to the rear right wheel RL.

In the assist pressure increasing (ABS) state, similar to the assist pressure increasing state shown in FIG. 32, the brake fluid discharged from the second pump 562 is supplied to the wheel cylinders 122 and 124 corresponding to the front left and rear right wheels FL and RR. Accordingly, when the assist pressure increasing (ABS) state is set, the wheel cylinder pressure $P_{W/C}$ of the wheels FL and RR is increased similar to the case in which the assist pressure increasing state is set during the BA control.

The BA+ABS control in which the rear left wheel RL is set to be an ABS objective wheel is started by execution of the "(ii) pressure decreasing mode" for the rear left wheel RL. Accordingly, the brake fluid enters the first reservoir 552 simultaneously when the BA+ABS control is started. In the assist pressure increasing (ABS) state shown in FIG. 35, the first pump 560 suctions and delivers the thus entering brake fluid.

The brake fluid delivered by the first pump 560 is mainly supplied to the wheel cylinder 120 corresponding to the front right wheel FR, and is also supplied to the wheel cylinder 126 when the "(i) pressure increasing mode" is performed. According to the above control, the wheel cylinder pressure $P_{W/C}$ corresponding to the front right wheel FR can be increased similar to a case in which the assist pressure increasing state is set during the BA control, while the wheel cylinder pressure $P_{W/C}$ corresponding to the rear left wheel RL is controlled to be an appropriate value so that an excessive slip rate is not generated in the rear left wheel RL.

As mentioned above, according to the assist pressure increasing (ABS) state shown in FIG. 35, the wheel cylinder pressure $P_{W/C}$ for the front left and front right wheels FL and FR and the rear right wheel RR which are not set as the ABS objective wheel can be rapidly increased as is in the case where the assist pressure increasing state is set during the BA control, while the wheel cylinder pressure $P_{W/C}$ for the rear left wheel RL which is the ABS objective wheel is controlled to a pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to the ABS control while an attempt is made to maintain the wheel cylinder pressure $P_{W/C}$ of other wheels.

Figure 36:
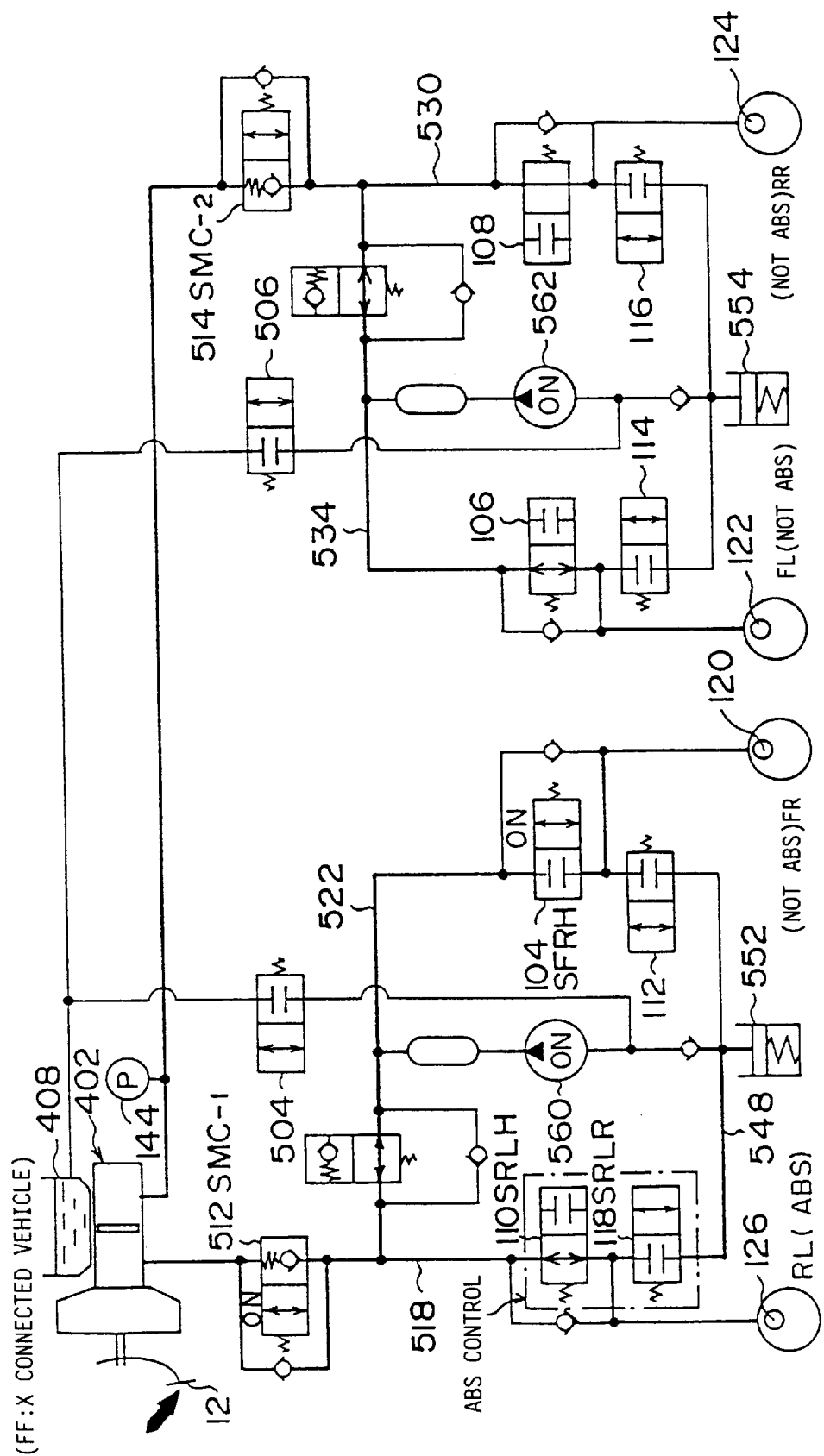
FIG. 36 is a diagram showing an assist pressure holding state achieved during the BA+ABS control in the brake force control apparatus according to the third embodiment of the present invention.

FIG. 36 shows a state which is set to achieve the above-mentioned function during execution of the BA+ABS control in which the front left wheel FL is set to the ABS objective wheel. Hereinafter, the state shown in FIG. 36 is referred to as an assist pressure holding (ABS) state. The assist pressure holding (ABS) state can be set by turning on the master cut solenoid valves SMC-1 512 and SMC-2 514, and turning on the first pump 560 and the second pump 562, and turning on the holding solenoid valve SFRH 104 corresponding to the front right wheel FR, and appropriately controlling, if necessary, the holding solenoid valve SRLH 110 and the pressure decreasing solenoid valve SRLR 118 corresponding to the rear left wheel RL.

In the assist pressure holding (ABS) state, similar to the assist pressure increasing state shown in FIG. 33, the second pump 562 is disconnected from the reservoir tank 408.

Additionally, the fluid pressure passages 530 and 534 are substantially disconnected from the master cylinder 402 as is in the case where the assist pressure holding state is set as shown in FIG. 33. Accordingly, when the assist pressure holding (ABS) state is set, the wheel cylinder pressure $P_{W/C}$ for the front left and rear right wheels FL and RR is maintained at a constant value as is in the case where the assist pressure holding state is achieved during the BA control.

The brake fluid discharged from the wheel cylinder 126 is stored in the first reservoir 552 at the same time when the assist pressure holding (ABS) state is set or before the assist pressure holding (ABS) state is set. The first pump 560 suctions and delivers the brake fluid stored in the first reservoir 552 while the assist pressure holding (ABS) state is set.

In the assist pressure holding state, the wheel cylinder 120 corresponding to the front right wheel FR is disconnected from the first pump 560 by SFRH 104. Thus, the brake fluid delivered by the first pump 560 is supplied only to the wheel cylinder 126 corresponding to the rear left wheel RL. Additionally, a flow of the brake fluid from the first pump 560 to the wheel cylinder 126 is permitted only when the "(i) pressure increasing mode" is performed with respect to the rear left wheel RL. According to the above control, the wheel cylinder pressure $P_{W/C}$ for the front right wheel FR is maintained at a constant value while the wheel cylinder pressure $P_{W/C}$ for the rear left wheel RL is controlled to be an appropriate pressure which does not generate an excessive slip rate in the rear left wheel RL.

As mentioned above, according to the assist pressure increasing (ABS) state shown in FIG. 36, the wheel cylinder pressure $P_{W/C}$ for the front left and front right wheels FL and FR and the rear right wheel RR which are not the ABS objective wheels can be maintained at a constant value as is in the case where the assist pressure holding state is set during the BA control, while the wheel cylinder pressure $P_{W/C}$ for the rear left wheel RL which is the ABS objective wheel is controlled to be an appropriate pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to a request by the ABS control while an attempt is made to decrease the wheel cylinder pressure $P_{W/C}$ of other wheels.

The above-mentioned function can be achieved by appropriately controlling the holding solenoid valves SH and the pressure decreasing solenoid valves SR while the assist pressure decreasing state shown in FIG. 34 is achieved so that one of the "(i) pressure increasing mode", the "(ii) holding mode" and the "(iii) pressure decreasing mode" is achieved for the ABS objective wheel. Hereinafter, the state in which the above-mentioned control is performed is referred to as assist pressure decreasing (ABS) state.

That is, when the assist pressure decreasing (ABS) state is set, each of the holding solenoid valves is connected to the master cylinder 402. Accordingly, if the assist pressure decreasing (ABS) state is set, the wheel cylinder pressure $P_{W/C}$ corresponding to the wheels which are not the ABS objective wheel can be decreased down to the master cylinder as a lower limit. Additionally, as for the ABS objective wheel, the wheel cylinder pressure $P_{W/C}$ can be maintained or decreased by setting the "(ii) holding mode" or the "(iii) pressure decreasing mode".

The assist pressure decreasing (ABS) state is set when the driver intends to decrease the brake force, that is, when there is no need to increase the wheel cylinder pressure $P_{W/C}$ for any one of the wheels. Accordingly, the wheel cylinder pressure $P_{W/C}$ of the ABS objective wheel can be appropriately controlled to a pressure required by the BA+ABS control by achieving the (ii) holding mode and the (iii) pressure decreasing mode.

As mentioned above, according to the above-mentioned assist pressure decreasing (ABS) state, the wheel cylinder pressure $P_{W/C}$ for the front left and front right wheels FL and FR and the rear right wheel RR which are not the ABS objective wheels can be decreased down to the master cylinder pressure $P_{M/C}$ as a lower limit as is in the case where the assist pressure decreasing state is set during the BA control, while the wheel cylinder pressure $P_{W/C}$ for the rear left wheel RL which is the ABS objective wheel is controlled to be an appropriate pressure responding to a requested mode by the ABS control.

As mentioned-above, in the brake force control apparatus according to the present embodiment, after the BA control is started and when an excessive slip rate is generated in any one of the wheels, the ABS function and the BA function can be simultaneously performed, the ABS function controlling the wheel cylinder pressure $P_{W/C}$ for the ABS objective wheel to an appropriate pressure requested by the ABS control, the BA function increasing or decreasing the wheel cylinder pressure $P_{W/C}$ for a wheel which is not the ABS objective wheel within a high-pressure area relative to the master cylinder pressure $P_{M/C}$ in response to a brake operation performed by the driver.

Although the type of the brake force control apparatus is limited to the hydro-booster type or the pump-up type in the above-mentioned embodiments, the present invention is not limited to these types and a vacuum booster type brake force control apparatus may be applied when a vacuum booster, which varies a power ratio with respect to a brake pressing force, is used.

The present invention is not limited to the specifically disclosed embodiments, and variations and modifications may be made without departing from the scope of the present invention.

What is claimed is:

1. A brake force control apparatus for generating an increased brake fluid pressure which is greater than that generated in a regular brake operation when an emergency brake operation is performed by a driver, the brake force control apparatus characterized by:

operating speed detecting means for detecting a brake operating speed;

emergency brake operation detecting means for detecting execution of an emergency brake operation; and brake fluid pressure increasing means for generating the increased brake fluid pressure by adding an assist pressure corresponding to the brake operating speed generated during a standby control period when the emergency brake operation is detected, the standby control period being a period from a time when the emergency brake operation is detected to a time when said increased brake fluid pressure is generated.

2. The brake force control apparatus as claimed in claim 1, characterized in that said brake fluid pressure increasing means determines said assist pressure based on a maximum value of the brake operating speed generated during said standby control period.

3. The brake force control apparatus as claimed in claim 1, characterized in that said brake fluid pressure increasing means comprises:

first assist pressure generating means for increasing the brake fluid pressure with a predetermined change rate irrespective of whether a brake operation is present; and first assist time control means for controlling, when the emergency brake operation is detected, said first assist pressure generating means to increase the brake fluid pressure only for a pressure increasing period corresponding to the brake operating speed generated during said standby control period.

4. The brake force control apparatus as claimed in claim 1, characterized in that said brake fluid pressure increasing means comprises:

second assist pressure generating means for increasing the brake fluid pressure irrespective of whether a brake operation is present; and second assist time control means for controlling, when the emergency brake operation is detected, said second assist pressure generating means to increase the brake fluid pressure by a pressure increasing slope corresponding to the brake operating speed generated during said standby control period.

5. The brake force control apparatus as claimed in claim 3, characterized in that:

said first assist pressure generating means includes an accumulator storing a predetermined fluid pressure as a fluid pressure source of the assist pressure; and said brake force control apparatus further comprises pressure increasing period correcting means for correcting the pressure increasing period used by said first assist pressure generating means based on the brake fluid pressure when an increase of the brake fluid pressure is started by said first assist pressure generating means.

6. The brake force control apparatus as claimed in claim 1, characterized in that said brake fluid pressure increasing means includes:

a brake fluid pressure control mechanism achieving one of an assist pressure increasing state, an assist pressure maintaining state and an assist pressure decreasing state, said assist pressure increasing state being set so as to increase the brake fluid pressure irrespective of the brake operation, said assist pressure maintaining state being set so as to maintain the brake fluid pressure irrespective of the brake operation, said assist pressure decreasing state being set so as to decrease the brake fluid pressure irrespective of the brake operation;

start pressurizing means for generating the brake fluid pressure greater than that generated in the regular brake operation by setting said brake fluid pressure control mechanism in said assist pressure increasing state when the emergency brake operation is detected; and brake fluid pressure adjusting means for adjusting the brake fluid pressure by switching the state of said brake fluid pressure control mechanism to one of said assist pressure increasing state, said assist pressure holding state and said assist pressure decreasing state in response to a state of the brake operation after the brake fluid pressure is increased by said start pressurizing means.

7. The brake force control apparatus as claimed in claim 6, characterized in that said brake force control apparatus further comprises brake start time operation degree detecting means for detecting an initial degree of the brake operation at a start time when the state of said brake fluid pressure control mechanism is changed, and said brake fluid pressure adjusting means includes control state selecting means for selecting a state to be set to said brake fluid pressure control mechanism based on a difference between an actual degree of the brake operation and said initial degree of the brake operation.

8. The brake force control apparatus as claimed in claim 6, characterized in that said brake fluid pressure adjusting means includes control state selecting means for selecting a state to be set to said brake fluid pressure control mechanism based on the brake operating speed.

9. The brake force control apparatus as claimed in claim 6, characterized in that said brake control apparatus further comprises:

brake start time operation degree detecting means for detecting an initial degree of the brake operation at a start time when the state of said brake fluid pressure control mechanism is changed, wherein said brake fluid pressure adjusting means includes:

control state selecting means for selecting a state to be set to said brake fluid pressure control mechanism based on the brake operating speed and a difference between an actual amount of the brake operation and said initial degree of the brake operation; and pressure increasing and decreasing slope changing means for setting a steeper slope of one of an increasing rate and a decreasing rate in the brake fluid pressure than that of other brake operations when an absolute value of said difference is greater than a predetermined value and an absolute value of said brake operating speed is greater than a predetermined speed.

10. The brake force control apparatus as claimed in claim 6, characterized in that said brake fluid pressure adjusting means includes control state selecting means for selecting a state to be set to said brake fluid pressure control mechanism after an increasing of the brake fluid pressure by said start pressurizing means is completed, a selection being made based on the brake operating speed at a time when the increasing of the brake fluid pressure by said start pressurizing means is completed.

* * * * *